(12) United States Patent
Chien

(10) Patent No.: US 10,230,880 B2
(45) Date of Patent: Mar. 12, 2019

(54) LED LIGHT HAS BUILT-IN CAMERA-ASSEMBLY FOR COLORFUL DIGITAL-DATA UNDER DARK ENVIRONMENT

(71) Applicant: Tseng-Lu Chien, Walnut, CA (US)

(72) Inventor: Tseng-Lu Chien, Walnut, CA (US)

( * ) Notice: Subject to any disclaimer, the term of this patent is extended or adjusted under 35 U.S.C. 154(b) by 0 days.

(21) Appl. No.: 15/972,798

(22) Filed: May 7, 2018

(65) Prior Publication Data

US 2018/0332204 A1   Nov. 15, 2018

Related U.S. Application Data

(63) Continuation-in-part of application No. 15/268,125, filed on Sep. 16, 2016, now Pat. No. 9,832,430, which
(Continued)

(51) Int. Cl.
*H04N 7/18* (2006.01)
*H04N 5/225* (2006.01)
(Continued)

(52) U.S. Cl.
CPC ....... *H04N 5/2257* (2013.01); *F21V 23/0435* (2013.01); *F21V 33/0052* (2013.01);
(Continued)

(58) Field of Classification Search
CPC ..... H04N 5/2257; H04N 5/2354; H04N 7/188
(Continued)

(56) References Cited

U.S. PATENT DOCUMENTS

| | | |
|---|---|---|
| 5,107,120 A | 4/1992 | Tom |
| 5,946,404 A | 8/1999 | Bakshi |

(Continued)

*Primary Examiner* — Anand S Rao
(74) *Attorney, Agent, or Firm* — Bacon&Thomas, PLLC

(57) ABSTRACT

A LED Light device for house or stores or business application having built-in camera-assembly is powered by AC or-and DC power source for a lamp-holder, LED bulb, security light, flashlight, car torch light, garden, entrance door light or other indoor or outdoor LED light device connected to power source by (1) prongs or (2) male-base has conductive piece can be inserted into a female receiving-piece which connect with power source or (3) wired or AC-plug wires. The device has built-in camera-assembly has plurality functions to make different products and functions. The LED light device has at least one of (a) camera or DV (digital video) to take minimum MP4 or 4K, 8K image or photos, (b) digital data memory kits or cloud storage station, (c) wireless connection kits, Bluetooth or USB set for download function, (d) MCU or CPU or IC with circuit with desired motion sensor/moving detector(s)/other sensor, (e) camera-assembly for connecting Wi-Fi, Wi-Fi extend, or-and 3G/4G/5G internet or network or even settle-lite channel, (f) wireless-system to transmit or-and receiving wireless signal, (g) people had download APP or other platform incorporated with pre-programed or even AI (artificial intelligence) software to operate one or more of area-selections function to make screen or image comparison, detection, identification, recognition, tracing, purchase, or other pre-program following works including but not limited to detect moving object(s), face recognition or personal identification or-and habit or-and crime comparison, purchase, (h) LED light source to offer sufficient brightness under dark environment for camera-assembly take colorful or-and audio data, (i) other electric or mechanical parts & accessories, (j) has moving detector and software built-in to make comparison to judge the moving object(s) from the preferred screen selected-areas; to get desired function(s) for the said LED light device. The said camera-assembly has desired camera, wireless-system, sensor(s), part(s) and related module or circuit(s) or interface or-and backup power, and (k) camera-assembly may in separated housing incorporated with all kind of existing non-built-in camera light device so people can upgrade the non-camera (Continued)

device to has built-in camera and digital device for out-of-date non-camera all kind of light device including security light.

42 Claims, 28 Drawing Sheets

Related U.S. Application Data is a continuation-in-part of application No. 14/728,369, filed on Jun. 2, 2015, now Pat. No. 9,787,885, which is a continuation-in-part of application No. 14/265,838, filed on Apr. 30, 2014, now Pat. No. 9,197,865, which is a continuation-in-part of application No. 13/295,301, filed on Nov. 14, 2011, now Pat. No. 8,760,514, application No. 15/972,798, filed on May 7, 2018, which is a continuation-in-part of application No. 14/606,242, filed on Jan. 27, 2015, now Pat. No. 9,541,260, which is a continuation-in-part of application No. 13/367,758, filed on Feb. 7, 2012, now Pat. No. 8,967,831, which is a continuation-in-part of application No. 13/295,301, filed on Nov. 14, 2011, now Pat. No. 8,760,514, and a continuation-in-part of application No. 13/296,508, filed on Nov. 15, 2011, now Pat. No. 8,562,158, and a continuation-in-part of application No. 13/296,469, filed on Nov. 15, 2011, now Pat. No. 8,711,216, application No. 15/972,798, filed on May 7, 2018, which is a continuation-in-part of application No. 15/390,783, filed on Dec. 27, 2016, now Pat. No. 9,845,948, and a continuation-in-part of application No. 15/268,125, filed on Sep. 16, 2016, now Pat. No. 9,832,430, and a continuation-in-part of application No. 14/863,553, filed on Sep. 24, 2015, which is a continuation-in-part of application No. 14/793,209, filed on Jul. 7, 2015, now Pat. No. 9,549,110, and a continuation-in-part of application No. 14/728,369, filed on Jun. 2, 2015, now Pat. No. 9,787,885.

(51) Int. Cl.
| | | |
|---|---|---|
| *H04N 5/235* | (2006.01) | |
| *F21V 33/00* | (2006.01) | |
| *F21V 23/04* | (2006.01) | |
| *G03B 15/03* | (2006.01) | |
| *G08B 13/196* | (2006.01) | |
| *F21Y 115/10* | (2016.01) | |

(52) U.S. Cl.
CPC ......... *G03B 15/03* (2013.01); *G08B 13/1966* (2013.01); *H04N 5/2354* (2013.01); *H04N 7/188* (2013.01); *F21Y 2115/10* (2016.08)

(58) Field of Classification Search
USPC .................................................. 348/142–160
See application file for complete search history.

(56) References Cited

U.S. PATENT DOCUMENTS

| | | | |
|---|---|---|---|
| 6,100,803 | A | 8/2000 | Chang |
| 6,270,228 | B1 | 8/2001 | Axen et al. |
| 6,686,952 | B1 | 2/2004 | Brazier |
| 6,812,970 | B1 | 11/2004 | McBride |
| 7,321,783 | B2 | 1/2008 | Kim |
| 7,330,649 | B2 | 2/2008 | Finizio et al. |
| 7,346,196 | B2 | 3/2008 | Gin |
| 8,461,991 | B2 | 6/2013 | Botha |
| 2003/0197807 | A1 | 10/2003 | Wu |
| 2004/0212678 | A1 | 10/2004 | Cooper |
| 2005/0085131 | A1 | 4/2005 | Sutherland |
| 2007/0013513 | A1 | 1/2007 | Tang |
| 2007/0257195 | A1 | 11/2007 | Reibel |
| 2008/0151050 | A1 | 6/2008 | Self |
| 2008/0225120 | A1 | 9/2008 | Stuecker |
| 2008/0252730 | A1 | 10/2008 | Hong |
| 2009/0059603 | A1 | 3/2009 | Recker |
| 2009/0290023 | A1 | 11/2009 | Lefort |
| 2011/0134239 | A1 | 6/2011 | Vadai |
| 2012/0288114 | A1 | 11/2012 | Duraiswami |

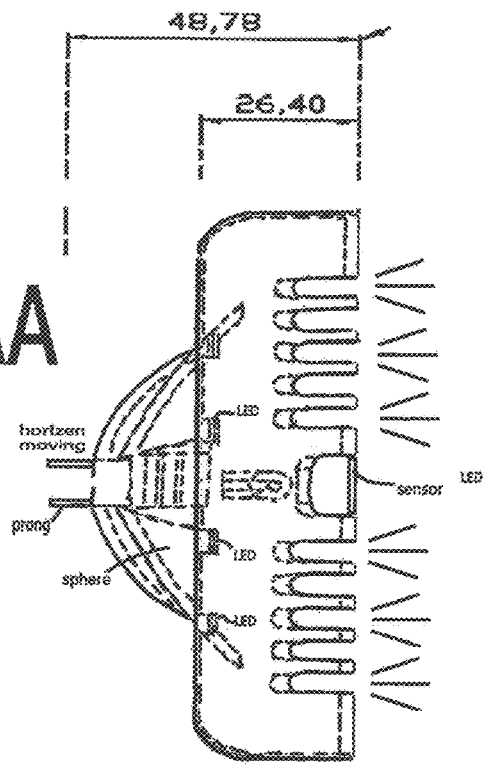
Fig. 5AA
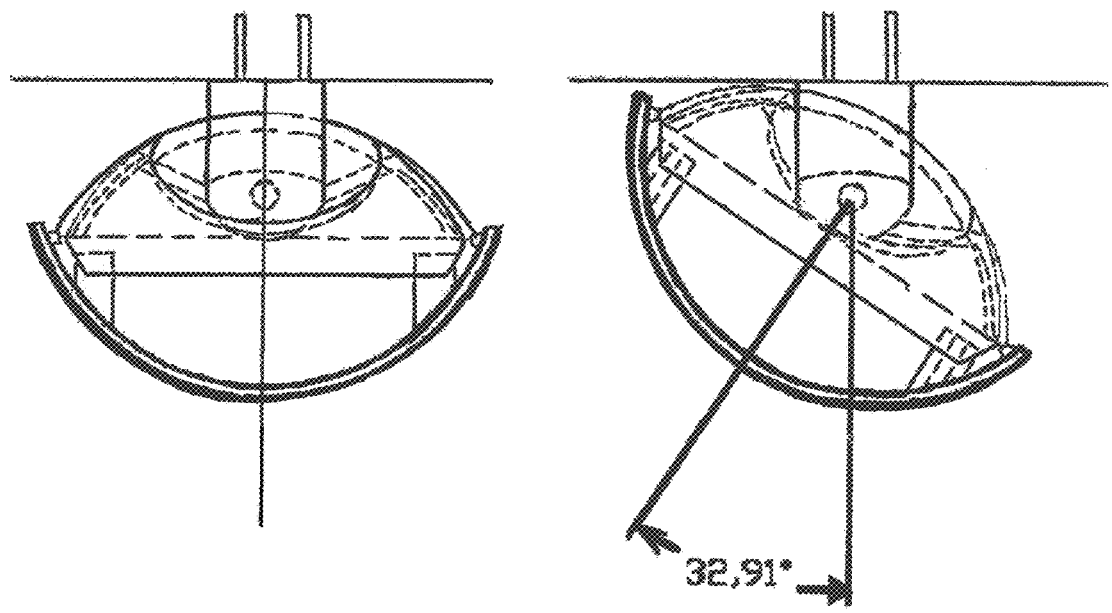
Fig. 6AA ⇔ Fig. 6AA-1

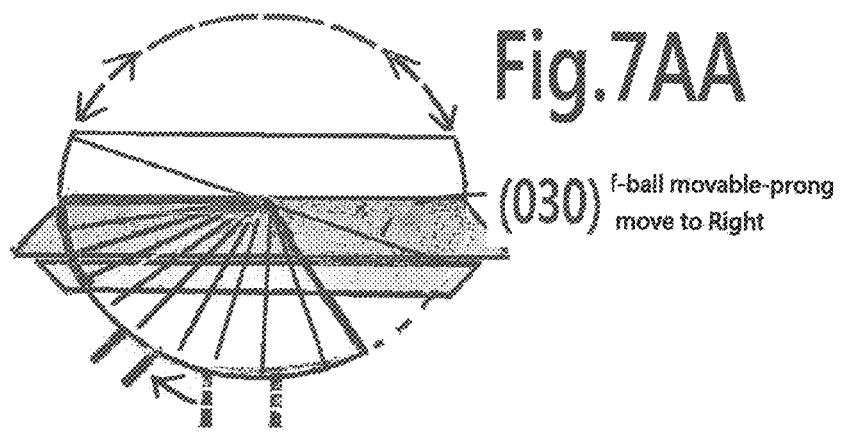
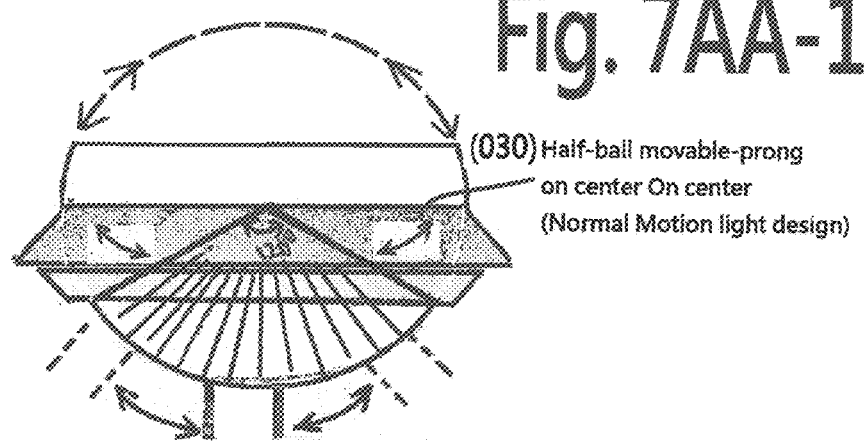
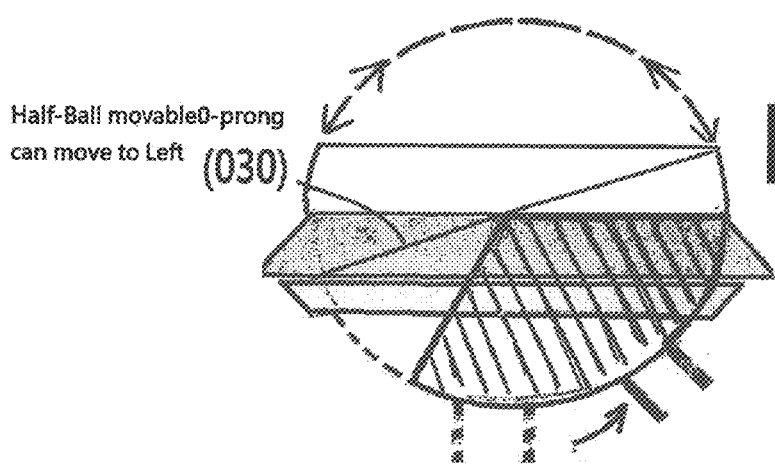

Fig.8AA
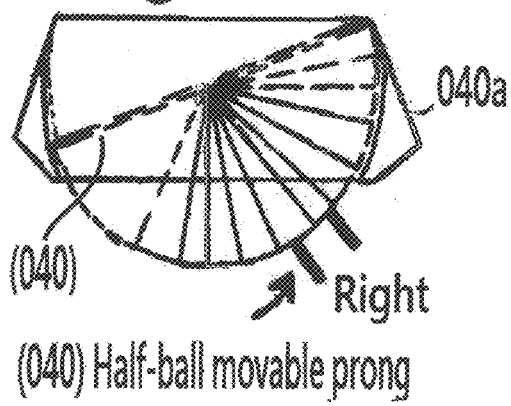
(040) Half-ball movable prong
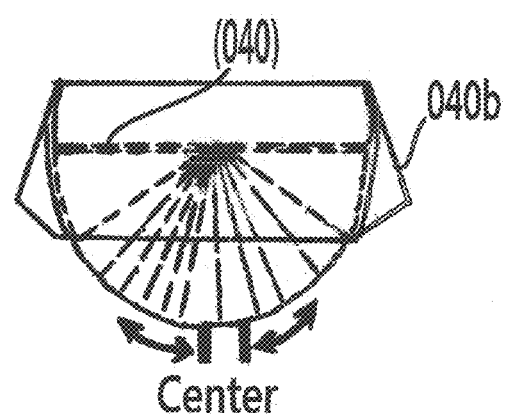
Fig.8AA-1
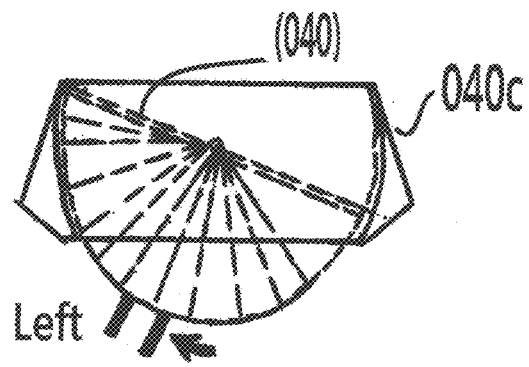
Fig.8AA-2
Fig.9AA
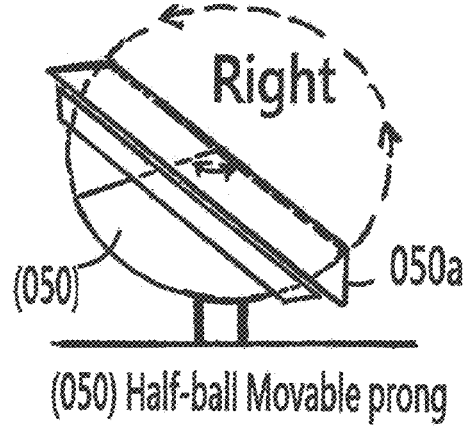
(050) Half-ball Movable prong
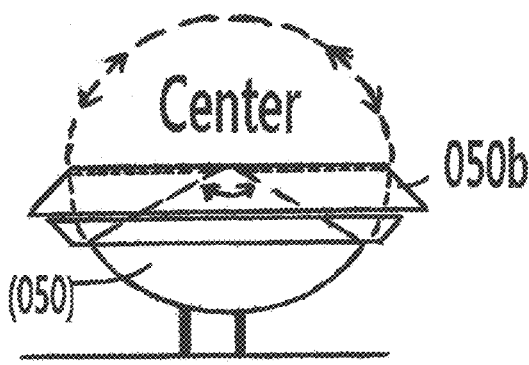
Fig. 9AA-1
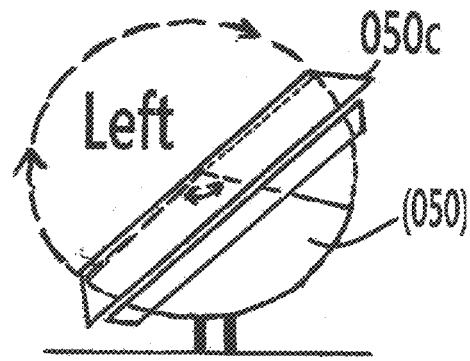
Fig. 9AA-2

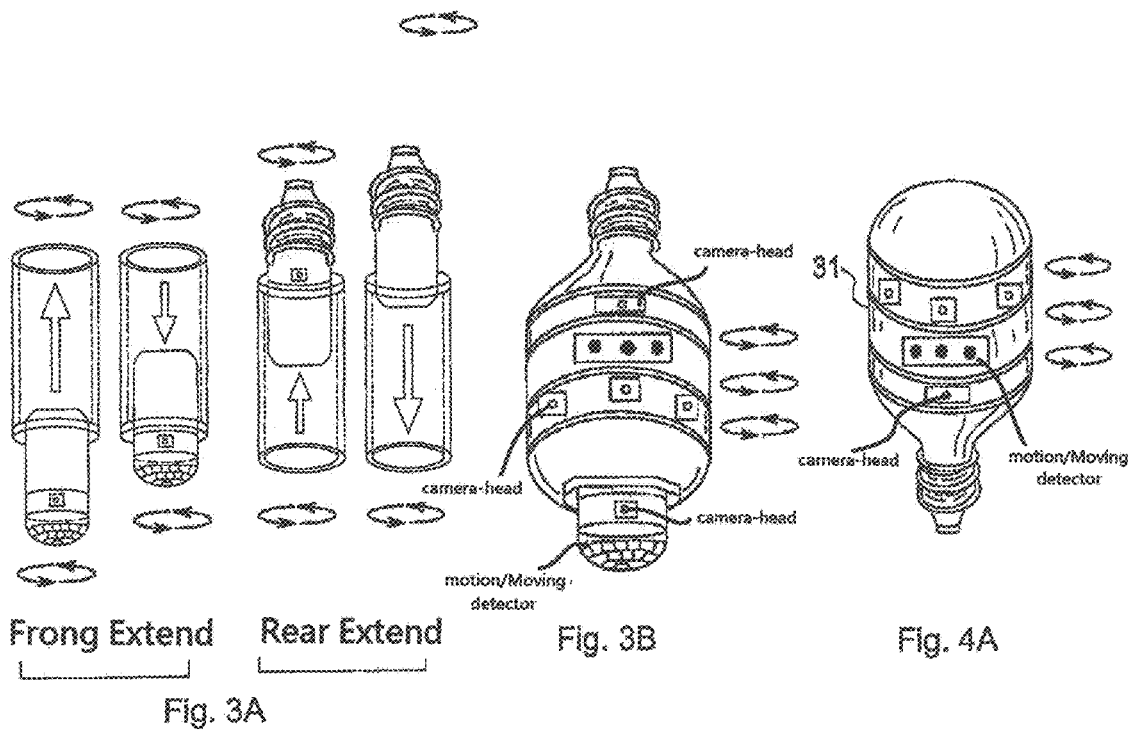
Frong Extend    Rear Extend    Fig. 3B    Fig. 4A
Fig. 3A
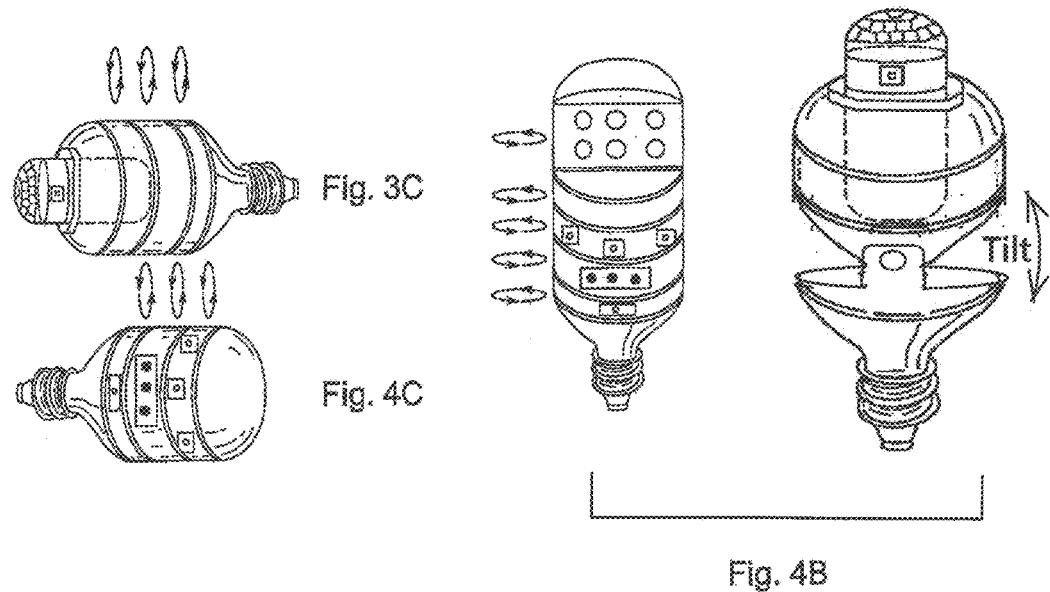
Fig. 3C
Fig. 4C
Fig. 4B

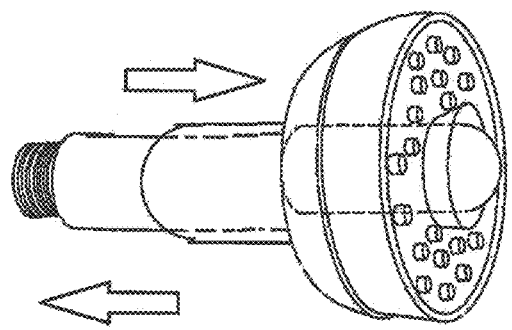
Fig. 6A
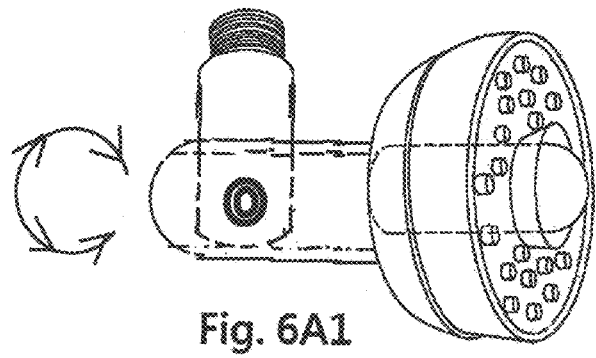
Fig. 6A1
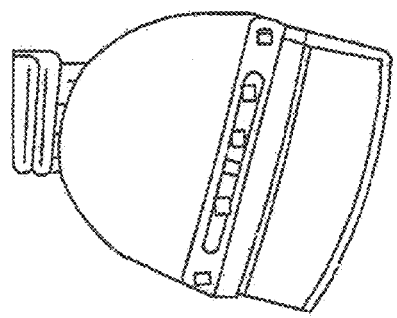
Fig. 6B
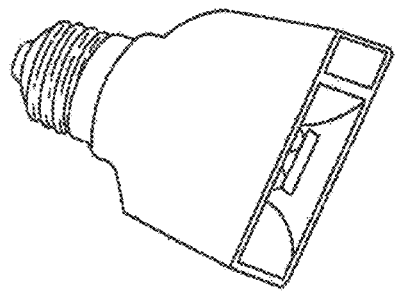
Fig. 6C
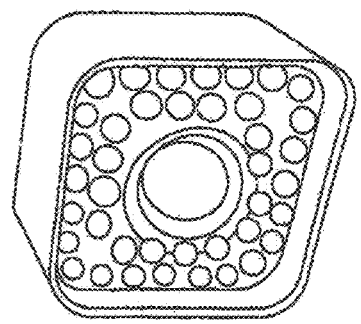
Fig. 6D Prong AC plug-wire or transformer Prong or Flap-over solar Flashlight hase built-in Camera

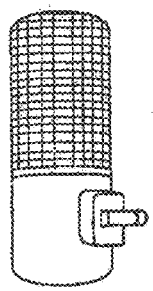
Fig. 9A
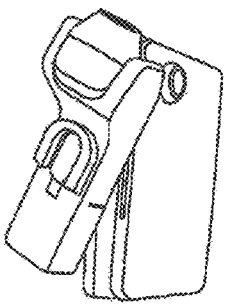
Fig. 9B
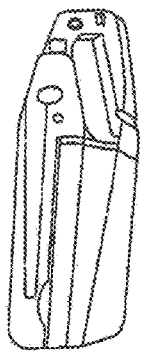
Fig. 9C
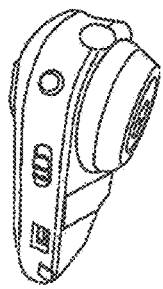
Fig. 9D
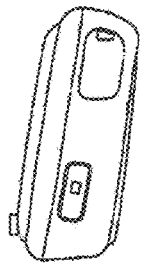
Fig. 9E
Fig. 9F
Connector choice for Indoor /Outdoor LED light has built-in Camera-assembly
 Prongs
 Bulb-Base
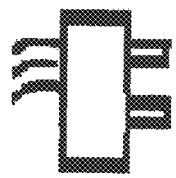 AC Plug-wire or Wired
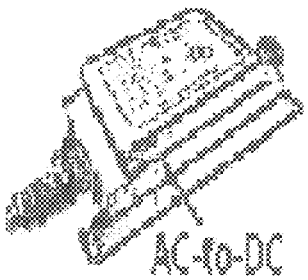 AC-to-DC Transformer
Fig. 9G

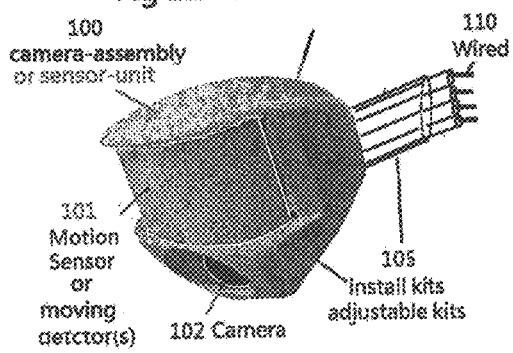
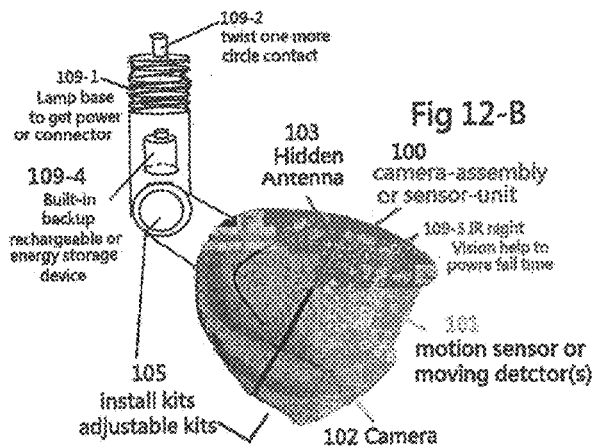
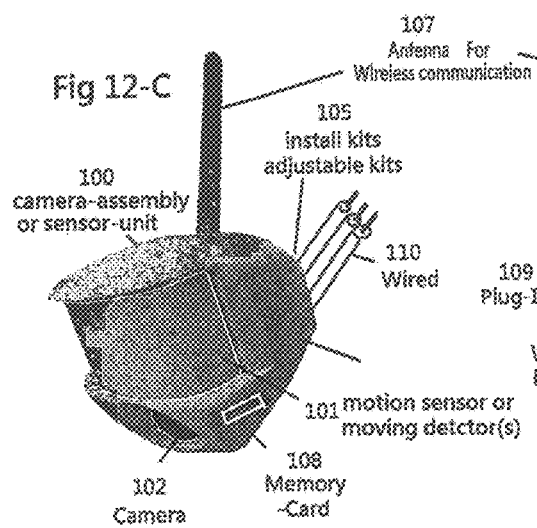
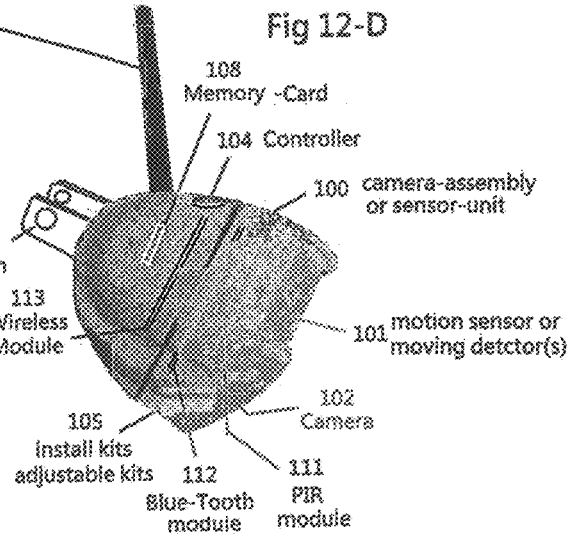

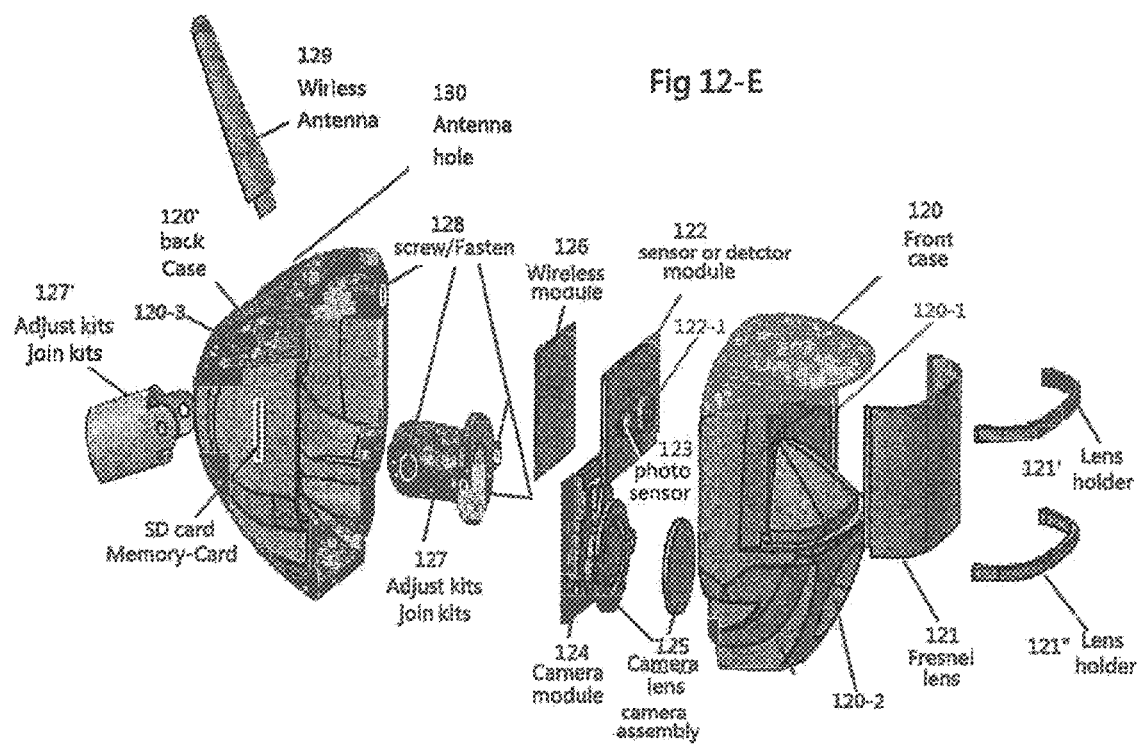

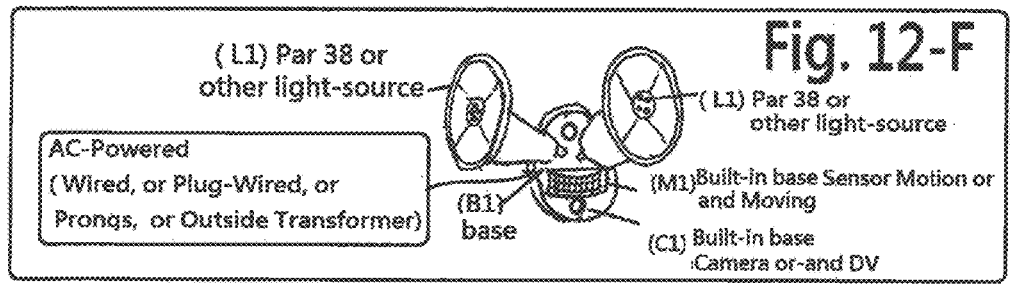
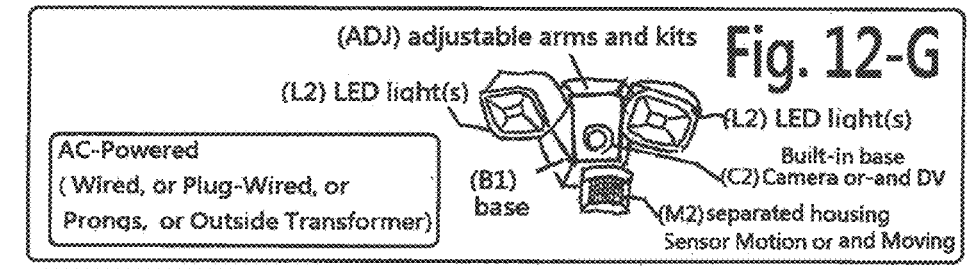
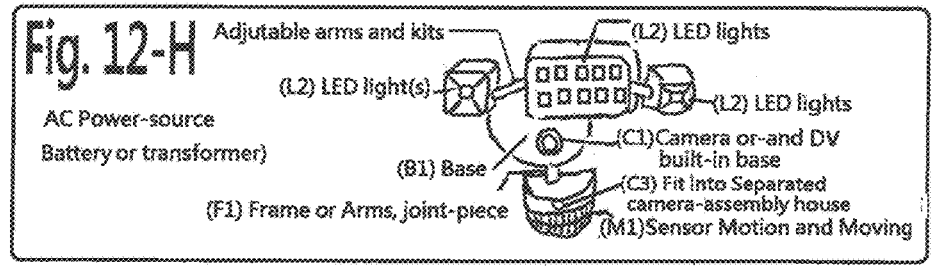
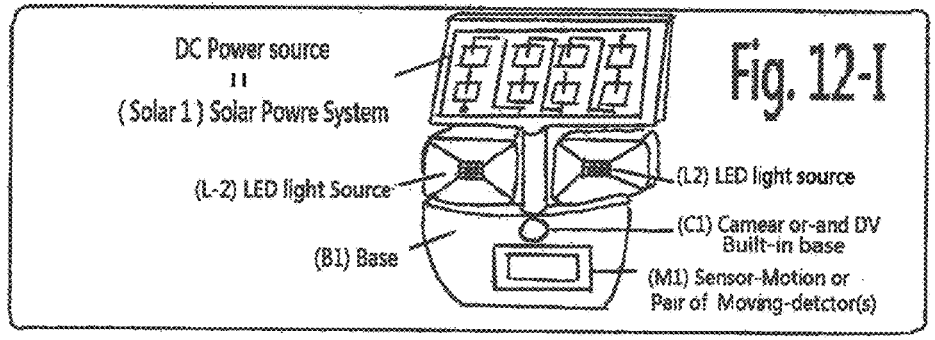
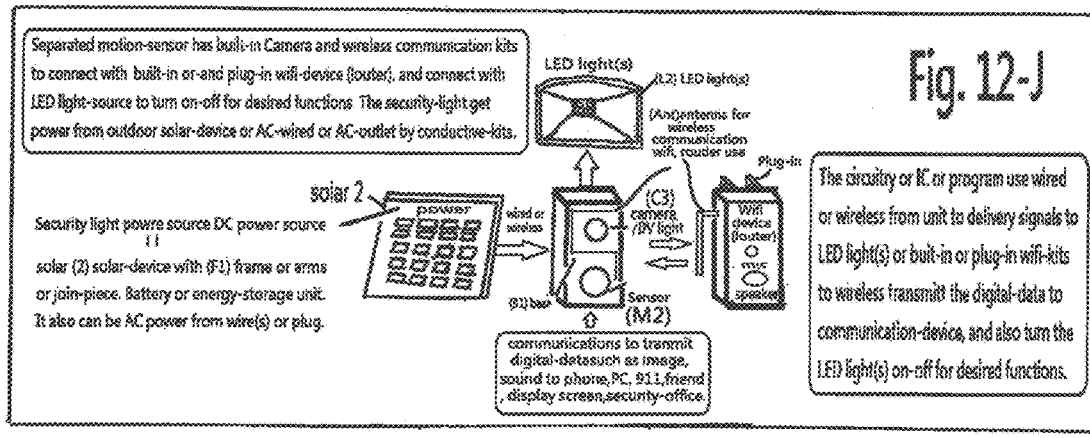

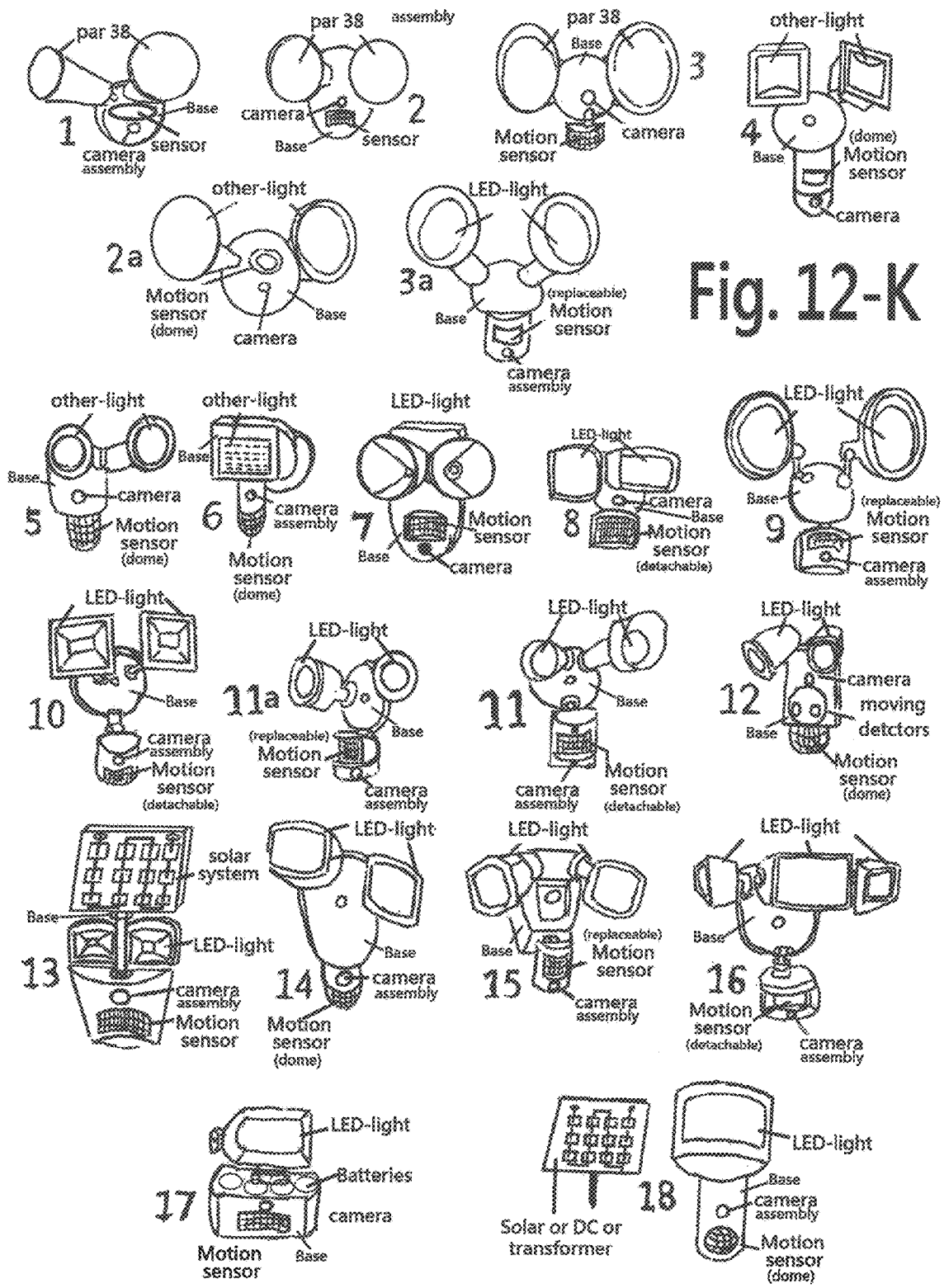
Fig. 12-K

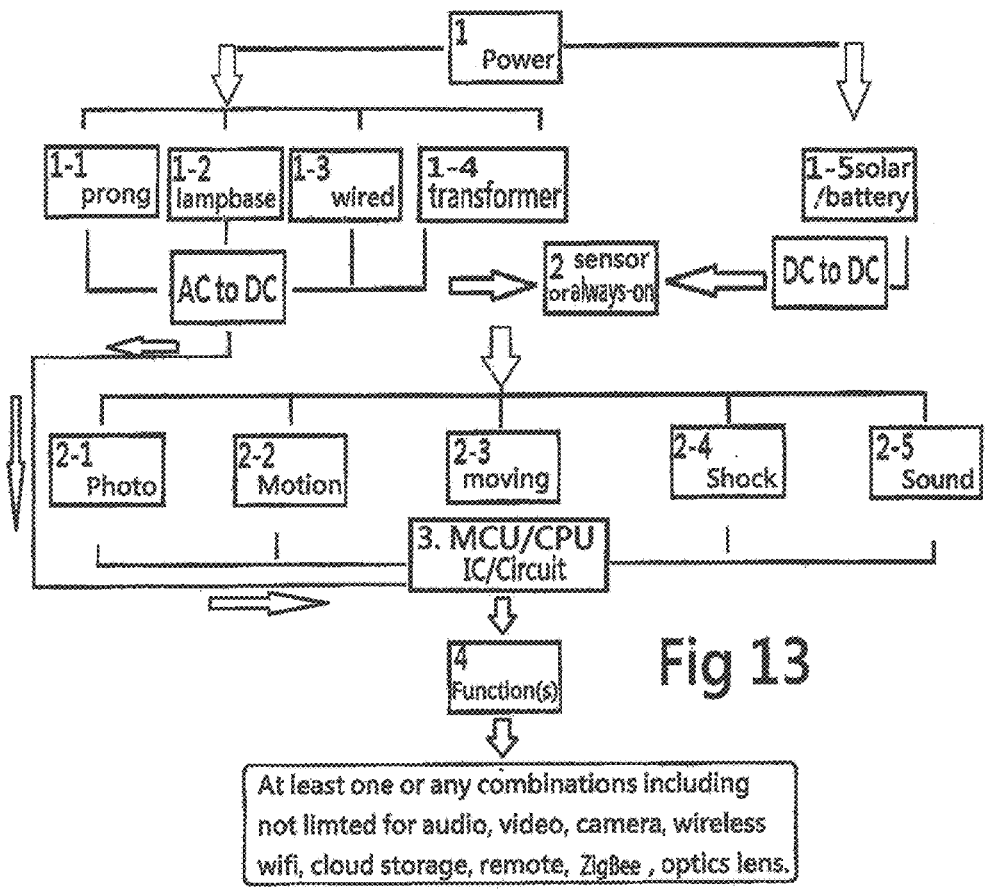
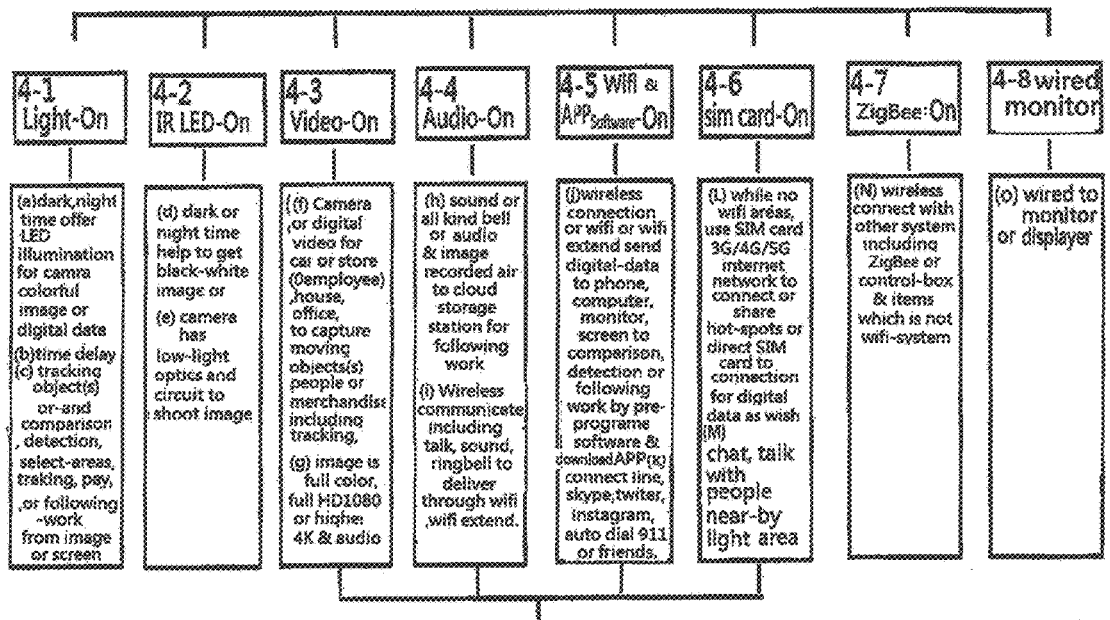
Fig 13

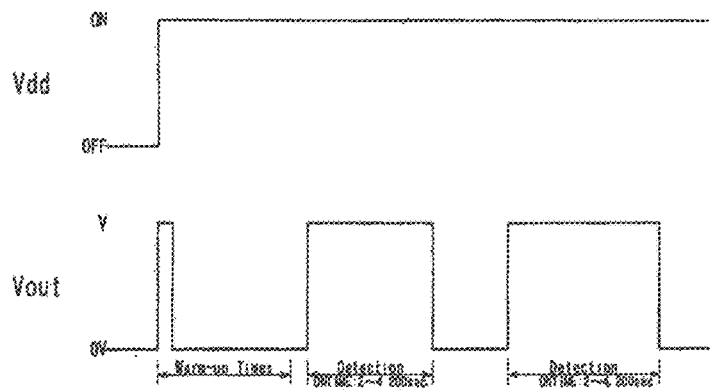
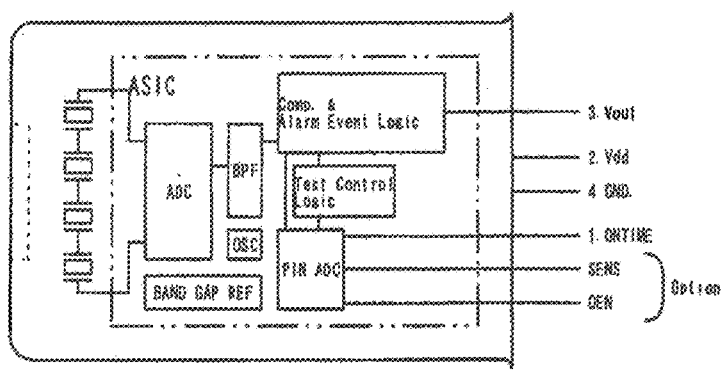
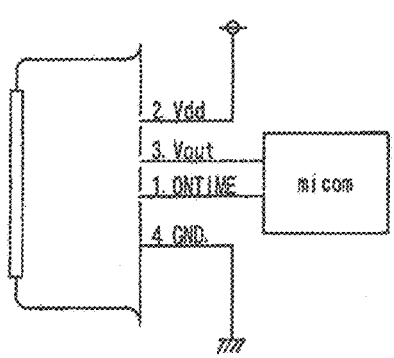
Fig.14

Fig.16

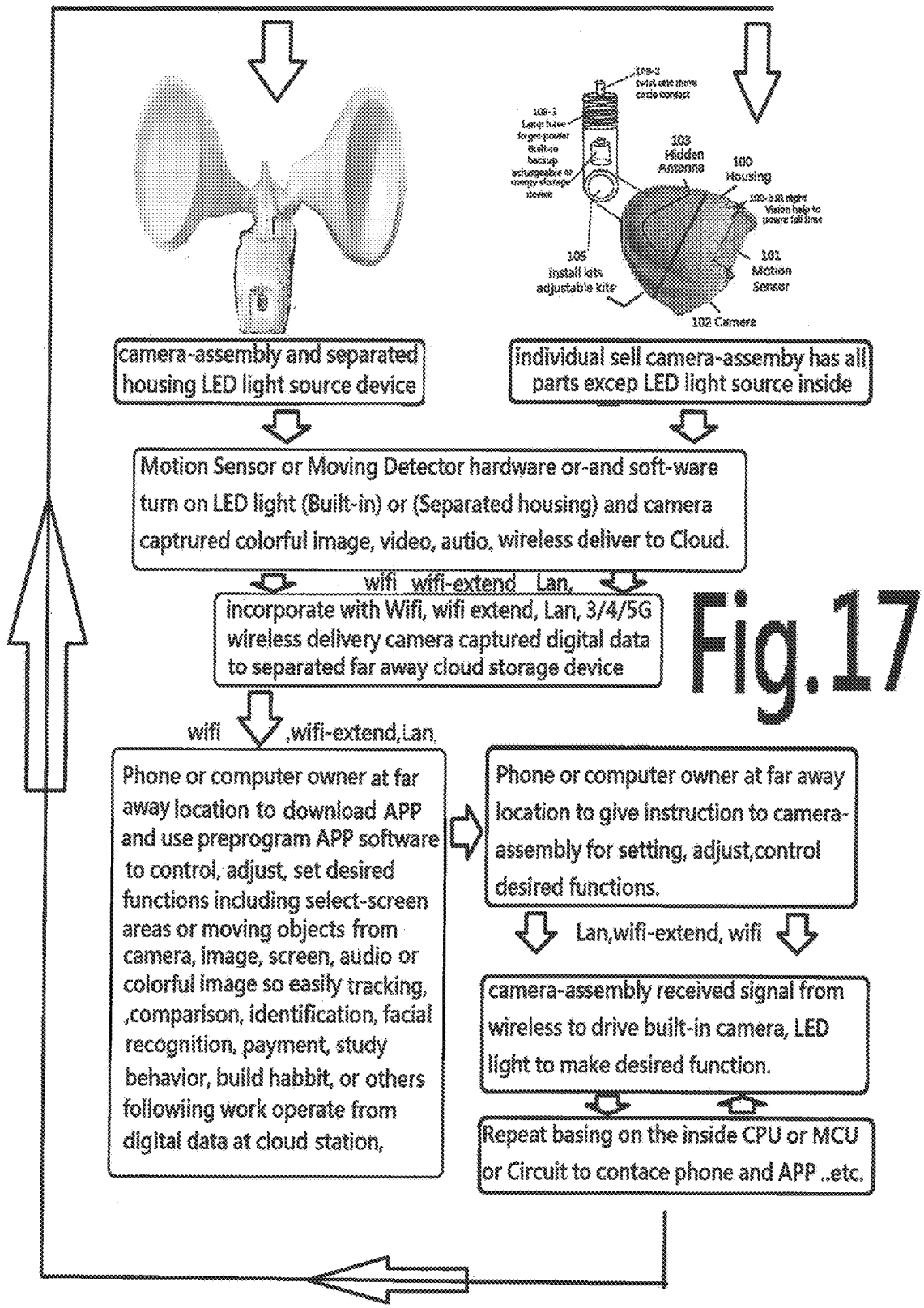

LED LIGHT HAS BUILT-IN CAMERA-ASSEMBLY FOR COLORFUL DIGITAL-DATA UNDER DARK ENVIRONMENT

This application is Division or-and continuation-in-part of (#KKK-9) U.S. patent Ser. No. 15/901,251 filed on Mar. 21, 2018 which is in continuation of application is continuation-in-part of (#KKK-4) U.S. patent Ser. No. 15/390,783 filed on Dec. 27, 2016, now U.S. Pat. No. 9,838,430 issued on Nov. 28, 2017 which is in continuation of application is continuation-in-part of (#KKK-8) U.S. patent Ser. No. 15/268,125 filed on Sep. 16, 2016, now is U.S. Pat. No. 9,838,430 issued on Nov. 28, 2017 which is in continuation of application is continuation-in-part of (#KKK-7) U.S. patent Ser. No. 15/453,270 filed on Mar. 8, 2017, now is U.S. Pat. No. 9,838,652 issued on Dec. 5, 2017 which is continuation of this application is continuation-in-part of (#KKK-6) U.S. patent Ser. No. 14/863,553 filed on Sep. 24, 2015.

This application is a continuation-in-part of (#KKK-5) U.S. patent application Ser. No. 14/793,209, filed Jun. 30, 2015, now is U.S. Pat. No. 9,549,110 issued Jan. 17, 2017 which is a continuation-in-part of This application is a continuation-in-part of (#KKK-3) U.S. patent application Ser. No. 14/728,369, filed Jun. 2, 2015, now is U.S. Pat. No. 9,787,885 issued on Oct. 20, 2017 which is a continuation-in-part of (#KKK-2) U.S. patent application Ser. No. 14/265,838, filed Apr. 30, 2014, now is U.S. Pat. No. 9,197,865 issued on Nov. 24, 2015, which is a continuation-in-part of (#KKK-1) U.S. patent application Ser. No. 14/265,738, filed Apr. 30, 2014, now is U.S. Pat. No. 9,560,322 issued on Jan. 31, 2017 which is a continuation-in-part of (#KKK-2011) U.S. patent application Ser. No. 13/295,301, filed Nov. 15, 2011, now U.S. Pat. No. 8,760,514, each of which is incorporated herein by reference.

This application also is continue filing of relevance are the (#KKK-11) inventor's U.S. patent application Ser. No. 13/295,301, filed on Nov. 11, 2011, now is U.S. Pat. No. 8,760,514 issued on Jun. 24, 2014) and directed to a device having built-in digital data means and powered by a power source for a lamp holder, and This application is a continuation-in-part of inventor's (#JJJ-11) U.S. patent application Ser. No. 13/296,508 also filed on Nov. 11, 2011 and directed to a device having built-in digital data means and powered by a power source for an LED Bulb (Now is U.S. Pat. No. 8,562,158 issued on Oct. 22, 2013). Also, this application is a continuation-in-part of relevance are the inventor's (#R) U.S. patent application Ser. No. 11/806,285 filed on Apr. 30, 2007, which discloses an LED night light having multiple functions, and (#ZZ-10) U.S. patent application Ser. No. 12/951,501 now U.S. Pat. No. 9,033,569 issued on May 19, 2015), which discloses a lamp holder having a built-in LED light. This application is a continuation-in-part of U.S. patent application Ser. No. 14/728,369, filed Jun. 2, 2015 which is a continuation-in-part of U.S. patent application Ser. No. 14/265,838, filed Apr. 30, 2014, which is a continuation-in-part of U.S. patent application Ser. No. 14/265,738, filed Apr. 30, 2014, which is a continuation-in-part of U.S. patent application Ser. No. 13/295,301, filed Nov. 15, 2011, now U.S. Pat. No. 8,760,514, each of which is incorporated herein by reference. This application also is continue filing of relevance are the inventor's U.S. patent application Ser. No. 13/295,301, filed on Nov. 11, 2011 (Now is U.S. Pat. No. 8,760,514 issued on Jun. 24, 2014) and directed to a device having built-in digital data means and powered by an power source for a lamp holder, and inventor's U.S. patent application Ser. No. 13/296,508 also filed on Nov. 11, 2011 (Now is U.S. Pat. No. 8,760,514 issued on Jun. 24, 2014) and directed to a device having built-in digital data means and powered by a power source for an LED Bulb (Now is U.S. Pat. No. 8,562,158 issued on Oct. 22, 2013). Also of particular relevance are the inventor's U.S. patent application Ser. No. 11/806,285 filed on Apr. 30, 2007, which discloses an LED night light having multiple functions, and Ser. No. 12/951,501 (Now U.S. Pat. No. 9,033,569 issued on May 19, 2015), which discloses a lamp holder having a built-in LED light.

| Application Number | Filing Date | Patent Number | Issue Date |
| --- | --- | --- | --- |
| 14/728,369 | Jun. 2, 2015 | | |
| 14/265,838 | Apr. 30, 2014 | 9,197,865 | |
| 13/295,301 | Nov. 14, 2011 | 8,760,514 | |
| 15/453,270 | | | |
| 14/606,242 | Jan. 27, 2015 | 9,541,260 | |
| 13/367,758 | Feb. 7, 2012 | 8,967,831 | |
| 13/295,301 | Nov. 14, 2011 | 8,760,514 | |
| 13/296,508 | Nov. 15, 2011 | 8,562,158 | |
| 13/296,469 | Nov. 15, 2011 | 8,711,216 | |
| 15/453,270 | Mar. 8, 2017 | | |
| 15/390,783 | Dec. 27, 2016 | | |
| 15/268,125 | Sep. 16, 2016 | | |
| 14/863,553 | Sep. 24, 2015 | | |
| 14/793,209 | Jul. 7, 2015 | 9,549,110 | |
| 14/728,369 | Jun. 2, 2015 | | |

RELATED U.S. PATENT DOCUMENTS

This application is Division or-and continuation-in-part of (#KKK-9) U.S. patent Ser. No. 15/901,251 filed on Feb. 21, 2018 which is in continuation of application is continuation-in-part of (#KKK-4) U.S. patent Ser. No. 15/390,783 filed on Dec. 27, 2016, now U.S. Pat. No. 9,838,430 issued on Nov. 28, 2017 which is in continuation of application is continuation-in-part of (#KKK-8) U.S. patent Ser. No. 15/268,125 filed on Sep. 16, 2016, now is U.S. Pat. No. 9,838,430 issued on Nov. 28, 2017 which is in continuation of application is continuation-in-part of (#KKK-7) U.S. patent Ser. No. 15/453,270 filed on Mar. 8, 2017, now is U.S. Pat. No. 9,838,652 issued on Dec. 5, 2017 which is continuation of this application is continuation-in-part of (#KKK-6) U.S. patent Ser. No. 14/863,553 filed on Sep. 24, 2015.

This application is a continuation-in-part of (#KKK-5) U.S. patent application Ser. No. 14/793,209, filed Jun. 30, 2015, now is U.S. Pat. No. 9,549,110 issued Jan. 17, 2017 which is a continuation-in-part of This application is a continuation-in-part of (#KKK-3) U.S. patent application Ser. No. 14/728,369, filed Jun. 2, 2015, now is U.S. Pat. No. 9,787,885 issued on Oct. 20, 2017 which is a continuation-in-part of (#KKK-2) U.S. patent application Ser. No. 14/265,838, filed Apr. 30, 2014, now is U.S. Pat. No. 9,197,865 issued on Nov. 24, 2015, which is a continuation-in-part of (#KKK-1) U.S. patent application Ser. No. 14/265,738, filed Apr. 30, 2014, now is U.S. Pat. No. 9,560,322 issued on Jan. 31, 2017 which is a continuation-in-part of (#KKK-2011) U.S. patent application Ser. No. 13/295,301, filed Nov. 15, 2011, now U.S. Pat. No. 8,760,514, each of which is incorporated herein by reference.

This application also is continue filing of relevance are the (#KKK-11) inventor's U.S. patent application Ser. No. 13/295,301, filed on Nov. 11, 2011, now is U.S. Pat. No. 8,760,514 issued on Jun. 24, 2014) and directed to a device having built-in digital data means and powered by a power source for a lamp holder, and This application is a continuation-in-part of inventor's (#JJJ-11) U.S. patent application Ser. No. 13/296,508 also filed on Nov. 11, 2011 and directed to a device having built-in digital data means and powered by a power source for an LED Bulb (Now is U.S. Pat. No. 8,562,158 issued on Oct. 22, 2013). Also, this application is a continuation-in-part of relevance are the inventor's (#R) U.S. patent application Ser. No. 11/806,285 filed on Apr. 30, 2007, which discloses an LED night light having multiple functions, and (#ZZ-10) U.S. patent application Ser. No. 12/951,501 now U.S. Pat. No. 9,033,569 issued on May 19, 2015), which discloses a lamp holder having a built-in LED light. This application is a continuation-in-part of U.S. patent application Ser. No. 14/728,369, filed Jun. 2, 2015 which is a continuation-in-part of U.S. patent application Ser. No. 14/265,838, filed Apr. 30, 2014, which is a continuation-in-part of U.S. patent application Ser. No. 14/265,738, filed Apr. 30, 2014, which is a continuation-in-part of U.S. patent application Ser. No. 13/295,301, filed Nov. 15, 2011, now U.S. Pat. No. 8,760,514, each of which is incorporated herein by reference. This application also is continue filing of relevance are the inventor's U.S. patent application Ser. No. 13/295,301, filed on Nov. 11, 2011 (Now is U.S. Pat. No. 8,760,514 issued on Jun. 24, 2014) and directed to a device having built-in digital data means and powered by an power source for a lamp holder, and inventor's U.S. patent application Ser. No. 13/296,508 also filed on Nov. 11, 2011 (Now is U.S. Pat. No. 8,760,514 issued on Jun. 24, 2014) and directed to a device having built-in digital data means and powered by a power source for an LED Bulb (Now is U.S. Pat. No. 8,562,158 issued on Oct. 22, 2013). Also of particular relevance are the inventor's U.S. patent application Ser. No. 11/806,285 filed on Apr. 30, 2007, which discloses an LED night light having multiple functions, and Ser. No. 12/951,501 (Now U.S. Pat. No. 9,033,569 issued on May 19, 2015), which discloses a lamp holder having a built-in LED light.

BACKGROUND OF THE INVENTION

This application is Division or-and continuation-in-part of (#KKK-9) U.S. patent Ser. No. 15/901,251 filed on Feb. 21, 2018 which is in continuation of application is continuation-in-part of (#KKK-4) U.S. patent Ser. No. 15/390,783 filed on Dec. 27, 2016, now U.S. Pat. No. 9,838,430 issued on Nov. 28, 2017 which is in continuation of application is continuation-in-part of (#KKK-8) U.S. patent Ser. No. 15/268,125 filed on Sep. 16, 2016, now is U.S. Pat. No. 9,838,430 issued on Nov. 28, 2017 which is in continuation of application is continuation-in-part of (#KKK-7) U.S. patent Ser. No. 15/453,270 filed on Mar. 8, 2017, now is U.S. Pat. No. 9,838,652 issued on Dec. 5, 2017 which is continuation of this application is continuation-in-part of (#KKK-6) U.S. patent Ser. No. 14/863,553 filed on Sep. 24, 2015.

This application is a continuation-in-part of (#KKK-5) U.S. patent application Ser. No. 14/793,209, filed Jun. 30, 2015, now is U.S. Pat. No. 9,549,110 issued Jan. 17, 2017 which is a continuation-in-part of This application is a continuation-in-part of (#KKK-3) U.S. patent application Ser. No. 14/728,369, filed Jun. 2, 2015, now is U.S. Pat. No. 9,787,885 issued on Oct. 20, 2017 which is a continuation-in-part of (#KKK-2) U.S. patent application Ser. No. 14/265,838, filed Apr. 30, 2014, now is U.S. Pat. No. 9,197,865 issued on Nov. 24, 2015, which is a continuation-in-part of (#KKK-1) U.S. patent application Ser. No. 14/265,738, filed Apr. 30, 2014, now is U.S. Pat. No. 9,560,322 issued on Jan. 31, 2017 which is a continuation-in-part of (#KKK-2011) U.S. patent application Ser. No. 13/295,301, filed Nov. 15, 2011, now U.S. Pat. No. 8,760,514, each of which is incorporated herein by reference.

This application also is continue filing of relevance are the (#KKK-11) inventor's U.S. patent application Ser. No. 13/295,301, filed on Nov. 11, 2011, now is U.S. Pat. No. 8,760,514 issued on Jun. 24, 2014) and directed to a device having built-in digital data means and powered by a power source for a lamp holder, and This application is a continuation-in-part of inventor's (#JJJ-11) U.S. patent application Ser. No. 13/296,508 also filed on Nov. 11, 2011 and directed to a device having built-in digital data means and powered by a power source for an LED Bulb (Now is U.S. Pat. No. 8,562,158 issued on Oct. 22, 2013). Also, this application is a continuation-in-part of relevance are the inventor's (#R) U.S. patent application Ser. No. 11/806,285 filed on Apr. 30, 2007, which discloses an LED night light having multiple functions, and (#ZZ-10) U.S. patent application Ser. No. 12/951,501 now U.S. Pat. No. 9,033,569 issued on May 19, 2015), This application has subject matter in common with the inventor's U.S. patent application Ser. Nos. 12/624,621, 12/622,100, 12/318,471, 12/318,470, 12/318,473, 12/292, 153, 12/232,505, 12/232,035, 12/149,963, 12/149,964, 12/073,095, 12/073,889, 12/007,076, 12/003,691, 12/003, 809, 11/806,711, 11/806,285, 11/806,284, 11/566,322, 11/527,628, 11/527,629, 11/498,874, 12/545,992, 12/806, 711, 12/806,285, 12/806,284, 12/566,322, 12/527,628, 12/527,629, 12/527,631, 12/502,661, 11/498,881, 11/255, 981, 11/184,771, 11/152,063, 11/094,215, 11/092,742, 11/092,741, 11/094,215, 11/094,156. 11/094,155, 10/954, 189, 10/902,123, 10/883,719, 10/883,747, 10/341,519, 12/545,992, 12/292,580, 12/710,918, 12/624,621, 12/622, 000, 12/318,471, 12/318,470, 12/318,473, 12/292,153, 12/710,561, 12/710,918, 12/711,456, 12/771,003, and Ser. No. 12/951,501. Technical background and time table with document supported: This application also is continue filing Of particular relevance are the inventor's U.S. patent application Ser. No. 13/295,301, filed on Nov. 11, 2011 (Now is U.S. Pat. No. 8,760,514 issued on Jun. 24, 2014) and directed to a device having built-in digital data means and powered by an power source for a lamp holder, and inventor's U.S. patent application Ser. No. 13/296,508 also filed on Nov. 11, 2011 and directed to a device having built-in digital data means and powered by a power source for an LED Bulb (Now is U.S. Pat. No. 8,562,158 issued on Oct. 22, 2013). Also, the said particular relevance are the inventor's U.S. patent application Ser. No. 11/806,285 filed on Apr. 30, 2007, which discloses an LED night light having multiple functions, and Ser. No. 12/951,501 (Now U.S. Pat. No. 9,033,569 issued on May 19, 2015, which discloses a lamp holder having a built-in LED light. Home security products currently available in the marketplaces such as Lowes or Home Depot, especially wireless home security products, are expensive and overpriced, the current invention aims to reach out to multiple divisions of people's willingness and budget to spend money on home protection products; therefore, the current invention's functions are not limited to one combination but multiple combinations of different functions said below, differentiating on the budget of customers and the set combination of functions of the current invention.

The current invention involves an LED light, which may be in the form of a night light, bulb, lamp holder, or other light source or LED illumination device, and which has built-in digital device(s) of which, the current invention has built in digital device(s) with motion sensors, moving sensor, digital data recording, storage elements, wireless communications, cellular phone communications, smartphone applications communications, and display functions, of which, the current invention can transmit digital sounds, messages, photos, movies, films, audios, videos, recorded sounds, application notifications by update communication tools including 3G/4G/MP4 format file/Wi-Fi/cloud storage stations not like all prior art which use out of date JPEG, MPM or 2G or more narrow wireless transmission or even use Bluetooth which only good for small file to transmitting etc.

The current invention has additional functions, however, but not limited to, such as living object (humans, animals) or objects (trees, leaves, rain, etc.) tracking ability, optional retractable prongs for flashlight also had such camera and Wi-Fi and cloud or SD card storage elements, and/or lamp-base installments, optional/add-on night-vision ability for dark area/late hours' usage; all additional functions aims to enhance user's experience when operating and the guarantee the reliability of the current invention.

The current invention aims to enhance the user's safety measures by providing high resolution (such as Full HD colorful image), real-time photos (Through MP4 format digital file+ Wi-Fi or 4G or 5G internet+ cloud/or servers storage station), videos, and/or streams of a designated area of the user's choice which is not available before 2009 basing on 4G mobile phone came out and all wireless station well established national wide.

When using streams, the current invention will use its Wi-Fi and/or Bluetooth function to connect to users' home network or cellphones and/or smartphones and be able to stream through cellphones or smartphones applications for users' viewing purposes again this need to depend on update internet upgrade to 3G to 5G, Phone has 4G or up communication capability, or even has better and faster server or cloud storage stations.

The current invention also carries the ability to store videos and pictures, under the conventional formats which are used in modern times such as MP4, MPEG 1 to 4, AVI, GIF, WMV, AMV, JPEG, etc.

The means of the storage of this current invention includes but not limited to: conventional and common storage cards such as SD cards, TF cards, cloud storage services such as iCloud, Dropbox, Google clouds, USB drives. The stored videos or pictures can also, but not always have to, feature in30 frames per seconds, 60 frames per seconds or other combinations of video related elements however, these update digital file MP4 format incorporated Wi-Fi and servers or/cloud storage for stream transmission is not happen and exist before 2009 furthermore the market has no any mobile phone such as 3G or 4G with national wide has all base stations well installed before 2009.

The current invention can also take pictures through applications' commands under the resolutions (such as Full HD) which is capable to have pictures taken at the conventional and common resolutions in modern times. The current invention's power input comes from either prongs or wired or optional retractable prongs or lamp-holder bases, or conventional batteries (preferred rechargeable) which serves as backup sources.

The current invention may also consist of similar or equal function or alternative functions device such as compact Digital Video (referred as DV) device such as webcam, driving camera, IP camera, and/or GoPro, which can be built into the light device to simple to make current invention products. Preferably, the camera has lenses in a small-form-factor for hidden purposes, so the camera can easily be built-into the light device while remain incognito. The invention aims to use lower cost, however efficient camera devices, to avoid problems which requires technicians to investigate troubles the device might cause.

The camera will send digital data to the said display units while receiving power directly from a power source including AC or DC or backup power source as said above. Then depending on the functions, the current invention can link to Wi-Fi or Bluetooth or 3G/4G even current new 5G station or other networks and send notifications through applications (APP or equivalent software) to any smartphones, text messages or warning calls to cellular phones, pictures, videos, recorded sounds, or live stream in different file format can also be sent through Wi-Fi to said smart phones however only if the smart phones have internet services of 4G or update 5G network, or any other modern internet services.

The said internet services a cellular device, smart phone device, tablet device, TABLE-US-00001 Generation Speed Technology Features 2G 9.6/14.4 TDMA, 2G capabilities are achieved by kbps CDMA allowing multiple users on a single channel via multiplexing. 2G enabled mobile phones can be used for data along with voice communication. 3G 3.1 Mbps CDMA 2000 3G provides amazing internet (peak) (1×RTT, browsing speeds. Opens the door 500-700 EVDO to a whole bag of opportunities Kbps UMTS, with video calling, video EDGE streaming, etc. In 3G, universal access ad portability across different device types are made possible. (Telephone & PDA's) 3.5G 14.4 Mbps HSPA 3.5G supports even higher speeds (peak) and enhances higher data needs. 1-3 Mbps 4G 100-300 WiMAX Speeds for 4G are increased to Mbps LTE lightning fast to keep (peak) up with data access demand used 3-5 Mbps by various services. It also supports HD streaming. HD phones can be fully utilized on a 4G network. computer, laptop, or any other computing devices which consist data-transmitting function must have said 3G, 4G, or any other modern internet servicing speed for the current device to transmit large or small amount of data to the above said devices. The first 3G network were introduced in 1998 and the fourth generation (4G). (apekshatelecom.com)

It is inarguably that the first globalizing time when 3G network starts to be generalized is when iPhone 3G came out on Jul. 11, 2008. (iPhone 3G, Wikipedia) Ever since the release of the mainstream phone iPhone 3G, the 3G networks started to public until the very modern days. It is correct to say that any patents before the release of iPhone 3G and the generalization of 3G networks of similar ideas differs from my invention is because the ability to transmit high-volume data of pictures or video, or even to stream live feeds cannot be done due to the lack of technology before the development of the 3G network.

It is inarguably that the first globalizing time of 4G or LTE network starts to be generalized is when in 2008 the International Telecommunications Union-Radio communications sector (ITU-R) specified the standards of 4G or LTE which must reach at least 100 megabits per seconds, this internet servicing speed is aimed for high speed, mobile telecommunications for variety of purposes. (4G, Wikipedia) The current invention utilizes 4G technology, and aims to use any modern network services succeeding 4G speed to send out valuable security information of customer's home protected, pre-determined area to any mobile devices. The said information sent to customers contains any but not limited to the followings: digital sounds, messages, photos, movies, films, audios, videos, recorded sounds, application notifications, etc. The very first smart phone to carry out the 4G capability was the HTC Max 4G, which was pressed released on Nov. 12, 2008. This date sets the very first date that the current invention's 3G and 4G LTE transmit function.

It is inarguably that the current invention is first of its kind to have the function to store any digital information taken by the camera inside cloud services such as iCloud, Dropbox, Google clouds. The introduction of cloud computing began early 2000, however, this specific function started to generalize first by Amazon on October 2008, then by Windows, Rackspace Hosting and Nasa, IBM, and Oracle on the years between 2010 and 2012. (Cloud Computing, Wikipedia) The previous related patents before the year of 2008 are considered irrelevant in words of cloud storage means to the current invention.

The current invention may also consists ability to store the said digital data in a SD card, TF card, USB flash drive, cloud services such as iCloud, Dropbox, Google clouds, or any other digital data servers. For SD cards, TF cards and/or USB flash drives, the current invention aims to reach an easy plug-and-go form factor for simple downloading any stored photos, videos, recorded sounds, etc. to any electrical equipment any customer has on his or her possession.

The cloud services depend on the customers' preferences. There are multiple cloud services around the world that are free of charge (e.g. DropBox, iCloud, Google Cloud, etc.), or charge depending on the total size of the cloud. The current invention will have an option for customers to, instead of using a SD card, TF card, USB drive, or other hardware storage units, link to a cloud storage and store all taken digital sounds, messages, photos, movies, films, audios, videos, recorded sounds, application notifications, etc. for future references. The cloud can also be non-online clouds called Network Attached Storage (NAS) such as using a server cloud right in the possession of the home owner who uses the current invention, meaning, the usage of multiple Terabytes (TB) HDD and the formation of a server using other products from brands like Synology.

The said digital sounds, messages, photos, movies, films, audios, videos, recorded sounds can be in forms of any kind that are generally and commonly used in modern days, such as file format of AVI, FLV, WMV, MOV, MP4, etc. for video related formats; JPEG, TIFF, BMP, raw image format, BIT, etc. for picture related format. These are only inclusions but not limited to the above noted formats, any modern file format is included even if not listed.

Even though Wi-Fi came as early as 1999, the generalization began when the common people started using mobile smartphones to link themselves to the internet without overpaying the cellphone company. The inclusion of Wi-Fi in the current invention only uses Wi-Fi as a bridge for connectivity for Clouds, mobile alerts and streams for cellular and smart phones.

The said motion sensors of the current invention include all kind but not limited to below: Passive Infrared Sensor (Shorted for PIR), Ultrasonic Sensor, Microwave sensor, Tomographic sensor, or any of its combination. The usage of each kind of sensors depends on the customers' budgets and how much likely hood of false alarms a design will want to decrease. Some motion detector might be included in IC in pair of a camera lens, which detects movement between two periods time so the camera or other designated device will active as soon movement is scanned. Each and the modern said motion sensors are included in the current invention.

(www.elprocus.com)

Current home security products available in the marketplace, and especially wireless home security products, are very expensive. Furthermore, not only are they too costly, they are also too much trouble to install (may need engineer to help) and some application need use outside control box with complicated setting which is not easily for youth or aged peoples. the batteries or power storage means must be replaced very often.

However, market required for easily install and short time installation, so the current invention also apply the camera digital device for battery powered unit.

Compare with all below listed US Prior arts. The current invention had update technical and has faster to wire transmission the MP4 format digital data to shown or to other display device.

(Prior=1) US prior art U.S. Pat. Nos. 8,926,139 and 8,872,964.

(1) The Reed '964 disclosure the outdoor lighting which has imager to take image and though the process to get the electromagnetic spectrum to determine the light device function (FIG. 2A, FIG. 2B, FIG. 2C). (2) The Reed '139 same as the '964 the imager took image 1st and become electromagnetic spectrum so make decision for light functions. (column 3 line 54 to line 62). Also, the camera is take for period time is not like the current invention light turn on 1st and camera do the work accordingly. Also, Current invention never want to see spectrum which is only good for military or war filed, Current invention need a full color image so can make identification for person or lived objects. (3) Compare with current invention the LED light is turn on 1st so can offer the enough brightness to the camera to take colorful and clear picture or video and preferred combine other added functions or circuitry. This is totally different for Imager operation and final storage or show the electromagnetic spectrum vs. full color image with sound of current invention.

(Prior=2) Also, U.S. Pat. Nos. 8,926,139 and 8,872,964 patented to Reed et, al. discloses an outdoor lighting device which has image taker to take images through process of electromagnetic spectrum to determine the light device functions (FIG. 2A, FIG. 2B, FIG. 2C). The invention Reed et, al. discloses takes pictures first then go through the electromagnetic spectrum to determine the light functions, unlike my invention, our devices' lights go out first, then the devices take pictures to ensure the natural color of the predetermined shape is stored inside the storage means mentioned above. Also, as above mentioned, the current invention doesn't require the usage of electromagnetic spectrum which is preferably used in higher-technical situations such as battlefields or any other security space which cost expensively, my invention aims to fit budget for each customer. The current invention lights up the first, so the camera can then take the full natural color images, videos, or other data in the most vivid way possible, when everything is lightened up.

(Prior=3) US Prior arts US Filing series No. 2003 021 0340 which show the camera device is connect with bulb lamp-holder to get power which is totally not same as the current invention including: (1) current invention to use LED or LEDs has desired number of own housing and each LED or LEDs inside own housing is direct connect with the light device circuitry so NO ANY LAMP HOLDER NEEDED for LED or LEDs light source production. (2) The '0340 Romannowich prior art teach the camera connect with lamp holder will be rusted very short time so the camera device will become no function because lamp holder normally is too easily rust while put outdoor applications. (3) The current invention has desired number of housing for LED or LEDs light source which depend on what brightness and how high the raised temperature will created so can make light source housing number from 1 to N (any number) and each LED or LEDs housing is directly connect with main circuitry so can prevent from any one of N (any number) light source or the wires or functions is out of order and not totally loose functions. (4) The current invention most important the camera assembly connected with the main circuitry directly not connect with lamp holder (Because LED or LEDs light source no need lamp holder at all). (5) The current invention disclosure the most important design the said camera with or without built-in slot for the memory kits including but not limited for the SD card or Mini-SD card which can be take days for picture or video and with optional over-write function so the memory kits can last for years without need to change at all. This is other features which taught by current invention for memory kits main function. Current invention has the built-in memory kits as basic model which has no other added wireless or wired display function for cost consideration so can let all consumers affordable to buy low cost unit. Which '0340 Romanowich is not teach this most important built-in memory kits such as SD or Mini-SD card for most important features. All wired or wireless to present image or digital data is a luxury options for current invention. So, this is different with the construction and functions and application for the camera apply for any light device.

Also, US Prior number 2003-021-0340 by Frederick Romanowich explained a design of camera combined with a bulb socket with a lighting bulb. The current invention does not limit itself to bulb bases or sockets, however, bulb sockets are one way to provide illumination for LED lights. The LED in my design is directly connected to the light device circuitry and no help should a lamp holder provide in order for the lighting to take place. The other main difference between the two patents are the usage of storage means. The current invention consists the usage of SD cards, TF cards, and/or USB drives, however, Romanowich did not mention the usage of any of them. The difference is clear on how my design will fit any kind of budget a customer is willing to pay, because my design gives variety of combination for each level of security my design can possible provide.

(Prior=4) prior arts U.S. Pat. No. 2,007,001 3513 which taught the street light which is not same as current invention (1) Light source is 175 Watt Mercury Vapor light source which is totally different with current invention for LED light source (2) The '3513 use the Photo sensor to make the on-Off light which is different with current invention for the motion or moving sensor (3) The wireless communication system of '3513 is though the cellar phone net-work system to send out wireless to near-by station and then, send to the generation station and pass to other station to the monitor team which is not same as current is connect with housing or resident Wi-Fi system. So '3513 is for outdoor internet and current invention is through the house or residence system which is different. So, this is not any relation for current invention.

also, US Prior number 2007-001-3513 by Tang et al. described an invention in street-light fashion which is not similar to the current invention. The other differences are the invention by Tang et al. utilizes 175 Watt mercury Vapor light source; on the other hand, the current invention utilizes LED light sources. The patent by Tang et al. uses photo sensor to make on-off light which is not the same as the current invention which uses motion sensor. The patent by Tang et al. uses cellular phone network to transmit data from wireless station then to a general station monitor team then to the cellphone, which is not similar to the current invention which utilizes 4G or above internet services, Wi-Fi networks, Bluetooth network, streaming services, or all other mentioned "wireless" methods to transmit the said digital data to cellular phones or smartphones directly from the device.

(Prior=5) Prior arts U.S. Pat. No. 7,455,435 Mattew is teach a data delivery channel by the house lighting device wires to make the digital data delivery like fiber optics theory but different carriers which is one of the digital data delivery like wife or internet. Mattew did teach the data delivery and receiver majority for the audio device for speaker or amplifier. Nothing to do with the any image or camera and relation for LED light and Camera with memory kit so this is not any relation with current invention.

Also, Prior U.S. Pat. No. 7,455,435 by Mathews et al. described a design consisting a speaker, which is not included in current invention. Mathews et al. limited his/her invention to transmission only through AC power line through a standard bulb socket, while the current invention aims to transmit digital sounds, messages, photos, movies, films, audios, videos, recorded sounds, application notifications, etc. through 4G or modern internet services, Wi-Fi, Bluetooth, storage means such as SD cards, TF cards, and/or USB flash drives, or notifications to smart phones, texts to cellular phones, streaming to phones or other display units such as flat screen TV, Amazon, Google, Apple TV or its equivalent. According to Mathews et al., his or her invention does not include a camera device to capture real-time image or picture in order, for security reasons, to show them to authorities or for other purposes, therefore this patent has no similarity to the current invention.

(Prior=5) Prior art U.S. Pat. No. 6,686,952 Brazier teach the pedestal assembly light device which has rotating construction with plurality of motion sensor detector for moving objects. The built-in removable light source has light socket and camera built top of the rotatable base. Brazier is different with current invention for (1) Brazier teach is outdoor pedestal construction which is too far away for wall surface and too difficult to install on the wall need some solid support or metal bracket (2) light source is removable and has light socket to install so this is not the LED or LEDs light source has its own housing without any removable or light socket to install or replace. (3) The Brazier has no any memory kits or the slot to install the said memory kits including but not limited for SD card or Min-SD card so can save the image or sound into with optional days recording capacity or even years while has over-write capability.

All the current invention installation the light device base is parallel to install on the wall which is not belong to any pedestal construction which is like become light construction and application. So, can take out from built-in memory kits while had any bad things happened for house, residence, building, office, outdoor. So, the difference for light source, memory kits, narrow camera shooting angle, motor-gear set, pedestal body is totally different with current invention.

(Prior=6) US prior art U.S. Pat. No. 2,004,021 2678 Cooper teach a system which has the (1) 1.sup.st low-resolution image sensor to take 1.sup.st image of a scene and go through the controller for determine where motion has occurred based on images captured by the sensor. This is difference than the current invention 1.sup.st is turn on-off light device and then camera take picture or photos under pre-determined functions which has no 1.sup.st sensor and wait for controller searching is meet controller definition then go to take high resolution image. (2) The Cooper unit is battery Powered which is different with the current invention for variety of power and even current invention use Battery power still have back-up battery for continue supply current. (3) The current invention no need 2 different resolution image sensor or Camera to make 2 steps with the complicated program design which may not meet all kind of people wanted. Current invention just take camera because has built-in memory kits which for days or years memory kits including but not limited of SD card or mini-SD card with or without over-write functions to make days or years difference. So, the Cooper items is too costly for 2 image sensor or camera+ complication program design for controller which not let all People accepted satisfactory+ lack economical SD card or Mini-SD card to make low end cost LED light device has the camera and took clear photos or video for police to check if had bad things happened.

Also, US Prior number 20040212678 by Cooper et al. described a low-quality image capture device that is not the same as the current invention due to the process of taking digital sounds, messages, photos, movies, films, audios, videos, recorded sounds. The Cooper et al. invention takes pictures and then transmits the pictures into a control unit to determine motion; while the current invention provides lights and then capture pictures for natural quality and color. The Cooper et al. invention is also only battery operated, while the current invention relies on the AC through DC power input from different sources listed above, however, batteries can still operate as a backup power source for the current invention but not limited to this ability. The Cooper et al. invention also has two mode switching between sleep and normal; the current invention does not require such complicated programming, not only because it will increase the possible cost, but also not necessary as power for current invention is not to be considered about because the current invention will have unlimited power as it is plugged in varies of ways into a direct power source.

(Prior=7) US prior U.S. Pat. No. 5,107,120 (89F=PIR head and sensing range design) Tom U.S. Pat. No. 5,107,120 which is out of date PIR design. The current invention only using 1 single PIR can cover the 30 to 270 degree range. So this is not able compare with current invention. Claim 40 had add the (Single PIR) motion sensor.

Also, U.S. Pat. No. 5,107,120 by Tom described an invention of passive infrared detecting device which uses different methods than the current invention to reach up to 180 degrees' field of view, however, the current invention includes a Fresnel design and single PIR to reach the field of view of 270 degrees.

(Prior=8) US prior U.S. Pat. No. 5,946,404 (98F=For School Bus use) Bakshi device for school bus use. This is not same as the current invention for the home or hand carry products. So, this is not comparable at all. Also, the Wi-Fi definition came out on 1997 for 2.4G 2M which there had no any device came out from market at all, so it has out of date for the Wi-Fi or internet can transmit big size of the full color digital data at that ancient time. Also, U.S. Pat. No. 5,946,404 by Bakshi et al. described an invention consisting a transparent glass and a dummy camera with video and audio recording ability, this is different from the current invention due to the current invention does not include a transparent glass, the current invention has a Fresnel included in front of the motion detector to reach maximum 270 degrees. The Bakshi et al. invention uses the glass to further protect the camera and microphone included, the current invention uses the Fresnel to provide better motion detection for the device.

(Prior=9) US prior U.S. Pat. No. 6,100,803 (99F=Ceiling Light fixture with Motion sensor unit) Chang device for the Lighting fixture base had built-in motion sensor set to turn on Bulb and the light device has one electric connector 13 for directly electrically connecting with a common bulb socket. (the column 2 line 38 to 40) so the power is get from the Bulb socket AC current. Which is not same as current invention power source which is not from the Bulb socket (13). Chang also lack any camera. Chang filed on 1999 and at that time no any Wi-Fi or big or wider channel band can send out the full color HD colorful image though the any wireless station or the related network, so Chang device is not comparable with current invention. Also, U.S. Pat. No. 6,100,803 by Chang described an infrared warning detector consisting at least two of each lights and detector. The Chang's invention does not include a camera mean as the current invention does, and the Chang's invention has no digital transmission means as the current invention does. Chang's invention also consist bulb socket AC powered light device, which the current invention does not limited the power source to. Chang's invention has different purpose which is to illuminate the surrounding and provide sound alerts to remote areas, the current invention aims to store any digital information and data to provide safety for the designated areas of the customers' choices.

(Prior=10) US prior U.S. Pat. No. 7,321,783 (03F=internet or wireless for mobile not Wi-Fi at home) Kim teach a mobile entertainment and commination device on Nov. 20, 2003 which for palm-held size housing has a cellular or satellite telephone capable of wireless communication with the internet. This is not the Permanent installation for current invention for home installation or hand-carry flashlight device. Kim device also built-in display screen and speaker and earphone, those all for phone construction, so no comparable with current motion sensor security light device. Also, U.S. Pat. No. 7,321,783 by Kim introduced a palm-sized, cellular phone-like device which can transmit digital data and record sound and take pictures in an ambiguous measurement of distance. This patent was allowed on Nov. 20, 2003, which 3G, 4G and Wi-Fi has not yet been introduced publicly like in the modern days, so the methods of transmitting the digital data are different. Kim's design differs from the current invention also, when the current invention uses illuminations to capture nature color images, but Kim's design does not include any illumination (flash lights, LEDs, etc.) Lastly and furthermore, Kim's designed his or her invention on the purpose of entertainment, for recording musicals, the current invention was designed for area security which have the same bases but different purposes.

(Prior=11) US prior U.S. Pat. No. 8,461,991 (10F=plurality of adjacent sector for Fresnel+reflector for light source)

Both a device for multiple PIR sensor head with multiple Fresnel windows to sensor the moving objects and through the Circuit to make the said top Light device to emit the light because the 2010 filed by the Both a used old and out of date the PIR sensor which only can cover small area from FIG. 3 seems only 90 degree so Both a need use a movable mechanical to change the PIR head to different directions to check the desired wider area (180 degree) and whenever the PIR change to different direction, The front Fresnel lens also need to change position to match inner PIR sensor head, so need multiple window surrounding the 180 degree and use many Fresnel lens. This is different with current invention only use ONLY ONE PIR sensor head which can cover from 30 up to 270 degree. The current invention had update for PIR sensor head so no need the so expensive mechanical to make moving or rotating for PIR and need a lot of Fresnel lens through a lot of window. So, this is not comparable with current invention for 2 different technical Both a is out of date ancient device and current invention had update good PIR so no need motor, no need moving PIR head No need a lot of Fresnel lens and Fresnel window.

Both a also lack the camera and Wi-Fi and movable SD card and download device to wireless transmitting concept at all. Also, U.S. Pat. No. 8,461,991 by Both a described a security light device which includes a motor to turn the light source for better tracking and on-spot illumination. This is different with the current invention because the current invention has advanced optical Fresnel technology to reach maximum of 270 degrees for the motion-sensor or the moving-detector to search the surrounding for possible hostile situations. Additionally, the Both a invention does not include any storage means or transmission means such as SD cards, etc. and 4G, Wi-Fi etc. which are mentioned above and included in this current invention. Therefore, the Both a invention and current invention are not the same.

(Prior=12) US prior US2003-019-7807 (Camera adaptor has bulb socket to receiving existing Bulb) Wu item one camera (110) built-into adaptor (102) which can receiving-end (106) the separated existing bulb (108) and other end has male bulb screw base (104) and top had front door lantern housing. The Wu products as (0010) Line 6 to line 9, the system can also include a display device connected to the network transceiver to accept and display the digital image information. This means the wireless communication is too big size at that old time maybe the format still at AV or other old time date which too big to send old time network so from Wu's (network power line modem 220) on FIG. 4, 5, 6, 7 need the (Modem 220) to help go get the image. However, the current invention transmitting the digital data by MP4 or more advanced technical for image format and transmitting by wife or more advanced channels than Wu's old time technical.

From electric technical the MP4 or higher image format definition start from 2001 for 1.sup.st phase and current invention use at least MP4 for higher technical and use Wi-Fi to delivery so it only short time can receive the digital data and no need the (connect AC outlet to get AC power for network powerline modem 220). Back to Camera installation. The Wu application use out of date camera so has narrow range so need to adjust the camera direction while the camera installed on the rotating or adaptor. This is different with current invention the said LED light unit or/and camera is semi-Permanently after first time install on location no need rotating because use wide angle PIR motion sensor and camera assembly.

The current invention has digital data had min. MP4 or equivalent format so can use Wi-Fi to transmit small file. Not like Wu's need through the (220 Network powerline modem) to get the image.

Also, US Prior number 20030197807 by Wu described a bulb base camera design which uses the bulb socket for AC current which can also use batteries and replenish the batteries. Wu's design also uses a flexible arm in order for the camera and internet computing device to fit into any screw-in bulb bases and to cover the desired area to carry out the design's function, this is different from the current invention as the current invention uses an advanced Fresnel design to reach maximum of 270 degrees of coverage in the front plane of the camera unit, so the current design do not require a manual-flexing arm for the camera to work properly. Wu's design also differs from the current invention as there is no (1) storage means for stored images and videos such as SD cards, TF cards, Cloud storages connectivity, USB drives, (2) network notification kits to cellular/smart phones for alerts and streams using at least 4G or modern internet services or Wi-Fi or Bluetooth (3) other power source kits such as prongs/wires. Therefore, there are numerous technical updates since the written date of Wu's patent compared to the current invention, the two designs are different.

(Prior=13) US prior US2005-008-5131 (03F=Existing electric device 1 add one adaptor 2 which has bulb base or prongs Sutherland product is make a new Screw base to fit the existing electric appliance into (See FIG. 1) and connect all existing appliance power wires or controller (FIG. 2 and FIG. 3) with the said new screw base. From FIG. 4 and FIG. 5 show the how to design a new screw base or prong base. So, this prior art does not have any similar from construction, camera, image, LED light and further for the digital data, Wi-Fi wireless transmitting, storage device SD card or display or reply with current invention.

Also, US Prior number 2005-008-5131 by Sutherland described a lighting fixture that connects to a junction box. This is totally different from the current invention as the current invention can be placed anywhere desired with simple installation. Sutherland's design also does not include a camera unit, wireless transmitting digital data unit, storage units, which are the main functions of the current invention. Therefore, the two designs are not similar at all.

(Prior=14) US prior 2007-025-7195 (07F=has many non-adjustable detector and camera to combine one monitor system Reibel products show is security system has (1) controller to communicate with security-monitoring device. The monitoring device and controller is separate units and away from each other form FIG. 1 and also connect with all other peripheral communications.

This is not same as any one of current invention claims for (1) Security light has everything inside housing (2) Individual Motion sensor-unit (3) camera assembly for each item can take at least MP4 format image, sound, audio and use Wi-Fi to be transmitting out digital data and let receiver device can instantly to see or review or display or print out.

Reibel also has no any light device to help the monitoring device to have sufficient brightness to take a full color at least MP4 format color image to easily and instantly send to receiver to see at once. (15) US Prior 2008-015-1050 (07F=Motion take camera and send to computer center to Mobile=No light Self device have to work with Computer to make the capture image into JPEG format for the still image, or use computer to capture video into MPEG or MPEG2 format to wire transfer (0029) and (Claims).

This is not same as current to take image at least has MP4 format and can instantly directly wireless transmitting by Wi-Fi, and send by APP software including skype, line, WeChat, WhatsApp, twitter, Instagram to mobile phone to review or display or printing. Self also did not show and discuss for any of LED light device to help the camera assembly to take full color at least MP4 format digital data under low or dark environment. So Self camera only can take out of date Black and White at dark or low brightness environment.

Also, US Prior number 2008-015-1050 patented to Michael R. Self, entitled "Enhanced Multimedia Intrusion Notification System and Method" describes a notification system which signals portable phones through Multimedia Messaging System (MIMS), which can only send pictures, media files, or videos, up to 40 seconds at a super slow service speed. Michael R. Self's invention differs from the current invention due to the current invention has Wi-Fi function which allows the invention to connect to home or nearby Wi-Fi network, which is fashionable in the year 2017, and notify users' cellular phones or smartphones through the internet, which requires the said phones to include at least 2G, 3G, 4G, 5G, Wi-Fi, and/or Bluetooth, or future internet connectivity services to be introduced. Michael R. Self's invention also does not include a light unit for brighter illumination of dark areas during any given hour, the current invention includes LED bulb for illumination of dark areas to achieve full color, high resolution, and color-accurate pictures or videos provided to users at any time.

(Prior=16) US prior 2008-022-5120 (The 31 is outside the device) Stuecker products is not same as the current invention the Security light system (10) has motion sensor (30) and a direct electric powered security module (31) incorporating a storage device (63). From FIG. 1 can clear to see the direct electric powered security module (31) is located on the separated location and plug into wall outlet (21) to get AC power and transfer into (DC power). This is not same as current invention all the circuitry is inside the said security light.

Also, can see the Direct electric powered security module (31) has the all parts including digital camera mechanism (50), Transformer (61), Battery (62), Storage device (63), Antenna (64), Transceiver (65), security code switch (66) all built-inside the Direct electric powered security module (31) this basing the out of date technical. Not like current invention for all digital data has MP4 format and use Wi-Fi channel and APP software so can easily wireless transmitting out the MP4 format for digital data image.

SO, this is not comparable with current inventions. Also, US Prior number 2008-022-5120 by Stuecker's design consist a network transmission towards telephonic companies then towards the cellular phones (Claim one). This point is different from the current invention because the current invention uses Wi-Fi, 4G LTE or modern internet services, application data notifications, Bluetooth to notify a cellular or smart phone device, not going through telephonic companies like Stuecker's design is. Also, in FIG. 1 of Stuecker's design, it is clear to see the direct electric power (DC) is located on a separated location and plugged into a wall outlet to get AC power into DC power. This is not the same as the current invention, which uses more modern technology to fit every circuitry inside the main housing of the invention.

(Prior=17) US prior 2008-025-2730 Hong product the illuminator (109) is supplied with an AC current from the AC power source (144) via a relay (148) which switches the AC current for the illuminator (109) on or off as determined by digital camera processor (140) at column (0025) line 1 to line 4.

This is different with current invention. The current invention LED light will turn on or off basing on the motion sensor detected moving object under low brightness environment (judge by one simple photo sensor or photo diode). No need to passing through any IC. Hong has an image sensor 152 such as CCD or CMOS sensor is controlled by the digital camera process (140) which is too expensive for the current invention.

The current invention just activated the camera assembly whenever the moving objects been detected by only one motion sensor, no such expensive device. Hong connect with the PIR (166) and image sensor (152) and light sensor (156) with digital signal processor (140) which is different with current invention for simple use motion sensor or-and switch to turn on the LED light or-and camera assembly. Hong product also has USB ports to connect with unit so can get uploading the digital image to a personnel computer. This is not workable for the security light always install on high position and difficult to work for this USB wire to upload or download the digital data. Hong products also need memory card, but not just like current invention just save all the digital data inside the movable memory card while need to see inside digital data than use a USB wire to download or upload from high position security light So these are difference with Hong products. Furthermore, Hong did for AC powered source. Not discuss battery operated unit. Hong also did not have any wireless transmitting at least MP4 format digital data to receiver by Wi-Fi or-and software APP such as skype, line, WeChat, WhatsApp, twitter, Instagram for instantly got digital data to review and display or print out.

Also, US Prior number 20080252730 by Hong product the illuminator (109) is supplied with an AC current from the AC power source (144) via a relay (148) which switches the AC current o the illuminator 109 on or off as determined by digital camera processor (140) and (0025) line 1 to line 4) This is different with current invention. The current invention LED light will turn on or off basing on the motion sensor detected moving object under low brightness environment (judge by one simple photo sensor or photo diode). No need to passing through any IC. Hong has an image sensor 152 such as CCD or CMOS sensor is controlled by the digital camera process (140) which is too expensive for the current invention. The current invention just activates the camera assembly whenever the moving objects been detected by Only One motion sensor. No such expensive device. Hong connect with the PIR (166) and image sensor (152) and light sensor (156) with digital signal processor (140) which is different with current invention for simple use motion sensor or-and switch to turn on the LED light or-and camera assembly. Hong product also has USB ports to connect with unit so can get uploading the digital image to a personnel computer. The current invention includes the usage of memory cards. Hong products also need memory card, but not just like current invention just save all the digital data inside the movable memory card while need to see inside digital data than use a USB wire to download or upload from high position security light. So, these are difference with Hong products. Furthermore, Hong did for AC powered source. Not discuss battery operated unit. Hong also did not have any wireless transmitting at least MP4 format digital data to receiver by Wi-Fi or-and software APP such as skype, line, WeChat, WhatsApp, twitter, Instagram for instantly got digital data to review and display or print out.

(Prior=18) US Prior 2011-013-4239 (Street light)

VaDai products application for street light so all the application, construction, installation, and light output power and power consumption is different than the current invention and it also different for light need turn on from dust to dawn which is not workable for current invention which powered by motion sensor under low brightness environment only.

So this is not comparable and no any point is similar or can be replaceable. Also, US Prior number 20110134239 by Vadai products application for street light so all the application, construction, installation, and light output power and power consumption is different than the current invention and it also different for light need turn on from dust to dawn which is not workable for current invention which powered by motion sensor under low brightness environment only. Vadai's invention also contains a heat sink, which is not in inclusion of the current invention. Vadai's invention also contains a temperature detector, which is not included in the current invention, which will also increase the cost for the total product, which is not the point of the current invention. Vadai's remote surveillance design contains no storage means just or it is ambiguous, which is different from the current invention in inclusion of SD cards, USB drives, Cloud storages, and etc. mentioned above.

(Prior=19) US Prior REBECK Michael U.S. Pat. No. 8,203,445 and its Child Filed cases (Radio Frequency application)

U.S. Pat. Nos. 8,023,445, 8,362,713, 8,415,901, 8,491,159, 8,519,566, 8,669,716, 8,764,242, 8,829,799, 8,994,276, 9,066,393, 9,074,736, 9,078,313, 9,236,767, 9,247,623, 9,247,625, 9,252,595, 9,338,839, 9,342,967, 9,351,353, 9,392,669, 9,408,268, 9,543,788, 9,544,967, 9,807,858, 9,860,965 All device basing on Radio Frequency transmitter (RF) and receiver application for lighting device which lack of the camera and had digital-data including full color video, image or photos with or without the audio digital delivery by 4G or 5G with wifi or-and wifi-extender for delivery the full color image/photos to cloud device as current inventions. These group filed case is not same and timing is not match the wifi, 4G/5G, cloud, related lighting controller which can use download APP so these series filed case is not same as current invention basing on the equipment been created at right timing.

, the current invention utilizes an power source provided by (1) an alternating current (AC) electrical outlet which the current LED light device has built-in prong plugged into outlet, or (2) LED light has a screw-in base to screw-into AC bulb-receiving socket, and/or (3) The LED light has conductive wires to get AC power source, All of them of prong or bulb base or wires is connected with circuit converting the AC power to direct current (DC) power to offer the power to said LED(s) for illumination.

In addition, the current invention incorporates a low cost, super compact Digital Video (DV) device (hereafter as DV) or any camera or same function products available at market place such as (webcam) or (driving Cam) or (Go-Pro) or other camera device, which is parts or whole unit built-into the said LED light device and preferred the camera is tiny head with tiny size so like hidden-camera built-in the said light device so bad man cannot easily find while get into people house so can solve the problems of high cost and difficult installation, eliminating the need to hire professional engineers at high cost per hours and saving wasted time in waiting for an installation appointment and never-understand setting procedures.

The current invention can transmit digital data from the digital camera to the display unit while receiving power directly (1) from built-in prong of the DV or any camera or (2) from a screw-in base or (3) from other conductive skills to connected with an AC power source through the AC-to-DC circuit to provide DC power.

The current invention preferably also provides (1) Low-cost model: a DV or any camera device having a camera and display screen in one unit so that there is no need to spend cost for transmission by wireless device for most economical model for variety of low-income person. Or, (2) All digital data got form camera can store within the memory unit such as SD or Micro-SD card or incorporate with Cloud storage station and can show image while take it out and connect with display software. Or (3) the preferred update model can use blue-tooth or other device or USB wire assembly to download the digital data storage inside the memory unit such as SD card or Micro-SD card or other data storage kits. Or (3) It also can use rounder or Wi-Fi wireless assembly to build with camera, storage unit including incorporate with Cloud storage station through communication system and APP, market available software, server, cloud storage station and send out or receiving digital data or use wireless assembly including but not limited for the email, skype, we chat, what's APP, twitter, face-book, Instagram, 17 platform or conventional platform so can make more functions including but not limited such as dial phone, call police, adjust camera operation, adjusts light functions, and transmit the digital data to desired consumer, computer, communication devices including phone, laptop, display screen, etc. for high-end products who willing to pay for.

The current invention mainly to design for light device has different parts built-in on the said light device for low-end, middle cost, high-end cost version for different functions and parts. (A) The preferred functions as below listed; (1) digital data storage into memory card, when needed take inside memory card or SD card or Micro SD card to display device to check digital data. (2) digital data can download by Bluetooth or USB wire assembly or other electric device into communication device(s) including phone, computer, display device, laptop, monitor. (3) Digital data can use wireless communication assembly to send out message, data, alert, words, sound, image to variety of communication devices including mobile phone, computer, monitor. Or, can multiple ways communication though wireless network, 3G or 4G or update wireless network, WIFI, Router, cloud storage station, incorporated with APP or other platforms to increase more function(s), wireless network or internet equivalent or same function wireless network.

Because the DV or any type camera is built with or built-into the light device, and may including an LED light, LED bulb, lamp holder, LED flash light, LED garden light, LED entrance door light, LED patio light, LED floor light or other light source or the LED illumination device, the invention offers excellent home security for low-end, middle-end, high-end with simple installation. One advantage is that a bad man into and cannot easily find the preferred hidden-installation the said DV or any type of camera from among a variety of lighting related device(s) such as lamp holders, LED bulb lamp holder, LED flash light, LED garden light, LED entrance door light, LED patio light, LED floor light or light device on the wall or ceiling, and all the bad man's behavior been detected and recorded inside the built-in DV camera and storage unit so this will offering the best safety record to protect home and family at any time.

The storage unit's inside digital data can get by (a1) Get SD or Micro-SD card to connect with display software (a2) Incorporate with Blue tooth or USB wire assembly or other electric device communication to download the storage unit's digital data even can download from cloud storage station while incorporated cloud system. (a3) Incorporate with Wi-Fi or 3G/4G or current setting 5G network, rounder's wireless communication, storage into cloud by wireless network to transmit to digital device including phone, computer, laptop, display, monitor . . . etc.

Furthermore, every electric component for camera, circuit, blue-tooth, Wi-Fi, rounder and related APP communication parts & accessories all built-into or built-with the said light device and may has (1) Wi-Fi-extender for big house to help reinforce or increase the electric signal, or-and (2) the moving detector with its related software or interface to make the screen-comparison or-and detectors-heads comparison for selected area(s) to determined transmitting signal(s) to phone or communication device(s), or-and (3) The moving-detectors sensed the difference or moving on selected area(s) of screen or display of communication device including mobile phone or displayer of screen then transmitting pre-determined signals to owner or police or security authorities or neighbors or friend, or-and (4) moving detectors and its related software or interface can offer phone or communication device screen or display can selected-area(s) to prevent from the each car or each walking people or each animal passing through the device and trigger system to send out signals to communication device(s) and cause signal(s) send hundred times daily to annoy people. So moving-detector(s) with selected-areas feature as above discussion "Screen comparison" can let people to select the right areas or area(s) has moving-objects where is not interferer the people privacy, un-necessary signal(s) delivery, or false alarms for many time(s) to cause people live for troublesome and headache situation.

(#KKK-2011 U.S. Pat. No. 8,760,514) LED light device,
(#KKK-2 U.S. Pat. No. 9,197,865) LED light device+ Web-cam
(#KKK-5 U.S. Pat. No. 9,549,110) LED light device+ Garden light
(#KKK-1 U.S. Pat. No. 9,560,32), LED light device+ individual motion sensor/moving detector(s) salable unit
And plurality of co-pending case including
(#KKK-3) LED light+ Flashlight
(#KKK-4) LED light+ individual motion or moving sensor
(#KKK-6) LED light+ individual motion or moving sensor for multiple functions And plurality of CIP or Division filing.
or
LED bulb,
(#QQQ-2) U.S. Pat. No. 9,551,477 LED bulb has multiple layers
(#MMM-1 U.S. Pat. No. 9,541,260) LED bulb has multiple areas illumination
(#MMM-12 U.S. Pat. No. 9,541,260) LED bulb has multiple functions
(#JJJ-1 U.S. Pat. No. 9,010,986) LED bulb has built-in camera and digital data
(#QQQ-12 U.S. Pat. No. 8,834,009) LED bulb has extendable
(#JJJ-2011) U.S. Pat. No. 8,562,158 LED bulb has built-in camera and digital data
or
lamp holder or lamp socket adaptors
(#ZZ-2010 U.S. Pat. No. 9,033,539) lamp holder had built-in LED light
(#III U.S. Pat. No. 8,711,216), flashlight, garden light, entrance door light,
floor light, patio light string as current invention, parent filing or co-pending filing case disclosure. It is appreciated all the above listed current, parent, co-pending filing still fall within the current invention scope and claim covering.

Other embodiment of the current invention, the DV or any type of camera can include an endless recording that overwrites past digital data so that it will always update new data without the need to change any storage means, so long as the initial installation is selected for certain hours of recording and certain minutes for the storage section. Or even can incorporate with cloud storage station so can save and pick-up the digital data for super big number of file at any time.

The preferred DV or any camera device may have the most advanced technical features at least has MP4 or higher rank format and functions can increase while make proper arrangement and incorporate below parts for any combinations into basic LED light has camera device which may include any combination of a (F1) wide Angle or telescope lens assembly and fine pixel/HD (1280.times.720 Pixel)/VGA (720.times.480 pixels)/good display screen (320.times.240 pixels) with a light weight, rechargeable batteries, and anywhere from 1.3M up to 12M or more pixels to provide VGS or HD video or ISO selection; (F2) auto focus/tilt/rotating/moving/scan functions; (F3) a motion sensor by PIR detector; (F4) a moving sensor by one or pairs or more detectors and comparison; (F5) a night vision selection (IR or equivalent or same or replaceable device); (F6) auto power shut-off with IC or timer application; (F7) power saving; (F8) built-in screen; (F9) USB assembly for data delivery including wires, USB port, USB output ends and software and hardware; (F10) remote controller including IR or RF remote assembly; (F11) wireless data transfer to a remote cellular phone/computer/communication device(s) including remote controller, Bluetooth, Wi-Fi, router, wireless transmitter and receiver device or wireless communication including Wi-Fi, 3G, 4G or future available network for wireless equipment and also including APP software, platform software, cloud storage station. The wireless communication including mutual ends communication, software setting, hardware or software communication. (F12) auto dialing to a police station or send emails or send line-message; (F13) auto tracking of moving object(s) from ants to elephants or other live objects; (F14) other light means/device(s); (F15) other wireless/remote/IR sensor/PIR sensor/motor(s) features; (F16) any other electric or mechanical functions available from the marketplace for a digital camera or digital video recorder.

Any or all such features may be selected and incorporated with the preferred DV or any type of camera device to make sure people can see, know, and watch the desired site/events at any location/place/time.

The current invention further has other features or improvement while incorporate with MP4 format, Wi-Fi, 3G/4G/5G and internet network, download from internet for APP and software or other software for platform application, cloud storage station as below:

The DV or any type of camera device may have a plurality of cameras to provide multiple images that can be shown on a screen so as to monitor multiple areas and selected the area(s) where will not interferer the neighbor, not interferer the people privacy, not send out non-necessary alarms or send signals to owner, so this is features the said LED light device has this pre-determined design or related hardware or-and software design of APP. The said one of embodiment for outdoor security light has built-in motion sensor or-and other sensor to turn on the said LED light source and has the moving-detector to comparison the screen(s) incorporated the related soft-ware, APP or IC to send accurate alarm or signal can prevent from false alarm made by animal, passing through cars, out of house territories range moving objects for hundred or thousand time(s) non-necessary signals or alarms. It will also be appreciated that the DV or any type of camera device can incorporate an IC chip and related circuitry, motor-, and a motion-sensor or moving-sensor with more than one detector heads to detected or comparison difference so allow a single camera head with auto tracking functions to follow moving objects.

A preferred embodiment of the built-in DV or any type of camera device of the current invention includes an LED bulb and lamp holder, flashlight, garden light, entrance door light, floor light, night light or variety of lighting device to provide an LED light device, night light, or security light which has prong or socket or conductive wire to connect to (1) an AC power source or (2) a big capacity DC energy storage device which directly supplies current, or (3) a rechargeable big capacity power storage device such as a rechargeable battery, and which also may incorporate with any other separate parts & accessories such as wire(s), adaptor(s), or transformer(s) to deliver electricity from the AC power or big DC electricity storage unit source to the LED device and built-in digital data device.

Furthermore, the AC power source (AC application) or DC big electricity capacity storage unit (battery operated application) may use (1) prong, (2) a AC or DC bulb socket base or lamp holder, (3) conductive wires or parts, or (4) a USB-cable that directly comes out of the light device housing, or (5) a regular 120 Volt 60 Hz plug AC wire that directly comes out of the light device housing and connects with the public electricity system for home, house, and public areas.

The electric delivery between light device and AC or DC power source may select any available type from convention market for all kind of skill and method and kits.

One of the best applications for the current invention is as a webcam that already used for all kinds of computer, laptop, phone, or communication equipment. Or driving-Cam already use for all moving traffic device. Both are not expensive like the street police department use Traffic-Cam. Conventional webcams are limited in that they cannot follow moving people or moving object so people have to sit in front of the webcam to talk with people. After incorporated with current MP4 image format+ Wi-Fi or 3G/4G/5G or-and internet network+ storage assembly including Cloud storage station+ download from internet of APP and related software by phone or computer owner, or other update software+the optional moving-detector with screen-comparison and selected-areas+incorporated with LED light device and camera device will become perfect visual products to let consumer pay the less but get the maximum protection for properties and personal safety.

Furthermore the current invention make big improvement from marketing simple LED light or Simple Camera/DV device including solve below major issues:

(Solve 1)

The webcam or any type of camera for prior arts lack of the brightness during the night time or dark environment, so have bad photos, image to be seen at dark or night time environment. The current invention has LED light sufficient light so can take the MP4 or more update high speed image to deliver out while the motion-sensor or moving-detector hard-ware or-and related software or interface with optional selected-area(s) to prevent non-necessary electric-signals transmitting to communication-device(s). The said moving-detector(s) hard-ware or soft-ware can detected the moving objects so can take full color even the Full HD image and can instant to deliver to consumer mobile phone or other communication device(s).

(Solve 2)

As for convention security light such as health Zenith®. motion sensor LED or PAR38 bulb or halogen light device for outdoor security light device lack of the camera took at least MP4 format data, storage unit, memory card, incorporated with Cloud storage station, Bluetooth, WIFI, Server, Router or-and 3G/4G/5G network and update APP or other software to communication so all heath Zenith® products just a Motion sensor light device to offer the light only to show path to bad guys. Zenith® products lack of function to take MP4 format photo, image, sound, movement recording and replay function and all current invention teach Wi-Fi, router, APP, motion sensor or-and moving-detector with optional screen comparison and selection(s) and APP remote control or adjust or setting or selection or dial-out to police, friend or other people to take care house situation, so it is not really to keep people has good security and prevent bad man to do bad things.

(Solve 3)

The current invention preferred all the motion-sensor or-and moving-detector(s) with image-comparison or screen comparison products such as the motion-sensor or moving detector(s) lamp holder as FIG. 1A, 1B, 1C, 2A, 2B add the DV or any type of camera device & memory card or-and cloud storage station and APP with its remote control or selections so it will add only limited cost but become motion sensor security products as other issued U.S. Pat. Nos. 8,562,158, 9,010,986 and above listed LED light, flashlight, garden light, entrance door light, floor light, night light. Or for the LED bulb may has motion-sensor or-and moving-detector or-and other sensor and built-in the DV or other camera cloud storage station or-and movable or downloadable memory card and other optional wireless kits as U.S. Pat. No. 8,711,216. So to add the DV or any type of camera device & Wi-Fi with reinforce Wi-Fi-extension or-and memory card or-and incorporate with cloud storage station with optional different combination for Bluetooth, WIFI, 3G/4G/incoming 5G network, Router transmitting or receiving kits built-into light related products including LED bulb, lamp holder, LED Flashlight, LED garden light, entrance door LED light, lamp holder adaptor, Light device which the said all related for offering the brightness for dark or night time illumination so can make the DV or Web Cam or IP Cam or Driving Cam or any type of camera device can has sufficient brightness to take full color photo, clear video into memory cards or memory unit. This also overcome the Night Vision design to use the IR or photo diode to makeup the dim or dark brightness but such design normally make the photos or video only become BLACK and WHITE with not-clear photos or image. So, Add the DV or any type of camera device and APP and screen-select areas for comparison or-and other related parts & accessories as above discuss or parent, co-pending, patented is the best combination than other IR night vision design.

The alternative design of the current invention to make an individual motion or-and moving sensor unit to incorporated with any light source of existing light device. The said individual motion or moving-detectors or other sensor unit has built-in camera, cloud storage station, APP software, moving-detector hard-ware or-and software to make screen or image comparison for selected-areas of screen or image can prevent non-necessary signal transmitting to owner, motion sensor for turn on and turn off LED light source, for cheap model has built-in movable or downloadable memory unit, and optional wireless communication combinations as desired functions such as APP with remote-control functions and cost so can replace all marketing non-camera light device to upgrade to become has built-in camera device to increase the safety and functions. The individual motion-sensor or-and moving-detector or other sensor unit which also can assembly for any existing light device is also fall within the current invention.

(Solve 4)

The other problem for IR night vision is not perfect than use existing light device to offer brightness for dark environment or night time to take photos or video. The IR night vision has major problem for power consumption for stand-by or operation, and more worse issues IR high vision also have high heat problem and distance range too short issues and finally is expensive cost issues.

To add only the camera and wireless to put digital data into cloud storage station or movable or downloadable memory units into existing all kind of light source light device has no such issues. So, the current invention preferred to add camera and wireless connect with cloud storage station or movable or downloadable memory unit and optional wireless transmitting & receiving kits is the best combination.

Also, there is no need to make one new security camera with memory unit with optional wireless device. Because majority house, home, public building had all kind of existing lighting so just add or replace the current invention's individual motion sensor unit which has key Camera and system so can make all existing lighting become more useful lighting device. The said existing light device including outdoor motion sensor security light, LED flashlight, LED door entry motion sensor light, LED motion or moving sensor night light, motion sensor anywhere light which can have plug-in or battery or wired or outside transformer or outside adaptor or other power storage unit to supply the sufficient power source to make all kind of light source light device for motion activated light device.

(Solve 5)

The current invention such as FIG. 3A, 3B, 3C and FIG. 4A, 4B, 4C the LED bulb as normal market LED bulb has built-in the current invention preferable (1) camera can take min. MP4 format image, and (2) memory unit or wireless incorporate with cloud storage station, and (3) with optional wireless communication kits. (4) motion-sensor or preferred switch or sensor for turn on and turn off the LED light source (5) Furthermore the LED light device has related parts or software to let people to have optional screen or image comparison moving-detector system for preferred selected-areas. The preferred the camera is so tiny diameter for lens so it become almost called "hidden camera" or "pin-hole" camera so not easily to be found by bad man while interrupted into home, house, building while do the bad things. Especially, the current invention products apply for outdoor including garden or front entrance door or garage or back door will 100% can take bad guy full color image because bad guy wear the mask because light device offer sufficient light and camera take full color photo at the same time while motion or moving sensor triggered at night or dark environment at outdoor areas.

Same as applications for Lamp holder, lamp holder adaptor, all kind of lighting as list on this invention. The preferred the camera is belong to hidden-camera or pin-hole camera so not let people easily find the location of the security camera and destroy it. This is other feature for the current invention to overcome market camera location been notice and destroy by bad man.

(Solve 6)

From FIG. (8A)(8B) show the portable Flash light has built-in DV, memory unit, and optional wireless communication such as WIFI, 3G or 4G or future wireless transmitter or receiving kits to offer the police or army or military or security person can have the super bright light source to incorporated built-in DV and memory unit and optional wireless communication to incorporate with cloud storage system and 3G/4G/incoming 5G network or more high-tech settle-lite networks or army own network or channels to take photos, take video, offer on-line image though the optional wireless communication to the viewers to see the record or on-line or on-air instant live image to make sure the safety and status while people use the flash light. While use for Army or Military purpose the DV or Camera can incorporate with above discussion for night time or dark environment to use the (1) Visible flash light beam to offer brightness or (2) unvisible IR or photo diode to make the dim or dark environment to show the surrounding status and not let enemy see the Visible light beam and shoot the army or military team and persons however the un-visible IR or Photo diode still can offer black & white or green image so still become 2.sup.nd choice but for battle field it is OK, however still need incorporated current invention disclosure the MP4 format image+ cloud storage station+ high speed wider channel wireless transmitting including settle-lite system+ APP or update software or plate-form(s)+ displayer device+ good communication device so can see all status at everywhere at any time.

The flash light offer super good brightness let the DV or camera or IP Cam or driving Cam or Web-Cam can take nice photos, video, on-line message with colorful image to viewer even Full HD or higher so can become court case evidence which superior than IR night vision device for only black & white. Same for other lighting device did as above discussion. This is offer the portable flashing light or wearable flashlight for people to report or send out image by wireless communication equipment to the phone, computer, screen, communication equipment to report the people status or environment at the dark or evening environment.

This is unique features and the power can be DC power source or rechargeable Power source or wireless recharge power source by market available charging or battery storage units with sufficient big capacity of the electricity.

(Solve 7)

The current invention for light device has communication assembly which have multiple-ways communication functions while incorporate with related or update software such as APP so can increase function including (a) talk though the security light (b) control the camera angle, position, focus, orientation, setting, adjust details (c) send out email, alert, words, talk, chat, dial to police station, connect with government utility service though the existing wife, router, internet, wireless network, 3G or 4G or future wireless network, even for settle-lite channel or military special channel, so can check all areas or locations status at any time though the wireless communication assembly or kits or device which built-in or built-with on the said security light to make the digital data can be communication.

(Solve 8)

The separate and individual the motion or moving sensor has built-in or built-with digital data device(s) and camera(s) related parts and accessories can let all non-camera motion sensor can upgrade to the built-in or built-with camera(s) motion sensor security light while replace the current invention built-in camera motion or moving sensor unit assembly with the other light source set, so can let consumer use the less cost to get the upgrade motion sensor has built-in camera to increase the home, house, office, environment space safety for less cost increase. Even, People can hang or put a sign, a sticker on the front house to show (Smile the hidden video is recording now!) to get the bad guys away from the residential house or office or business areas.

The current invention make the combination for the non-expensive and whole existing unit or selected parts & accessories of compact size of the Web Cam or DV or Driving Cam to put into or assembled with the existing or old light device so solve the all above list issues and most important this arrangement total solve and upgrade all non-camera light device which are (1) lack of brightness to take good photos at the dark environment (2) Add the camera, memory means, power storage unit, wireless transmitter & receiver, Bluetooth, WIFI, Rounder, motion sensor will total increase safety for properties and people so this should save a lot of money for Federal for overtime work of police to find witness while bad thing happened.

Also, the preferred embodiment of the current invention that provides a USB-cabled light device with a camera head having an auto tracking assembly will make an excellent auto-tracking webcam to let people freely move while talking with other parties.

Another preferred feature is to include foldable or retractable prongs so that the device can be carried anywhere such as (1) flashlight (power fail or inductive charged type or motion sensor or other multiple functions type), (2) Night light or (3) night light has USB charger products or (4) plug-in outlet with built-in rechargeable light products or (5) screw-in bulb receptacle or receiving socket LED light device has built-in hidden camera assembly. The current invention may have different constructions that provide an LED light with a built-in digital data device capable of being moved and used anywhere, including a car, motorcycle, boat, bus, truck, or other transportation equipment or outdoor activities. The carry or portable Light device as long as has (a) the foldable or push-in/push-out prong or (b) screw-in base with switch on-off products is incorporated with a proper receiving-ends and adaptor or receptacle or socket, or (3) has male cigarette plug or male USB plug to connect with cigarette lighter or USB-port female receiving end or socket so those (1)(2)(3) can has maximum functions and can take photos by sufficient light from unit with compact camera built-in and optional current invention discussed parts & accessories to make more than 2 function carry on anywhere good products.

Furthermore, the DV or camera device may have a variety of functions, parts, and accessories to get desired functions. The DV or camera device parts and accessories may be selected from different camera heads, kits, lenses, optics means, Lens assembly, night vision means, means for detecting motion by image screen or motion sensor, vibration sensors, sound sensors, storage means, SD cards, Micro-SD cards, memory sticks, memory means, operation functions, power saving circuits, screen touch panels, exposure means, and/or motor means, as well as means for adjusting or selecting clearance, pixels, sharpness, ASA, and so forth. Another preferred embodiment of the DV or camera device of the current invention is to add the DV or camera device to a lamp holder and LED bulb. A majority of Varity light source lights and lamp holders are installed at a position which is higher than people's height, so that they will easily record moving objects without any objects blocking the camera shooting directions. Furthermore, the current invention not only can provide an LED bulb or lamp holder with a DV or camera device, but also for all kind of market available variety of light source light device including a night light that incorporates at least one of wider angle camera so that it can look for moving objects from an unnoticeable position.

The current invention also can apply more than one camera head with a divided image on screen to save cost or use only one camera head that incorporates more than one sensor-means and an IC circuit to calculate a position or orientation difference to delivery electric signals to a motor-means to move the camera head toward a moving object and thereby provide an auto tracking camera. Still further, any equivalent or same function will still fall within the current invention and can be added to the preferred DV or camera device devices to provide nice, clear digital data and storage into a memory-means powered by an unlimited power source without causing worry about battery power or bad electric wire installation, unlike the conventional home security equipment.

In embodiments involving a lamp holder, insert parts may be provided to connect with an original lamp holder's receiving socket to change the lamp holder's current, functions, current type, voltage, and features, such as changing from AC to DC at a certain voltage and amperage, adding cameras and related parts and accessories, adding LED device current triggers, adding IC chips to operate desired functions, adding a tracking motor device, adding a motion or moving sensor(s), adding remote control parts and accessories, adding an infrared nighttime vision function, adding memory means with related parts and accessories, adding display means, adding transmitter means to transfer digital data to a remote distance, adding auto dialing system, and adding an internet connect function or any other electric or mechanical functions based on market requirements.

The lamp holder may be selected from market-available items, and may hold one or more light means, including any of an incandescent, fluorescent tube, PL, CFL or LED light for use with a variety of different bases, which may be in the form of a screw base, bayonet base, two-pin base, twist base, or push and twist base. The lamp holder connected with the house or home or building power source when the lamp holder's insert is connected with the original lamp holder receiving means so that the power can be obtained from the original lamp holder's unlimited power source.

The camera incorporated with the lamp holder of this embodiment, like the camera of any of other embodiment, can consist of desired parts and accessories including lenses, optics piece, electric parts, mechanical units, circuit, integrated circuit (IC), data delivery system, data storage assembly or cloud storage station, USB assembly, cable, microphone, recorder, displayer, sensor for any type, PIR remote controller, IR remote controller, night vision system, flasher, switch, motion detector, moving detector sets, sound detector, photo sensor, motor, tracking assembly or other market available parts and accessories to allow people to get digital image, video, and audio data and record it in memory or cloud storage station or send/transmit the data to a communication device, computer device, receiver device, and/or display device to provide predetermined functions, effects, and performance.

According to another preferred embodiment, and LED bulb includes a plurality of LED-units that fit within a bulb housing having an appropriate shape and dimensions, and positive and negative electric contracts to get power from the power source when the electric-contacts connect with the power source and the power source is thereby connected with the desired electric parts and accessories, which may include circuit, IC, conductive parts, switch, motion sensor, moving sensor remote controller, IR or RF remote controller, or other electric or mechanical device to cause the LED-unit(s) and the camera to be activated with the LED bulb and it is appreciated that the LED bulb can selected all above discussed parts and accessories for its added parts and accessories and image can display for all the above-mentioned pre-determined function(s) and performance(s).

The LED bulb has space to install the camera on its housing by using or together with any of the following: joint kits, rotating set, connector, spin device, catcher, a gear-set, a motor set, controller, IC, moving sensor head(s), motion sensor, tracking assembly, memory assembly, displayer, screen, USB assembly, conductive parts, digital data delivery system, battery, rechargeable battery, power fail functions, or others to provide the camera that fit-into or built-into or built-with the LED Bulb to have desired functions, features, and performance.

The space in the LED bulb may include a pole(s), block(s), piece(s), and/or compartment(s) having properties that cause the bulb or space to be extendable, retractable, foldable, rotatable, and/or transformable so that the related parts and accessories can be increase more space to allow all parts & accessories can installed within and prevent from any block-object to interfere the wireless signal to delivery as co-pending and patents disclosure.

The camera may be turned-on and turned-off by moving or motions sensor, a PIR sensor head, moving detector head(s), more than one moving sensor head(s), remote control, switch, motion detector, vibration detector, heat sensor, and/or smoke detector, so as to take photos, video, and audio and provide colorful, clear, and sharp digital data to be saved in storage means, shown on a screen, shown on a wireless screen, shown on a monitor(s), or transmitted to a communication device, computer device, Internet device, or auto dialing device.

The LED-units, camera, sensor(s), remote controller, moving LEDs device, moving sensor, moving camera device, motion detection unit, heat detection unit, smoke detector unit, motor, auto tracking assembly, and so forth can be installed on a fixed housing, moving housing, or extendable housing, so as to provide a desired sensor range, distance, and angle with a variety of selection options for the camera's pixels, focus range, and/or pictures per second, for video/movie and sound/audio upon activation of the camera to shoot and store the digital data into the memory piece or cloud storage station, communication device, computer device, consumer electric device, screen, or monitor(s).

Finally, the light device including the Flash light as FIGS. 8A and 8B) has built-in Camera, memory kits, and optional wireless communication device may also take the form of variety of the light source light device selected from market available light devices such as a night light, desk lamp, floor lamp, down light, ceiling light, track light, security light, projection light, outdoor light, indoor light, LED light fixture, LED light bar, LED picture light, LED closet light, LED door light, LED garage light, LED motion sensor light, LED power failure light, LED motion sensor with auto tracking means, LED patio light, or any other LED light device available from the marketplace.

BRIEF DESCRIPTION OF THE DRAWINGS

FIG. 5AA show the side view for the LED light device has prong and how to make the movable prong so can change the sensor or camera shooting angle to desired areas.

FIGS. 6AA, 6AA-1, 7AA, 7AA-1, 7AA-2, 8AA, 8AA-1, 8AA-2, 9AA, 9AA-1, 9AA-2 show how to change camera shooting angle or sensor detect angle to desired areas while the camera or sensor angle is not up to 180 degree and the FIG. 6AA can cover from center to right or left around 60-70 degree total around 120-140 degree so need to have built-in movable prong to make the camera and sensor to cover right side from wall to right side 120-140 degree to get desire right side detection. This is not only for LED light device with camera, It also good for LED light device only has motion sensor to turn on and turn off the LED light source only without the built-in camera so can make narrow shooting or sensor angle LED light device become very useful and practically. This is big improvement for any prong sensor or camera LED light.

FIGS. 9AA and 9AA-1 and 9AA-2 show the other construction for LED light shape and how to make 180 angles adjust on horizon FIGS. 1A, 1B, and 1C show a lamp holder according to a first preferred embodiment of the current invention has built-in DV or camera assembly, memory cards and optional wireless communication device(s).

FIGS. 3A, 3B, 3C, 3D, 3E, 4A, 4B, and 4C show a third embodiment and all the FIGS. 1A, 1B, 1C and FIGS. 2A, 2B, and below all discussion for different LED light device of the current invention in the form of an LED bulb.

FIGS. 5A 5B, 5C, and 5D show another embodiment of the invention in the form of an light device has current invention's LED bulb.

FIGS. 6A, 6A1, 6B, 6C, 6D show a variety of different LED bulb designs which can have built-in camera-assembly and LED light sources to capture the colorful digital data under dark environment, and be powered by an AC or-and DC power source according to the current invention.

FIGS. 7A, 7B, 7C, and 7D show another embodiment of the current invention in the form of a light device having built-in digital data combination and powered by an AC power source.

FIGS. 8A and 8B and 8C show a foldable or retractable prong construction and details for Flash light or multiple functions LED light device which has built-in DV or camera unit, memory cards and optional wireless communication device(s) for security or military or army or police to use with different material and carry design so can easily hold, carry, attached on pocket, helmet, waist or weapons.

FIGS. 9A, 9B, 9C, 9D, 9E, 9F, 9G illustrate a size comparison for a traditional LED night light versus a plurality of current invention for Digital Video/Camera units which has all kind of light source for illumination powered by DC Power for light device has built-in camera kits, memory card, optional wireless transmitter to communicate system including wife, 3G/4G/incoming 5G/even for settlelite network, Cloud data storage station with preferred APP or software from variety of platform so can make expected function(s) for camera or light device by wireless system.

FIGS. 12-A, 12-B, 12-C, 12-D, 12-E, 12-F, 12-F, 12-H, 12-I, and 12-K show the individual separate camera-assembly or called motion or moving sensor-unit has built-in digital data device.

FIG. 13 show the multiple functions for current invention for any combination. The all features for each electric parts or accessories have details discuss on above but not limited for limited text inside this filing. It is appreciated that all the co-pending filing, patented parent, current invention all claim or disclosure should be fall within the current claims coverage.

Figure 1A:
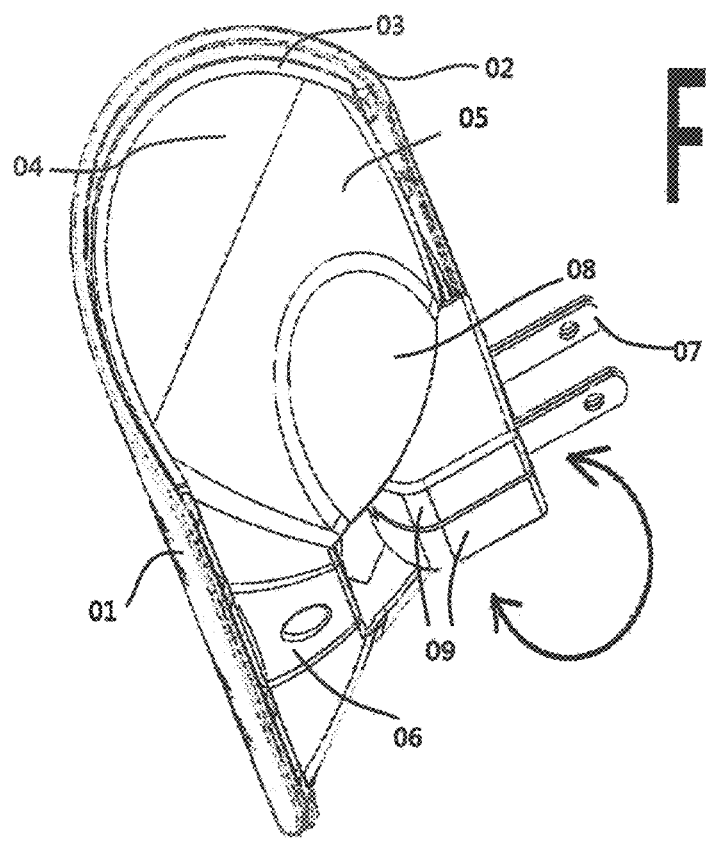
FIGS. 1AA, 2AA, 3AA, 3AA-1, 3AA-2 show the LED light device has built-in camera-assembly has angle adjustable to can make the narrow shooting angle camera or sensor to aim to desired areas while the LED light device has prong to get power source.

From FIG. 13 show the most important show the (1) phone owner down load APP and APP software (2) 3G/4G/5G or internet (3) Wi-Fi or WiFi-extend (4) cloud storage station (5) moving detector(s) for selected-areas for image or screen comparison (6) MP4 (7) sufficient light brightness supply from LED light source (8) All kind of camera device to offer digital data including photo, video, audio depend on what kind of combination for market requirement.

FIG. 14 shown the preferred the one of the PIR head with Digital not analog so can prevent from false triggers plus the software has optional image or screen comparison by motion detector(s) or moving detector(s) comparison features so can prevent any non-necessary electric signals transmitting to phone owner including (a) animals (b) passing cars (c) winds or planet (d) friend while has the screen or image comparison interface or software or pre-designed program(s).

Figure 15:
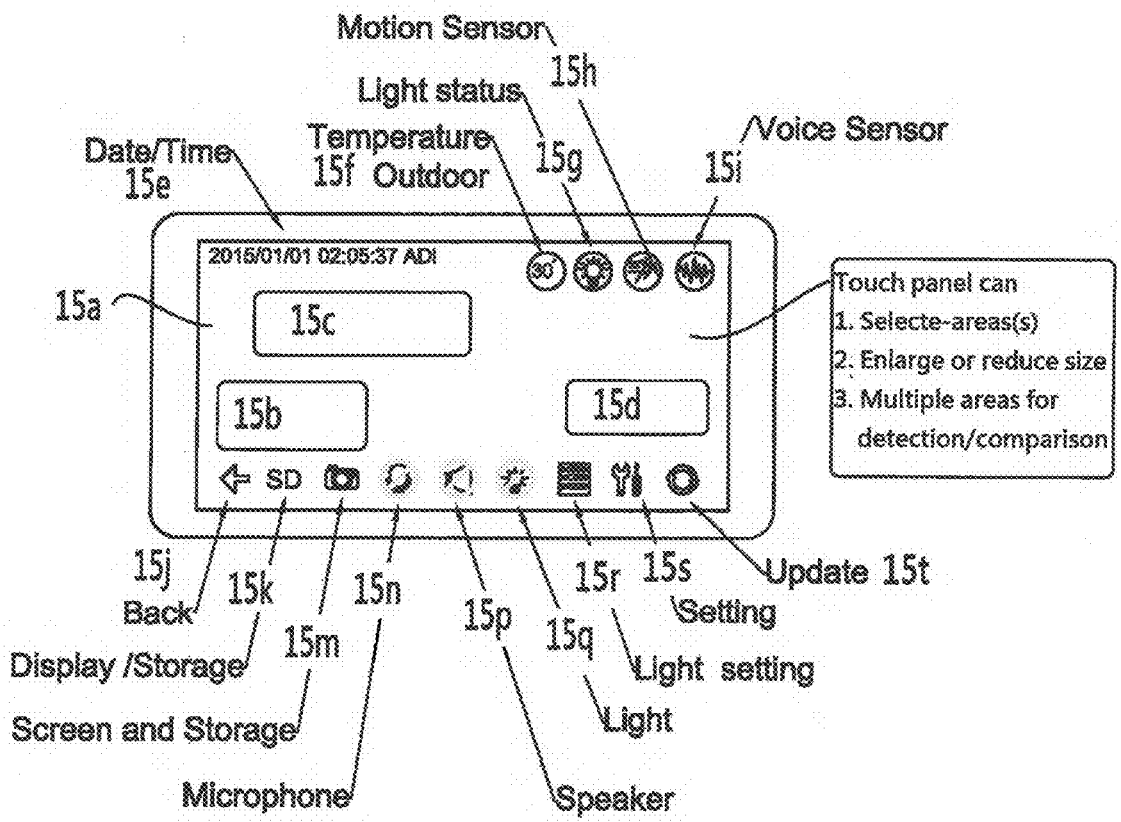

FIG. 15 shown the one of APP screen with all selected areas, functions, controller with optional added screen or image comparison.

FIG. 16 shown the one of the user interface screen comparison or functions

FIG. 17 show the working details for current invention to incorporate with wife, Cloud, APP, 3/4/5G network, Lan to wireless inform phone or computer owner and use APP software on far away location to remote control the said LED light or camera-assembly or deliver video, audio digital with optional communication for talking or conversation or auto dial out to people, police.

Figure 18A:
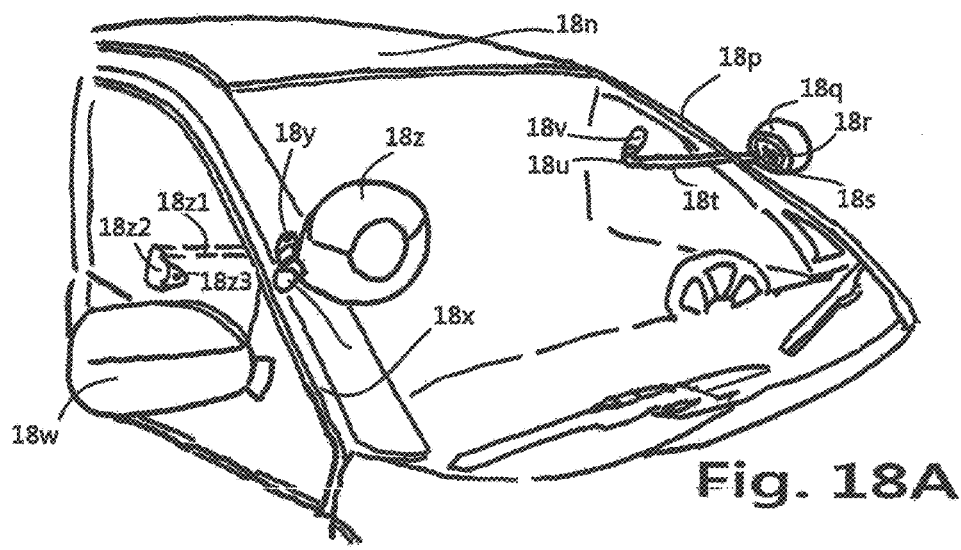
Figure 18:
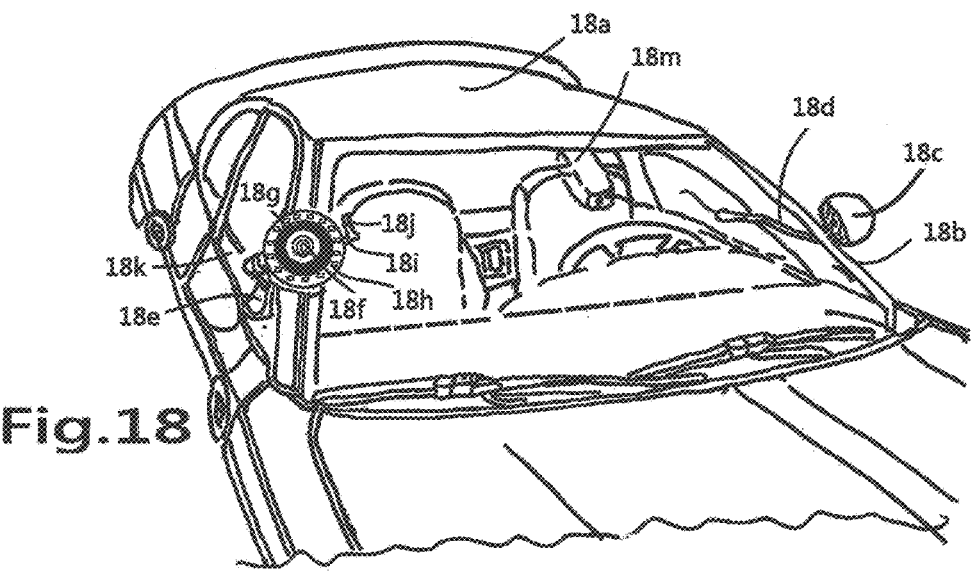
Figure 18B:
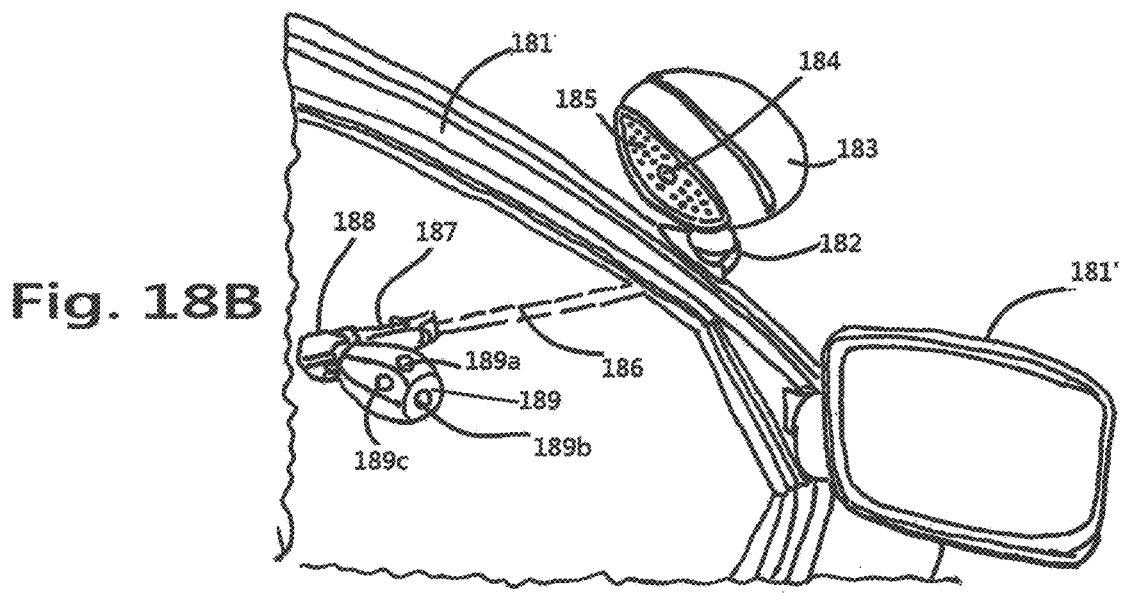

FIGS. 18, 18A, and 18B show the torch light on the moving vehicle or moving device, boat, bus, ship and torch light offer super brightness LED light beam with built-in camera-assembly to update the current torch light for police without built-in camera-assembly.

DETAILED DESCRIPTION OF THE PREFERRED EMBODIMENTS

The current invention is division filing of co-inventor parent filed case (# KKK-2011) and has big improvement to get rid-off the out-of-date memory-unit including SD card or micro-SD card for high-end model and incorporated with update system or software or controller, selector, adjustment functions as below:

(D-1) 3G/4G or incoming 5G net-work to incorporate the update LED light device. or-and (D-2) APP and pre-programmed or even AI software to selection, adjustment, recognition, analysis, tracking, built-habit, comparison, select-area, handle financial, handle crime, handle monitor, send out wireless signal basing on pre-program software, or-and remote control the video, photos, audio kits (D-3) camera-assembly including at least one or more of Wi-Fi or-and Wi-Fi-extender to make perfect wireless transmitting from completely LED light device or separated housing of camera-system which without light-source but has all other parts including but not limited for all kind of camera, APP software, Wi-Fi, Wi-Fi-extend, wireless communication to cloud storage station, incorporate with pre-programed or AI software to detect or monitor desired moving object(s) face, personal, merchandise, products to handle following-work including object recognition, comparison, transmitting from cloud storage station and make further analysis to get desired pre-program crime or personal or merchandise or price or account or payment or financial process to get all kind of digital data for application including personal habit, or-and object, or-and time, or-and place of people life.

(D-4) cloud incorporate with preferred software including AI software for safety, security, terrorist, home land security, business, face recognition, merchandise purchase, behavior summary, habit summary or other economical or crime analysis or-and application for enterprise, bank, home land security, police, military application.

(D-5) cloud station with pre-program software to get desired digital data and analysis.

(D-6) The LED light source supply sufficient brightness under dark environment to offer the full color or-and full HD 1080 or desired pixel(s) image or phone or video to incorporated with mass computer system which connected with cloud big storage station and software to make desired personal or-and merchandise or products and financial account operation.

(D-7) The LED light has built-in or separated housing camera-assembly which has all digital data handle parts or accessories or the said all digital data handle parts or accessories is install into (a) LED light device housing, or (b) individual housing separated with said light source (LED or all other type) so can assembly with light-source housing or light-source base to upgrade the non-camera device to light device has camera device.

(D-8) The said all kind of camera and all related digital data handle parts or accessories is the said camera-assembly to apply for all kind of LED lighting which can get colorful digital data under dark environment.

(D-9) The said camera-assembly combined the said LED light source or lighting has camera with all digital data handle-assembly so can combined into one single piece or one single products including LED security light, LED doorbell light, LED flashlight, LED car torch light, LED door entrance light, LED motion sensor light, LED bulb, LED lamp holder as current and all prior-art with day-by-day update new technical for current inventor filed family (D-10) The current and all parent filed case for colorful digital data for dark environment with update new technical added on all child filed case(s) can prevent the people to install (h-1) LED light device and (h-2) camera and all related digital data assembly for 2 times which need too complicated to install (h-1) and (h-2) for house, office, building. Especially for the update no-counter or no-employee stores which to install the (h-1) and (h-2) for 2 electric system and 2 times installation and pay for 2 times engineer design fee especially the current invention for LED bulb has extension or-and retractable or-and adjustable angle bar or pole or tube or cylinder to install the sensor(s)/detector(s)/camera(s) is perfectly just need to connect the LED bulb male-base into bulb-female-socket . . . . Then, One time housing or office electric-arrangement can have both (h-1) and (h-2) installation and get light. For this application the motion sensor for turn-on LED light source is not necessary because no-employee stores always turn-on the LED light so only need moving-detector(s) has the screen or image-comparison so can trace the different persons within the non-employee stores for all behavior or movement and purchase(s).

(D-11) The current invention also has simple take the full color photos or-and video as some of parent filing which has (1) all kind of camera or digital video (DV) to take full color photos or video and audio and go through the MCU or CPU or IC and circuit to connect with wireless communication system, or-and (2) Wi-Fi or-and Wi-Fi-extend and preferred software to wireless communication with 3G/4G/incoming 5G net-work, or-and (3) wireless connect with cloud big storage station which may connect with complicated computer system has pre-program or AI software to make further analysis, comparison, financial procedure, crime comparison including but not limited for face, personal character comparison, crime comparison, behavior comparison, financial account procedure . . . etc. or-and (4) connect with APP and apply the preferred software or interface which has capability to handle or operate the selection, adjustment, comparison, transmitting, dial out, multiple-way communication for audio functions, or-and (5) other computer interface to make analysis, comparison, arrangement, call out, transmission the camera-device took image, photos, video to big computer or servers to make further following pre-programed work.

The above (D-1) to (D-11) all belong to big improvement for current invention to up-grade the co-inventor's parent filed for basic LED light device has built-in or separated housing camera-assembly for high-end application basing on update technical which is not happened for earlier date because earlier date lack of all update new technical available for every people including:

(Early date 1) without widely or too many choice for App and good software available to easily download, also (Early date 2) earlier date lack the enough wireless communication for highspeed to delivery MP4 or 4K digital data until market has high-speed 4G network ground-station been set completed.

(Early date 3) The earlier date before 2014 without consumer can connect with maturity of Cloud storage-station and market has not finished all server(s) finished installation.

(Early date 4) Till today face recognition not install on LED light device for residence or stores to get colorful image or photos and connect with people the communication device is not existing yet, or (Early date 5) the touch panel for people communication device such as i-phone can enlarge screen not existing before 2011 November for current inventor 1st filed case to let people to select screen areas to detect moving objects.

(Earlier date 6) before 2011 November, Without these ground-station net-work 4G/5G wide set that is no way to transmitting wireless full color HD 1080 digital data and MP4 and 4K without electric signal delay, signals without the time delay because 2G or 3G transmitting speed too slow for big size digital data delivery by wireless equipment.

(Early date 7) Before 2011 November, market without the cloud station to storage such big colorful video or-and audio, it is impossible to allow wireless transmitting digital data to delivery and storage or even analysis or apply for other comparison-software.

(Early date 8) Before 2011 November, Without the phone touch panel to enlarge the screen or image without select-areas for detected or lock persons or merchandise by wireless. Without the APP software to connect with LED light digital data parts or accessories with quickly time that is no way can remote control or setting all auto-dial out or multiple-way communication.

Those update functions none is happen earlier than the 2013 but the current invention parent filed case is from 2011 Nov. 14 and has all continuously or division filed case to add the update all new technical inside continuous-in-parts or Division filed case as above listed co-inventor from (KKK-9) (KKK-3-1)(KKK-8) (KKK-7) (KKK-6) (KKK-5) (KKK-4) (KKK-3) (KKK-2) (KKK-1) (KKK-2011) total 12 parent filed cases.

From above discussed the current invention has all update new technical added on top of the all 12 parent filed case, so this current invention has big improvement for all parent discussed for LED light device including (1) LED bulb (2) LED flashlight (3) LED car torch light (4) LED motion security light (5) LED garden light (6) LED patio light or other (7) LED house or building or residence light (8) LED doorbell light. But, the current invention is not including the LED Street light or Monitor device for street.

From FIG. 1AA show the LED light has adjustable-angle sensor which can make from back of the LED light (01) to make the prong as sealed-unit by top and lower housing (09) to assembly together so make the prongs (07) to solid installed the movable sealed unit (09) and make the front sensor (not shown) to cover the total 180 degree on horizon range which is vertical of the wall-outlet surface.

Figure 2A:
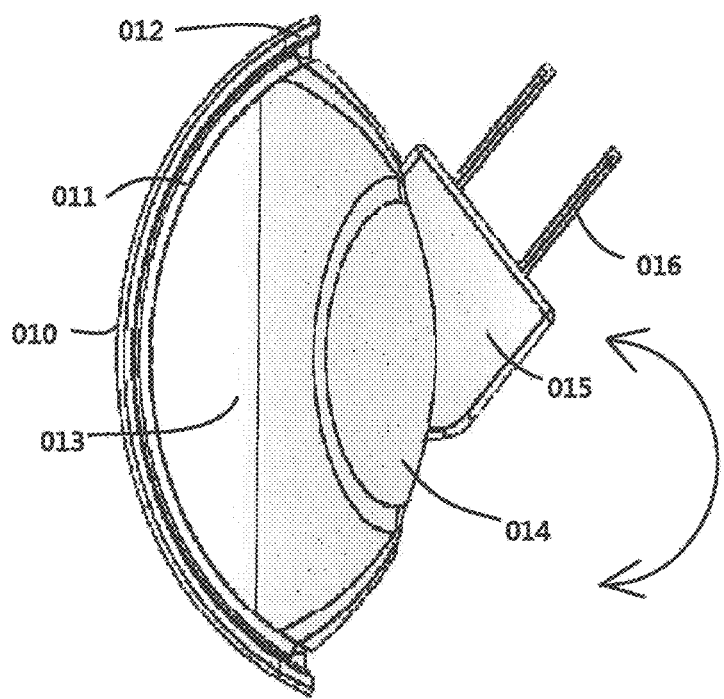
FIGS. 2A and 2B show a lamp holder of a second preferred embodiment has built-in DV or camera assembly, memory cards and optional wireless communication device(s).

From FIG. 2AA show the prong (016) can adjust from face 1 o'clock to the 5 o'clock position so can make limited detected-angle sensor can cover whole 180 degree on horizon range and at the same time LED light-beam or built-in camera or other sensors including
 (1) Motion sensor, or
 (2) Moving detected sensor, or
 (3) Light sensor, or
 (4) Vibration sensor, or
 (5) Heat or temperature sensor, or
 (6) Gas sensor, or
 (7) CO1 sensor, or
 (8) Smoke sensor.

Can face the desired area and overcome some block-means for sensors so this is big improvement for any sensor LED light which none of US prior arts has this kind of consideration and the current invention also can get most safety protection for life and properties. For example, this sensor adjustable LED light to face the stove of kitchen area with camera or video to take image especially during the dark-environment the LED light-beam supply the sufficient brightness to camera can use not expensive model to take full color even full HD and transmit to people to view the kitchen stove condition. That help aged or old people to relax while they out of home.

The current invention not only offer the kitchen LED light has camera incorporate with wireless communication with Wi-Fi or router or router-extend with or without storage-device or cloud-storage-station, or APP software has pre-programed ad remote controller system. It also can use for regular sensor LED light for night time use. Some house outlets is on the corner of rest room, or outlets is on center or corner of house where people is not able to walk those location so it will not able to detect the motion or moving of people, so those areas to install the sensor LED light is not useful. However, some illumination required for rest room, stair, corner but the sensor is not able to aim to the people walking-areas that is a big problem. So the current invention design the sensor adjustable on horizon-area so can make narrow detected-angle sensor can face to people moving range and make the light turn on for illumination during the dark environment, so the current invention cover for all sensor LED light has the horizon angle-adjustment. Not only for only built-in camera and can transmit the digital-data LED light only.

Figure 3A:
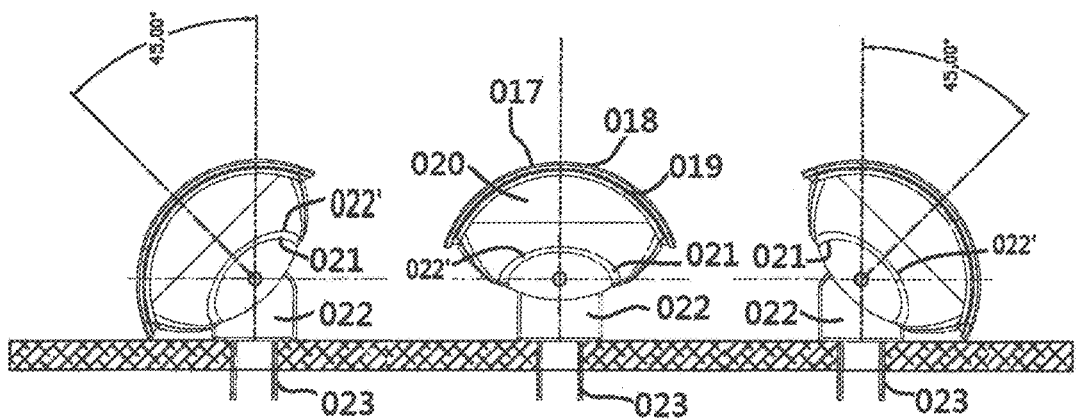

From FIG. 3AA, 3AA-1, 03AA-2 show the preferred sensor LED light (017) has front cover (018) with built-in sensor on front and LED light-beam emit same direction with the sensor detect-range. The prong (022) sealed inside of sealed-housing (022) with the pole (022') so sealed-housing can make rotating to right or left which is on horizon range for LED light and rotating angle from left FIG. 03A to right FIG. 03B to let sensor detect-range cover full 0 to 180 degree.

Figure 4A:
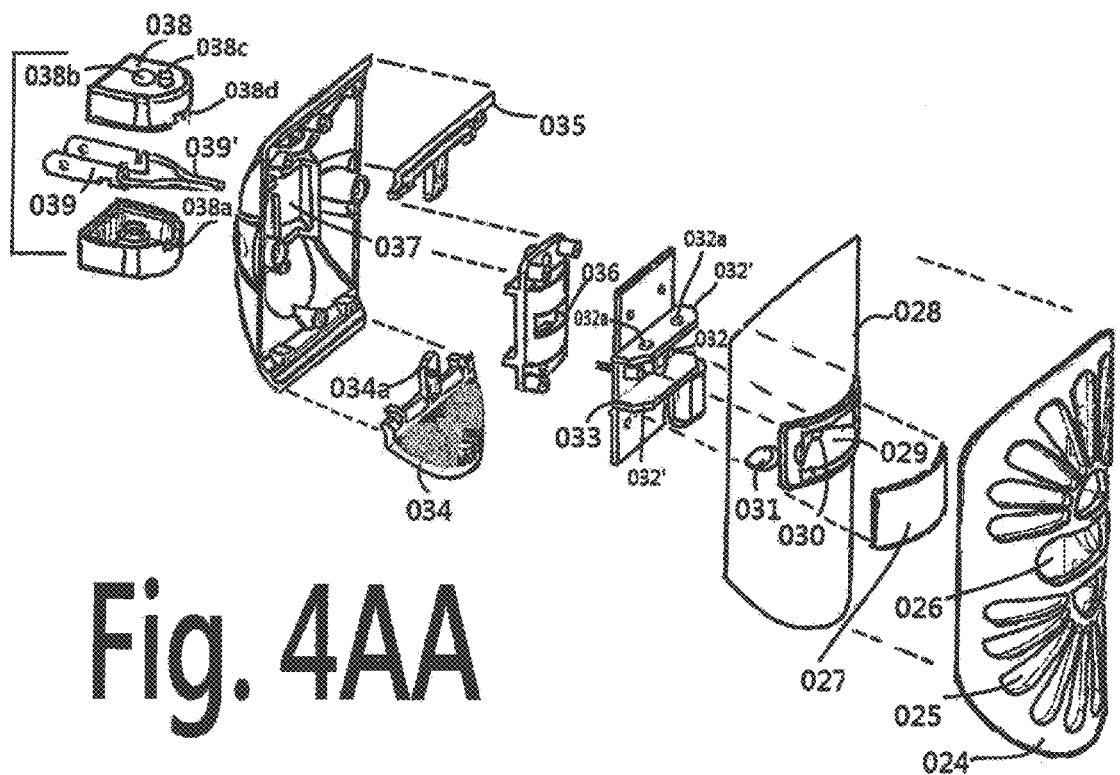
FIG. 4AA show the details construction for the LED light device has built-in camera assembly and motion sensor or moving detector(s) with swivel or movable prong to change the sensor or detector or camera shooting angle so can cover the desired areas because some sensor or camera only has less than 180 degrees shooting or sensor angle.

From FIG. 4AA show the sensor LED light has front cover (024) has plurality of opening (025) to allow the inner LED light-beam emit out from the openings (025), and has one cutout (026) to install the sensor (032) and its Fresnel lens (027) so can have desired detect-angle to sensor people moving or movement or temperatures changes to trigger the inner circuit (033) to operate desired one or more than one functions not only for LED light-beam for illumination but also to operate optional at least one or more than one functions selected from;
 (a) Camera or-and video camera to take image up to MP4 or other desired digital-data, or-and
 (b) Image or-and audio or-and desired digital-data storage device or cloud-station, or-and
 (c) Wireless transmitting and receiving device, or-and
 (d) Sound related device including speaker or microphone for multiple way communication, or-and
 (e) Wi-Fi, router, or router-extend, Z-way, internet, 4G/5G network,
 (f) APP software with pre-program desired functions or-and remote controller and receiver device; to make the desired combination functions.

From FIG. 4AA also show the sensor adjustable sealed-housing (038) (038a) which has prong (039) fit within and connect with wire (039') to install on the arc-space (037) with a axis install on sealed-housing openings (038c) so the sealed-housing (038) (038a) can rotate along the art-space (037) to move the LED light sensor detect-range can cover whole 180 degree or more depend on market required.

The LED light has desired number of LED light source to make some lighting effects including (1) high-low or more level brightness incorporated IC design. Or-and (2) has sensor selection switch or control system with or without sensor or select sensor or select group of sensor to operate desired functions, or-and (3) make design LED light beam for design light show or light effects which including;
 (a) Brightness, or-and
 (b) Colors, or-and
 (c) Time, duty-cycle, duration, or turn-on and turn-off, or-and
 (d) Mix colors, or-and
 (e) Freeze color, or-and
 (f) Auto changing colors, or-and
 (g) Fade-in and fade-out, or-and
 (h) Market available LED light show or functions or performance.
 and selected one or more than one of sensor works as pre-determined circuit or-and IC design.

From FIG. 4AA the said LEDs (032a) install on proper space to make illumination through the front cover opening (025) or top lens (035) or lower-lens (034) which may has texture or optics-design on the lens so can make illumination to front or-and low or-and high portion of the LED light so can make very good illumination. This kind of sensor LED light can put on low-profile outlet or new outlets for the 3-6 feet high wall outlet which for the new house TV power source so can supply excellent illumination for top or-and low or-and front illumination this also is other features for current invention.

It is appreciated that the FIG. 4AA only show one of preferred embodiment construction but the limited drawing and text is not limited for any same function, equal effects, replaceable skill, alternative arrangement as long as the sensor LED light with or without other functions should still fall within the current scope and claim coverage.

Figure 5A:
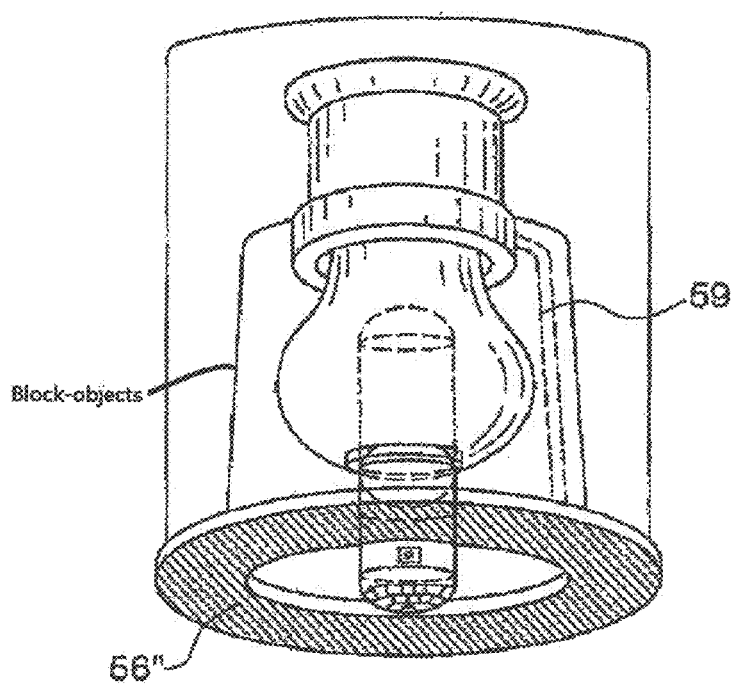
FIG. 5AA show the $2^{nd}$ embodiment which has different front cover and light emit window than FIG. 4AA.
Figure 5B:
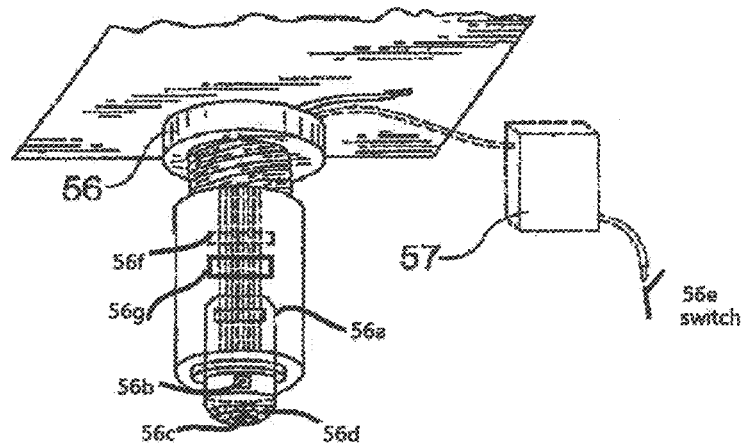

From FIG. 5AA show other preferred embodiment which has a lot of louver opening and has LED and sphere sealed-housing which can rotating within the LED light arc or ball or sphere space to make the sensor or-and LED light-beam or-and camera to aim to the desired orientation or areas or range to detect people moving or movement or temperatures depend on what kind of the sensor as above discussed to apply to the said LED light.

Figure 7A:
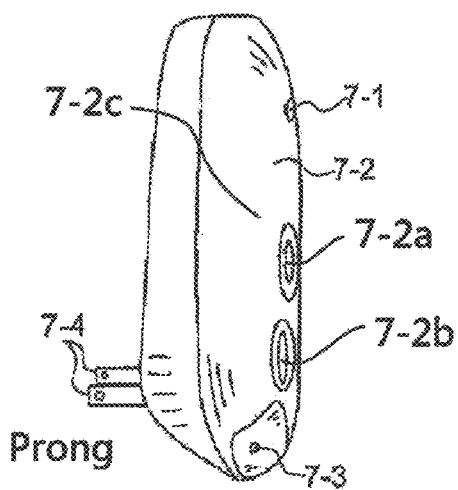
FIGS. 7AA and 7AA-1 and 7AA-2 show the other construction to how to make angle-adjustment for horizon level to make the LED light sensor can cover total 180 degree horizon range.
Figure 8A:
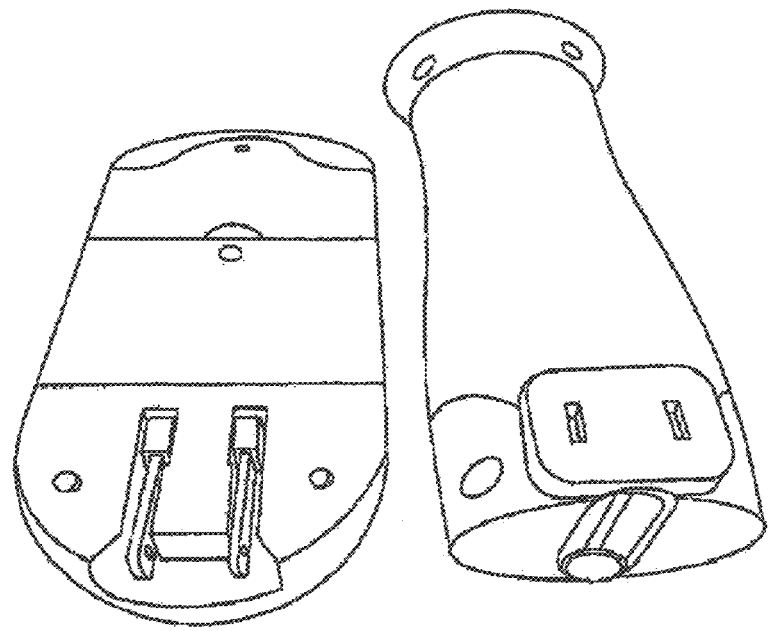
FIGS. 8AA and 8AA-1 and 8AA-2 show the other construction for LED light shape and how to make 180 angle adjustment on horizon.

From FIGS. 6AA and 6AA-1 or FIGS. 7AA, 7AA-1, 7AA-2 or FIGS. 8AA, 8AA-1, 8AA-2 or FIGS. 9AA, 9AA-1, 9AA-2 show the different construction of the LED light unit or-and sealed-housing or-and arc/ball/sphere space to explain some of embodiment to make the sensor or-and LED light-beam or-and camera or-and other sensors can be moved. It is appreciated the other skill to make same result to make the sensor or-and LED light-beam or-and camera or-and other parts to adjust angle to cover the horizon-level bigger range and not fixed on one angle should belong to replaceable, alternative, equal functions skill and should still fall within the current invention concept, idea, spirit, construction and protect by current invention claims.

From the above discussion the current invention mainly has one special application for LED light as below 9 features including;

1. LED light has adjustable horizon-angle sensor, consist of;
   At least one LED light has (1) prong to plug-into outlet to get AC power go through the built-in AC-to-DC circuit or (2) outside AC-to-DC transformer to get DC power supply to LED and other DC operated parts for desired light functions.
   At least one angle adjust-assembly to adjust the less than 180 detected-angle sensor to let the sensor can adjust and cover total 0-to-180 degree of the horizon direction where is vertical to the outlet located surface.

2. LED light has adjustable horizon-angle sensor, the said LED light sensor is at least one or desired combination of
   (1) Motion sensor, or
   (2) Moving detected sensor, or
   (3) Light sensor, or
   (4) Vibration sensor, or
   (5) Heat or temperature sensor, or
   (6) Gas sensor, or
   (7) CO1 sensor, or
   (8) Smoke sensor.

3. LED light has adjustable horizon-angle sensor, the said LED light has number of LEDs to offer desired brightness after the current go through the built-in circuit or-and controller to make the light brightness for desired combination for different
   (a) Brightness, or-and
   (b) Colors, or-and
   (c) Time, duty-cycle, duration, or turn-on and turn-off, or-and
   (d) Mix colors, or-and
   (e) Freeze color, or-and
   (f) Auto changing colors, or-and
   (g) Fade-in and fade-out, or-and
   (h) Market available LED light show or functions or performance.

4. LED light has adjust horizon-angle sensor, the said LED light not only offer the illumination but also incorporate with at least one of the other function select from
   (a) Camera or-and video camera to take image up to MP4 or other desired digital-data, or-and
   (b) Image or-and audio or-and desired digital-data storage device or cloud-station, or-and
   (c) Wireless transmitting and receiving device, or-and
   (d) Sound related device including speaker or microphone for multiple way communication, or-and
   (e) Wi-Fi, router, or router-extend, Z-way, internet, 4G/5G network,
   (f) APP software with pre-program desired functions or-and remote controller and receiver device; to make the desired combination functions.

5. LED light has adjusted horizon-angle sensor, the said LED light has adjustable angle to let light-beam and sensor to aim or face same direction or desired area.

6. LED light has adjust horizon-angle sensor, the said LED light is plug-into kitchen area outlet and emit the sufficient light-brightness to let built-in camera or video camera can see colorful image or-and sound or-and digital-data to allow people can see clear color image of kitchen-area under dark-environment.

7. LED light has adjust horizon-angle sensor, the said LED light has angle adjustment so can cover desired angle or areas while the sensor detected range is less than 180 degree of in horizon where is vertical to the outlet located surface.

8. LED light has adjust horizon-angle sensor, the said LED light has more than one piece or more than one type to get preferred functions and has sensor-selection switch-system to select desired combinations from
   (1) Motion sensor, or
   (2) Moving detected sensor, or
   (3) Light sensor, or
   (4) Vibration sensor, or
   (5) Heat or temperature sensor, or
   (6) Gas sensor, or
   (7) CO1 sensor, or
   (8) Smoke sensor.
   ; To get most safety protection for life and properties.

9. Plug-in LED light has prong and horizon angle-adjustment sensor(s), consist of; At least one LED light has prong to plug-into outlet to get AC power go through the built-in AC-to-DC circuit to get DC power supply to LED and other DC operated parts for desired light functions.
   At least one angle adjust-assembly to adjust the less than 180 detected-angle sensor to let the sensor can adjust and cover total 0-to-180 degree of the horizon direction where is vertical to the outlet located surface.

Figure 7B:
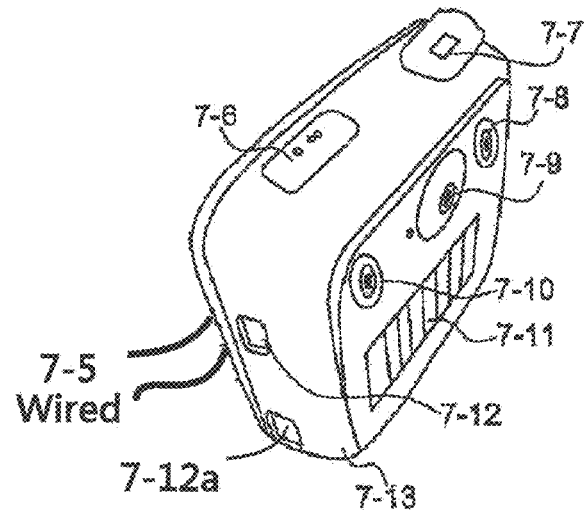
Figure 7C:
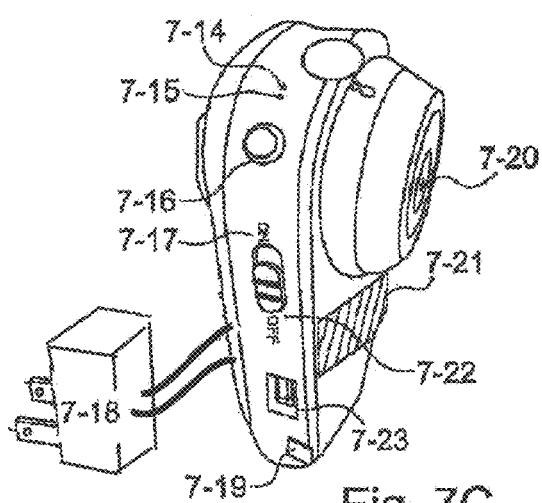
Figure 7D:
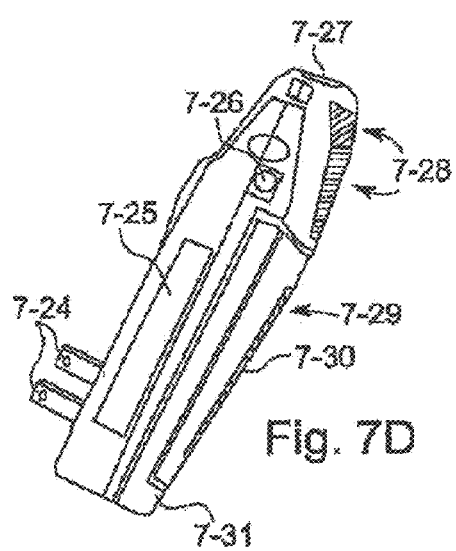
Figure 8B:
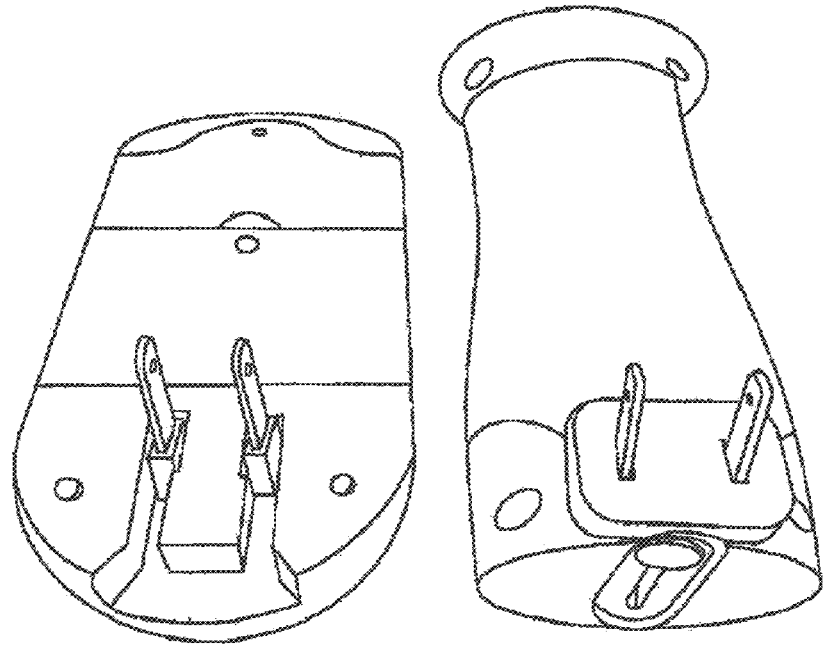
Figure 8C:
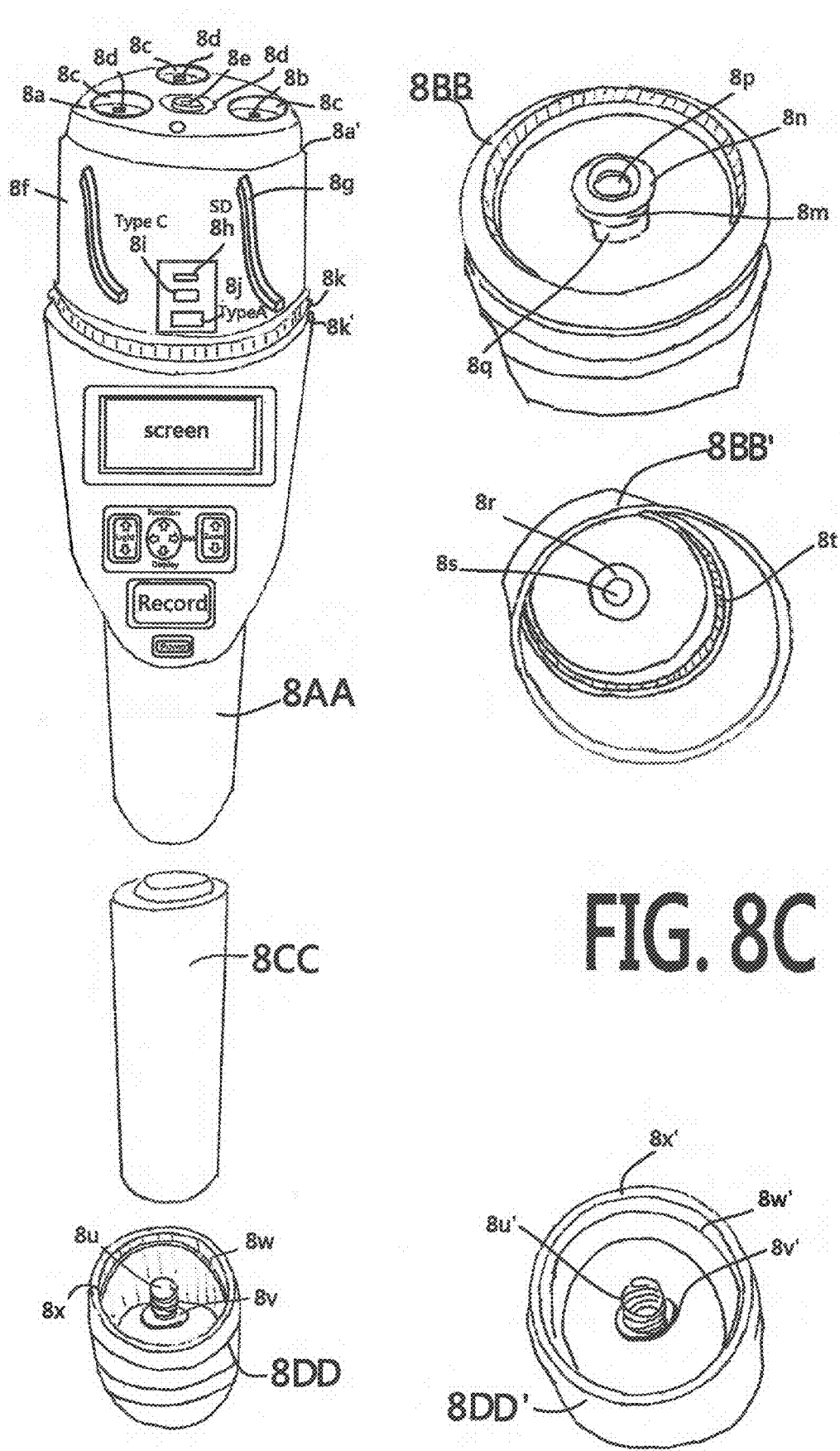

The invention is a device having digital data that is powered by an AC house electricity power source or DC Big capacity electricity storage unit power source and built-into a
   (A) lamp holder as FIG. 1A, 1B, 1C, 2A, 2B,
   (B) LED bulb as FIG. 3A, 3B, 3C, 3D, 3E, and FIG. 4A, 4B, 4C and FIG. 6A, 6B, 6C, 6D, or
   (C) light device as FIG. 5A, 5B, 5C, 5D, and FIG. 7A, 7B, 7C, 7D, or
   (D) All kind of other LED light device as FIG. 9A, 9B, 9C, 9D, 9E, 9F and FIG. 10A, 10B, 11A, 11B, or
   (E) Flash light as FIGS. 8A, 8B and FIG. 8C, and
   (F) other LED light device including but not limited including garden light, entrance door light, floor light, patio light, garage door light, pavement light, doorbell light which each one has LED light beam to offer sufficient light brightness to allow camera or DV to take colorful image, photo, or-and audio for following work(s). The following description was included as notes in the original drawings, and are now included herein:

In a preferred embodiment, as illustrated in FIGS. 1A-1C and 2A-2B, the device is in the form of an insert forming a lamp holder with a socket having desired lamp socket specifications, said insert being arranged to be inserted into an existing light fixture. Preferably, the light device may have multiple function in addition to a lighting function including portable or hand-carry flashlight or others, and may include a compartment for extendable, retractable, foldable, or transformable installing accessories that provide more than one function. The light device's digital data means include sensor means having more than one sensor head and an integrated circuit for controlling an auto tracking assembly that enables the camera to track moving objects or persons, and/or may include multiple cameras for capturing images of different locations. The light device's unlimited AC power source may be an electrical utility power supply system for supplying electricity to homes, residences, and businesses. The invention for Light device also provides a webcam having an auto tracking means and power supply connected to an unlimited power source to a USB interface, the webcam including at least one camera head having means for capturing images, data, or sound at a desired shooting angle, resolution, color, brightness, and sharpness, a motor, and sensor means for causing the move the camera head to follow a moving object or person, and means for storing or transmitting data captured by the camera head to one of a display, computer, communication device, phone, Internet, website, e-mail, or auto dialing system.

The webcam may include a USB adaptor for connection to a computer or communication equipment with a USB port, with the webcam being activated when connected with the power source to carry out predetermined image capture functions and to capture digital data under predetermined environmental conditions. The Light device's webcam may include suction cups for mounting the webcam to a computer screen or housing, and multiple camera heads for simultaneously viewing multiple areas, as well as a lighting device or devices having additional functions. The light device's webcam preferably further includes prong means for directly plugging the webcam into an electrical outlet, and weight supporting means for supporting the webcam on the outlet, said weight supporting means including at least one of the following: at least one suction cup, glue, double-sided tape, a hook and loop fastener, an adhesive, a chemical compound, a connector, an adaptor, and a fitting means, and may be arranged to operate at night or in low light.

Figure 1A:
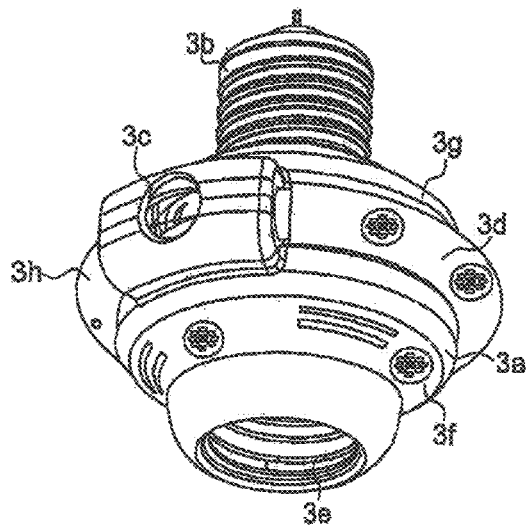
Figure 1B:
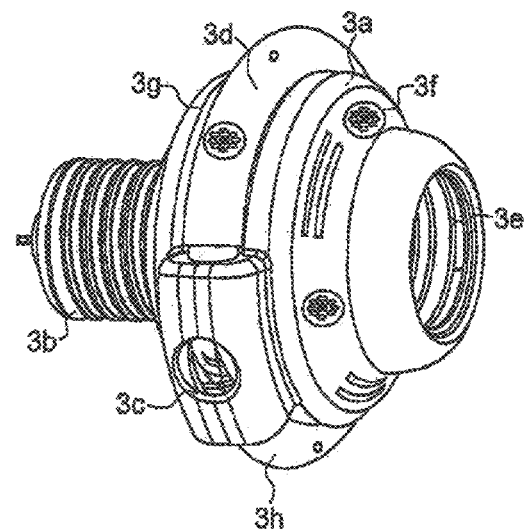
Figure 1C:
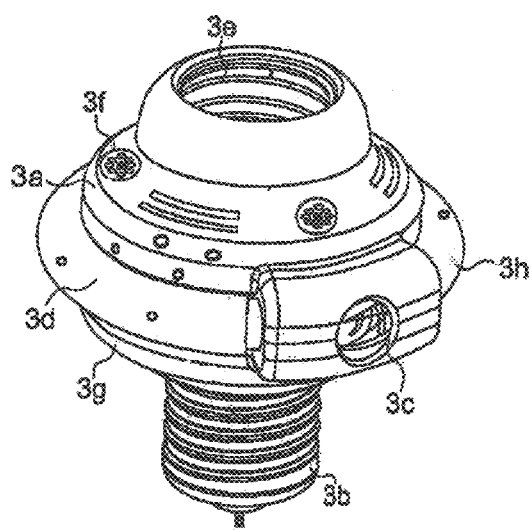

From FIGS. 1A-1C show a device in the form of a lamp holder or lamp adaptor or light fixture insert (3*d*) with a screw-in base (3*b*) and a built-in camera head (3*f*) that can be screwed into an existing light fixture female lamp socket or bulb holder to add digital camera functions, with power being supplied through an elastic terminal or traditional bulb-terminal at the top of the light fixture insert when the insert is screwed into the existing light fixture which power source can be AC or DC power source. The insert includes a female receiving socket (3*e*) into which a market available all kind of bulb male base may be screwed to receive power from an unlimited AC house electricity power source or DC big capacity energy unit through the built-in insert male base (3*b*).

A sensor (3*c*) may a photo sensor or-and motion-sensor or moving-detector or other sensor or A pair of moving sensor like (3*g*) (3*g*') which is moving detector and has optional added screen or image comparison features or function device and IC are provided to sensor the moving of objects or alive animal or people and control to turn on and turn off the said Light device (not shown) or-and the camera at same time or different time. By replacing a conventional bulb in the existing light fixture with the illustrated lamp holder or lamp adaptor or insert (3*d*), a security camera can easily be installed without the need for expert installation. When the bulb is then screwed into the socket, the resulting installation will look like an ordinary light fixture and therefore bad guys will not notice the camera (preferred is hidden or pin-hole size camera for tiny unit). The camera can include night vision or infrared capabilities, and tracking features, and the insert may be waterproof to protect the camera and electronics while use for outdoor application. The bulb may be an incandescent bulb, or another type of bulb such as an LED bulb or CFL or any other light source bulb. The adaptor or lamp holder of insert (3*d*) may be screw type, or pin type or bayout type of any other type available from market place not limited for only screw-in and screw-out type. The insert (3*d*) my has other added device which shown on the drawing without marking for any preferred device can increase the said insert (3*d*) function including but not limited such as microphone, speaker, antenna adaptor, SD card slot, Memory card slot, Wi-Fi receiver or transmitter, . . . etc.

Figure 2A:
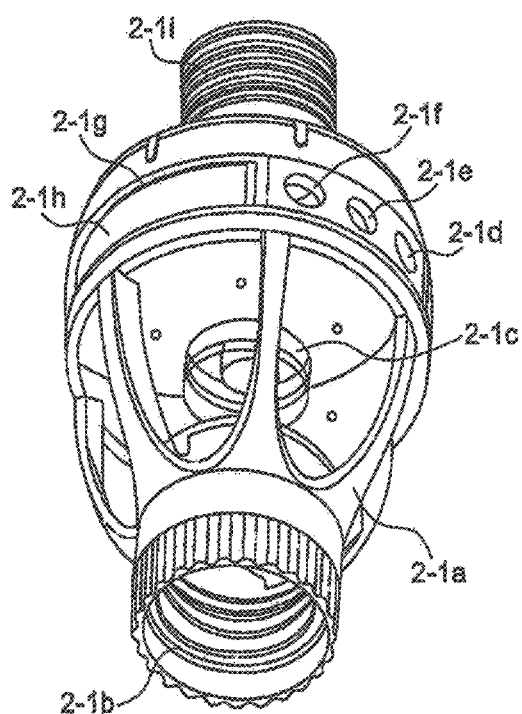
Figure 2B:
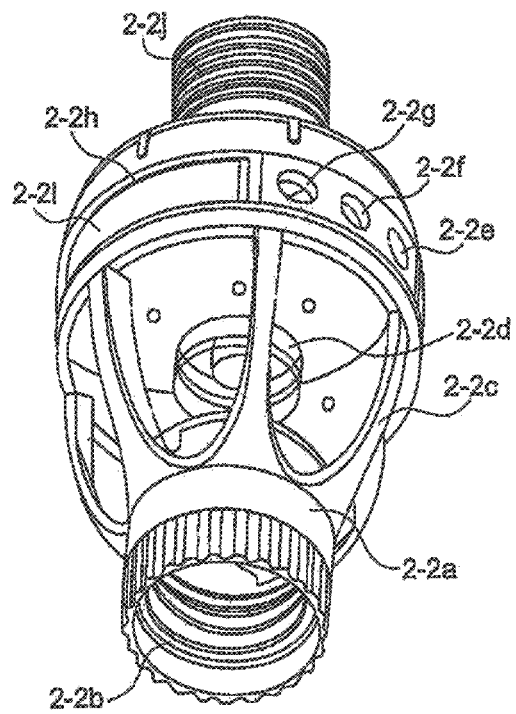

FIGS. 2A and 2B show an arrangement similar to that of FIGS. 1A-1C. In the arrangements of FIGS. 2A and 2B, like that of FIGS. 1A-1C, the camera preferably faces downward from a ceiling installation, and the motion sensor (2-1*h*) or moving sensor detector sets (2-1*f*) (2-1*e*) or any combination sensor-assembly may including other type sensor or photo sensor (2-1*g*) which may put inside or under (2-1*h*) motion sensor's Fresnel lens. The sensors or sensor assembly causes the camera (2-1*c*) or desired number of Led light source (small dots) to start recording or turn on the LED light at the same time in response to detection of motion or moving objects in the field of view under pre-design condition and programs.

The alternative or more features for the sensor or-and camera or-and LED light source or-and signal receiving or transmitter unit or-and IR remote controller receiving unit can install or built-in on extendable housing, body FIG. 3A which maybe in many layer FIG. 3B and each of layer can be rotate to adjust the orientation or direction of the said LED light device, lamp holder, LED bulb similar as shown in FIGS. 3A-3C and 4A-4C.

The sensors and/or camera or-and above discuss electric parts & accessories can be extended or retracted and rotated to avoid interference by lamp shades, lamp covers, lamp walls, or other blocking items that otherwise might block a field of view of the camera or sensor while the current invention to apply for LED bulb like FIGS. 3A-3C and 4A-4C drawing shown.

The device may have multiple rings, each of which is separately rotatable to enable separate rotation of the sensor(s) and difference camera heads or-and LED(s), as shown in FIGS. 3A-3C and 4A-4C.

As shown in the LED bulb inside the light device FIG. 3D and FIGS. 5A-5D, the extension may enable the position, orientation, or angle of the sensor or camera head or LED(s) to be varied, or enable the sensor to be extended while the lamp holder or LED bulb or LED light device or lighting feature is within a shade, (for entrance door LED light, the LED bulb or sensor or camera may within the glass material housing) the device may further include external light elements such as lighting elements (31) and (36), as well as additional sensors such as sensor located inside the extendable tube.

As shown in FIGS. 6A-6D, a variety of LED bulbs may be inserted into the light related device which has traditional base, extendable base as FIGS. 6A, 6C the base can extendable or retractable or bendable or flexible or rotating to desired direction to overcome the recess light depth that may interfere the electric signal transmitting or receiving (Same as co-pending parent (#MMM-2) filing and patented parents or FIGS. 3A, 3B, 3C, 3D show front extendable parts, 3C, 3D, 3E, 4A, 4B, 4C show the rotating and front extendable). All these different type LED bulb has built-in camera-system or DV-system can take minimum MP4 format image or update 4K (60 image per second) including photos or video for digital data through the MCU or CPU or IC and circuit so can quickly saving or transmit out to memory card or cloud storage station to get on-line stream digital data while these digital data saved into memory card or wireless transmitted by Wi-Fi though 3G/4G/5G network or even through settle-lite channel with or without APP or other software to get more control functions by good program software so can do a lot of desired work including (1) adjust or setting the camera/the light source for angle/orientation/shooting properties adjustment, or-and (2) adjust lighting brightness/light turn on time/light color/light duration, or-and (3) adjustment, microphone/speaker communication relative properties or functions including volume, ring bell type and sound and duration, or-and (4) send out phone/text/photos/video by Wi-Fi, skype, email, twitter, what's App, WeChat, Instagram or other platform software, or-and (5) call for police department/911 or relative bureau/fire department/ambulance/hospital/security company, or-and (6) setting the sensitivity of the motion sensor or moving detector(s) or short or flood or fire or photo sensors, or-and From FIGS. 3A, 3B, 3C, 3D, 3E 4A, 4B, and 4C show a third embodiment and all the FIGS. 1A, 1B, 1C and FIGS. 2A, 2B, and below all discussion for different LED light device of the current invention in the form of an LED bulb. The said has built-in DV or camera assembly has minimum take MP4 or higher grade image or data, memory cards or incorporate with wife to wireless delivery camera or DV captured colorful image or-and audio digital data go through 3/4/5G or-and internet to cloud data storage station. The cloud storage digital data inform the said owner of phone or computer who had download APP from internet and incorporate APP software to make LED light or-and camera related parts for setting, or selected-areas to do following work which including selected-area, detection, comparison, tracing, record, facial recognition, trace moving people or merchandise or objects, calculation for items been pickup and amount for value, delivery and calculation for paypale or bank account for purchase behavior, or other behavior or movement for moving people, merchandise, object for desired or pre-program software in APP or Cloud to do all said following work. The optional wireless communication device(s) selected from Wi-Fi, 3G/4G/5G network or even settle-lite channel to display or phone or computer or screens or monitors. From FIG. 4B show the LED bulb has bendable or tilt LED bulb head which has motion/moving detector(s) and LED light source and camera-head(s) on top rotatable or tilt part, the rest circuit inside the lower male lamp-base housing so the major heat-created circuits is away from the top rotating or tilt head.

From FIGS. 3A, 3B, 3C, 3D, 3E, 4A, 4B, and 4C the preferred embodiment, the current invention LED bulb preferred the LED light source is surrounding the center camera-lens or camera-unit which can be plurality LED dice or LED chip or LED dip type or the update COB (LED chip on Board) to offer sufficient brightness for camera to capture colorful or Full HD 1080 or 4K or 8K clear image. Or, the camera head or-and motion/moving detector is install the extendable, movable, retractable, bendable, rotatable LED bulb housing parts, pole, tube, which can away from the LED bulb's heat-create parts so no need use any heat-spreader inside the LED bulb which is one of the feature for current invention for LED bulb application.

From FIG. 3A show the LED bulb as current and parent filed case (#JJJ family) that the LED bulb has extend-parts on front or rear parts, It also can bendable to desired angle. The said LED bulb also has rotating-parts to make the fixed or extendable or bendable body, parts, tube, pole with camera-head or motion/moving detectors can aim to areas because market place still do not have camera can cover 360 degree shot angle. However, the camera-lens can apply the Fish-eye type which can make 3D environment camera shooting angle but this kind of Fish-Eye lens of camera-system have to have other added software to make the curved or deviation image to back to normal. So the camera-system incorporated with Fish-Eye Lens(es) to capture 3D image also fall within the current invention for all said LED light device including LED bulb, LED security light, LED Flashlight, LED torch light for people or transportation equipments including car, boat, ship, air-craft with Camera-assembly and can wireless delivery colorful image or-and audio to personal phone or computer which has download APP and related software for following work discussed as above.

Figure 3D:
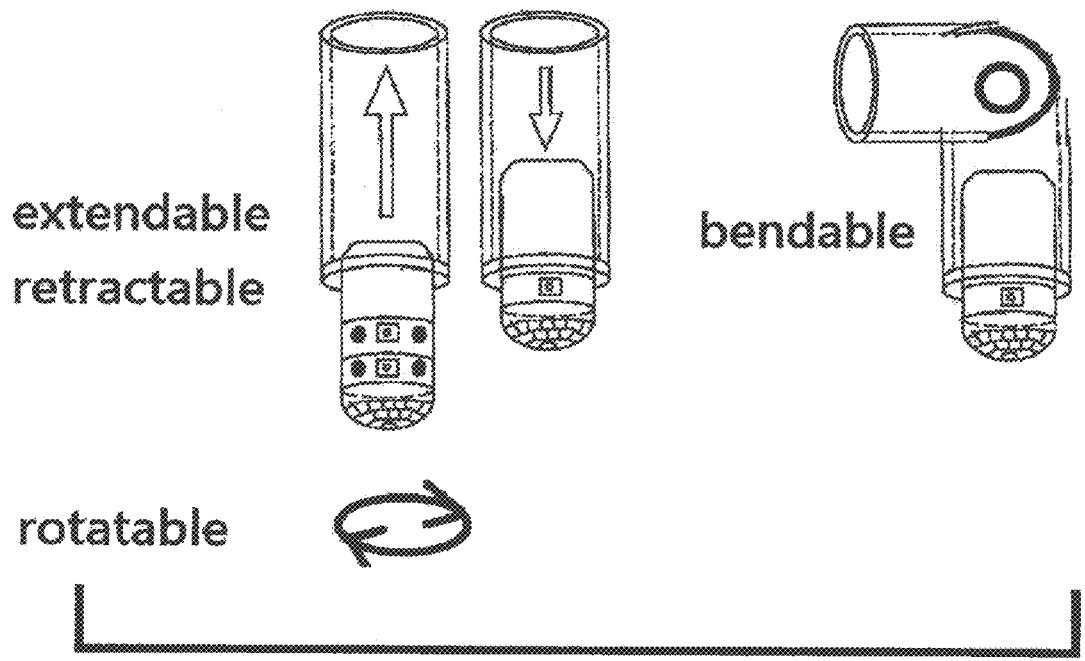
Figure 3E:
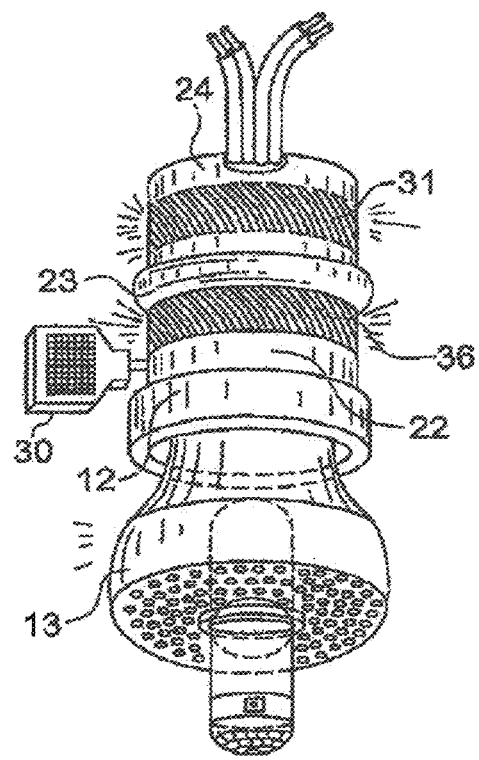

FIGS. 3D and 3E show a fourth preferred embodiment of the current invention, also in the form of an LED bulb which install on ceiling has extendable or rotating or bendable parts of the said LED bulb has built-in camera to get better wireless communications prevent from all block-objects including wall thickness or recess tube-parts to interfere the signal delivery has built-in DV or camera assembly, memory cards and optional wireless communication device(s) at least has above features of each part.

From FIG. 3D extendable or tilt or bendable parts can be in front of LED bulb or in rear parts of said LED bulb so can get camera-head(s) or motion/moving detector(s) to aim to certain angle while camera or-and sensor cover range is not up to 360 degree. While incorporated with 3D or Fish-Eye camera-head(s) it need to incorporated the software to change twisted or deforming colorful image to normal image. But still can install on tip of the front extendable parts. It is appreciated the camera-head(s) or motion/moving detector can install any location basing on market required and not limited for these limited diagram and text.

From FIGS. 5A 5B, 5C, and 5D show another embodiment of the invention in the form of an light device has current invention's LED bulb has built-in DV (56b) or unit (56d) may in normal camera-head (56b) or fish-eye camera-head(s) (56c) or 3d camera-head(s) (56c), memory cards and optional wireless communication device(s) as above discussion on FIGS. 3A, 3B, 3C, 4A, 4B, and 4C wherein has separated parts including female bulb-socket (56) or accessories (57) can supply desired circuit or current or signal to the said LED bulb and controlled by preferred switch (56e) which on the building or house. T From FIGS. 5A, 5B, 5C, 5D the said LED bulb is turn on and turn off by the circuit or switch (56e) and the lamp-base (56) receiving the LED bulb. The LED bulb has extendable, rotating, bendable parts (56a) where install the camera-head(s) (56b) (56c) or-and motion sensor (56d) or-and moving detector (56d). The LED bulb has built-in rechargeable battery and it will charger while the switch is ON and while switch off or power shut-down the said rechargeable battery supply Camera-assembly and LED light source to work while switch off or power shut-down. Whenever moving objected be detected by motions sensor or moving detectors will turn on the LED light and camera-head(s) to take clear colorful photos. At this time bad guy or moving objects think only turn on the light and never think same time the colorful image with preferred audio digital data already use back-up power to wireless transfer through wifi or-and wifi-extender to personal phone or computer which had down load the APP and software may already direct dial out phone to send out signal to police or relative to catch the intruder or bad-guys during 2-5 minutes after moving-object is been sensor or detected under dark environment.

Figure 5C:
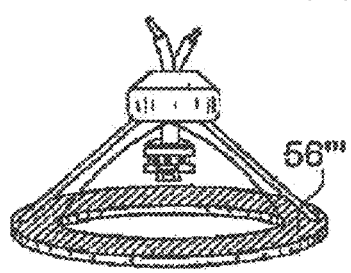
Figure 5D:
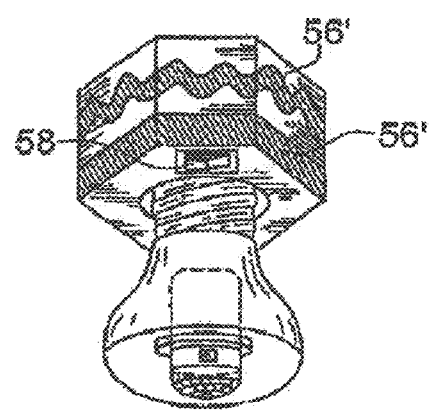

From FIGS. 5C, 5D same as the above discussion, the difference at the LED bulb may use for google stores or Alibaba no employee stores so the LED bulb has built-in camera with all wireless transmitting camera-head(s) captured colorful image to cloud through wifi or-and wifi extend and go through 3G/4G/5G to cloud, and owner of the said phone or computer received the signal and use internet download APP and related software to make desired operation and give instruction to the LED bulb through 3G/4G/5G to internet and wifi or ZigBee wireless receiving system to operate APP software instruction. This kind of LED bulb for non-employee stores can install on simple light circuit for house, stores, building no need to make special camera-head special circuit so can do nothing can just change current invention LED bulb then set up the both LED light and Camera-head(s) in one time. This application, The LED light source almost turn on all the time during day time and night light, so No need any sensor on this kind stores always has 24 hours turn on the light. But offer both LED light brightness and built-in camera-head(s) to capture the colorful image or-and audio to use current invention wireless-system to know moving people purchase items, purchase amount and input to pre-program computer and connect with bank account to finish all peoples purchase behavior.

From FIG. 6A and FIGS. 6A1 and 3D can see the LED bulb has rear-end extendable and bendable tube, bar, cylinder or parts which can make the LED light source or sensor-head(s) or camera-head(s) to aim to the desired area while the sensor(s) or camera-head(s) shooting range is less than 360 degree on x-y-z axis of the environment. So the extendable or rotating or bendable or retractable LED parts is very important for any LED bulb has built-in camera-assembly which has all function as FIGS. 5C, 5D discussion. It is appreciated as long as the LED bulb has built-in camera-heads, sensor, detectors, and wireless transmitting and receiving through wife, wifi-extend, Zigbee, and go through 3.4.5G network and phone or computer had download APP and its software from internet to operate all following work should be fall within all the above discussed LED bulb or current invention scope, spirit, claims. Any replace, alternative, equal function, skill should still fall within the current invention scope.

The All kind of LED bulb as show on FIGS. 6A to 6D and 6A1 is some preferred popular model. It also can be different size including most common use for PAR38 shape and size which while add the motion sensor or moving detector(s) or other sensor with built-in camera-system with memory card or incorporated with cloud digital data storage station can save or transmit the camera device captured MP4 or higher rank image, photos, video to phone which through the APP and pre-programed software or AI with design following works so can check pre-set location or touch-panel to select the selected-areas status, or moving object including people and merchandise or other objects, and do a lot of other desired function as above listed (1 to 9) for setting, adjustment, program, call, digital data delivery for following person identification, recognition, facial recognition, purchase, payment, tracking, analysis, built-behavior, study habit, crime recording, save evidence, save talking, send out audio signals through the cloud storage station data with pre-program MCU or CPU or IC or Circuit basing on the camera related device captured digital data. It is appreciated that all above listed multiple functions only for example which not cover all market available function, but it should not limit for listed function, it should be cover all market available functions.

The Light device has built-in DV or camera device and memory kits or-and optional wireless communication system as FIGS. 7A,7B, 7C, 7D show some of preferred built-in LED light device and built-in camera-assembly which has everything as above discussed to captured the colorful digital data by camera or DV has built-in LED lighting devices. From FIG. 7A can be a door bell LED light which has the camera (7-1) and has the one push button for trigger ring bell and system, other round can be a motion sensor or moving detectors inside which also can trigger the camera-system for desired pre-program functions and operate the desired following works.

These devices are shown on FIG. 7A to 7D with (1) built-in prong, or (2) built-into the wall connect by wired, or (3) built-in door powered by wired, or (4) install on outdoor anywhere powered by wired or AC plug-wire or transformer, or solar power by attachment means or other alternative place by attachment skill to connect an house electricity or energy storage power source to get AC or-and DC or-and power backup power source including a wall outlet or extension cord outlet, and also has built-in motion sensors or moving detector(s) or switch that can be used to provide control the light device and camera unit or-and auto tracking functions. It will be appreciated that the camera or DV devices include; (1) Lighting function and camera which can take at least MP4 images both can activate as pre-programmed such as (a) camera take photos or video always or every period of time during day time such as per second or minutes. (b) camera take photo or video while sensor(s) or detector(s) been triggered any time (d) camera take photo or video while light source turn on by switch at the night or under dark environment or inside store(s) (e) light device and camera activated by any pre-setting program. (2) The light device powered by the built-in prong or bulb-base or wired or outside transformer or solar-system, or backup batteries to get AC or DC or both power. (3) and/or various preferred function or features or operate more following works as above or the current invention discussed inside all text and below more details for all functions.

The multiple functions LED light has built-in DV or camera of FIG. 7A may include an LED (7-3) to serve as a night light or-and offer sufficient brightness for camera-system for a big size (whole front surface) illumination by inside plurality of LEDs or COB (Chip on board) (7-2) for camera device and a DV or camera device (inside of the one of 2 circle), or-and has pair of moving detectors/sensor (inside of the other 2 round circles) or-and motion sensor (inside of the other 2 round circles. The alternative arrangement for this housing can be the 2 circles one is push switch to trigger the ring bell and camera system. One of the 2 circuit is sensor device may is a motion sensor or moving detectors and the whole front surface is super brightness LED light to offer sufficient LED illumination while under dark environment to allow camera-assembly to take color digital data including audio data.

From FIG. 7B the DV or camera device of FIG. 7B includes foldable prong or wires or AC plug-wire or bulb-base (7-5) to insert to bulb-receiving socket to connect with power source, a plurality of LEDs in desired type (7-11) to offer sufficient brightness for camera-assembly to take a colorful digital data may including audio sound or communications or conversation, or a pair of LEDs work as night light or-and power fail light (7-12), a pair of moving detector sensor or moving sensor(s) is install within the opening (7-8), or a microphone and speaker install inside the circle areas (7-9), memory card slot (shown on other side of 7-13), multiple position switch or for section auto/on/off/setting switch (7-6), camera head (7-9), and USB ports or power input-end or other receiving-end (7-7) to deliver digital data or charge or the electricity or current inside the cover and hidden antenna (inside the unit) for as long as length to get strong wireless transmission capability, MCU or CPU or IC or other circuit inside the LED light device including software to allow consumer can use touch-panel of phone or computer device to select-areas for detecting moving people or objects and these hardware or software has capability to wireless transmitter or communication with Wi-Fi or Wi-Fi-extend and connect with 3G/4G/5G network assembly (not shown) to connect with cloud storage station and pre-program software or even AI software to do the following work as above discussed and wireless communication circuit inside the housing. The LED device can be any geometric shape with above discussed all parts including all kind of LED light, LED bulb, LED doorbell light, LED garden light, LED security light, LED flashlight, LED torch light, LED motion sensor light, LED motion sensor light, LED Motion or moving detector light device as above discussed.

From FIG. 7C the LED light device is a multiple functions LED light device has optional project image features from top project image output-end with foldable prong or wired or AC Plug-wire or bulb-base (7-18) to get AC power source, has multiple-position slide or push-on switch including auto/on-off/selection/power/photo/video, and has super bright LED light source (7-21) to offer sufficient brightness for camera-device (7-20) has optional zoom in and zoom out focus adjustable camera-device to take a color photos under dark environment where the location also can install the motion sensor or moving detectors (7-21) inside the areas but separate with plurality of LED light source to prevent from interference from light beam to sensor or moving detectors, or optional including LED indicator lighted switch (7-17), microphone and speaker (7-16), indicator LEDs (7-14) and touch switch or inductive switch (7-15), one or more camera-device (7-20) has focus adjustable head(s) on center and plurality number of SMD LEDs or COB (Chip on Board) LED (7-21) light on ring or inside the window to offer flashlight or brightness illumination (7-20), motion sensor with Fresnel in flat or round or dome shape install on the front face of LED light device and inside has photo/shock/smoke/flood sensor or has pair of window to install for a pair of moving detectors sensor (7-21), USB port or solar power source input-end or audio data input-end or charge-input end, transformer input-end (7-23) for digital data or electricity or audio or power delivery or other adaptor (7-23), and micro SD card slot (7-19), and had all MCU or CPU or IC or selected circuit or module for wireless, Wi-Fi, cloud communication system built-into inside of the LED light device housing (7-14) in any geometric shape with power source connector selected from prong, bulb-base, wires, AC plug-wire.

From FIG. 7D the LED light device is a multiple functions LED light device can be one of night/power fail/ motion or moving detector light, security light, LED entrance door light, LED doorbell light, LED bulb with or without a built-in displayer or screen light function, including foldable prong or blub-base or wire, or AC plug wire, outside transformer power source (7-24), a memory card or wireless to storage digital data to cloud by wireless connecting system such as Wi-Fi, Wi-Fi extend, APP, software, or-and USB adaptor compartment or-and back-up battery (7-25), an audio assembly including speaker and microphone or and doorbell sound chip and wireless communication for deliver the audio (7-26), a swivel or rotatable or focus adjustable camera head in center and has plurality of LED(s) on ring or donut circle (7-27), an motion or moving detectors sensor or other type sensor(s) fit within or behind the motion sensor Fresnel lens (7-28), an electroluminescent or LED light for big area illumination (7-29), an hidden antenna compartment (7-30), and a foldable compartment for a screen or displayer (7-30), the other sides of the LED light device has parts & accessories select from power/model selection/setting/Auto for power fail function/All Off switch which has multiple sections. All circuits, IC, electric parts & accessories, all kind transmitter or receiver for Wi-Fi, 3G/4G/5G network, settle lite channel, connect cloud digital data storage station, MP4 format creating circuits, etc. all fit within the housing.

From FIGS. 8A and 8B show the other light device application for portable or wearable flashlight application. Those device has foldable or extendable prongs.

From FIG. 8A, the prongs are folded or retracted while people use flashlight so easily hold by hand or put into pocket, while in FIG. 8B, the prongs are extended for recharging from the outlet which inside housing or within the extension cord or power cord or other AC or DC power source has outlets.

From FIGS. 8A and 8B has all above discussed FIG. 7A to 7B all related parts & accessories so can offer not only the simple flashlight of super strong light beam with or without focus adjustable to make clear and brighter area for sufficient lighted area so can offer the built-in camera unit to take photos under night or dark environment. Also, The Flashlight has built-in camera as above discussed has MP4 or higher rank image shooting capability+ Storage SD or Micro SD card or connect to cloud digital data storage station+ Wi-Fi or 3G/4G/5G and preferred APP or software has pre-determined programs to make people see screen of area and further operate all added or wished function as above discussed.

From FIGS. 8A, 8B, 8C show the portable Flash light has built-in DV, memory unit, and optional wireless communication such as Wi-Fi, 3G or 4G or future wireless transmitter or receiving kits to offer the police or army or military or security person can have the super bright light source to incorporated built-in DV or camera unit(s) and memory unit and optional wireless communication to take photos, take video, offer on-line image though the optional wireless communication to the viewers to see the record or on-line or on-air instant live image to make sure the safety and status while people use the flashlight. While use for Army or Military purpose the DV or Camera can incorporate with above discussion for night time or dark environment to use the (1) Visible flash light beam to offer brightness or (2) un-visible IR or photo diode to make the dim or dark environment to show the surrounding status and not let enemy see the Visible light beam and shoot the army or military team and persons.

The flash light offer super good brightness let the DV or camera or IP Cam or driving Cam or Web-Cam can take nice photos, video, on-line message with colorful image to viewer.

Same for other lighting device did as above discussion. This is offer the portable flashing light or wearable flashlight for people to report or send out image by wireless communication equipment to the phone, computer and screen, communication equipment to report the people status or environment at the dark or evening environment.

This is unique point and the power can be DC power source or rechargeable Power source or wireless recharge power source by market available charging or battery storage units with sufficient big capacity of the electricity.

From FIG. 8C can see the flash light has Main body (8A) has the top-portion (8a) has install LEDs (8c) within the reflectors surrounding or without reflector surrounding. The said LED (8c) is desired specification selected from dip-LED, chip-LED, dice-LED, COB (chip-on-board) LED or any market available LED for desired number, brightness, wattage, colors.

From FIG. 8C, the top-portion (8A) has install camera to take image on desired quality such as Full HD 1080 or other quality as above discussed for quality of photos or video with or without audio. The Top-portion (8a) has the (8a') step to allow install the rubber gasket (not shown) to prevent from water/moisture get into.

From FIG. 8C, the main-body has neck-section ( ) has some quickly screw-thread (8g) to allow the cover (8B) to tight assembled by quickly screw-thread (8g) and pressed the 2nd rubber-gasket (8k) for water-proof to protect inner slots including; memory card slot (8h) which preferred for micro-SD card. The top-cover (8B) (8B') has a lens which has center hole (8m) to allow install a lens-rubber-gasket (8n) (8r) to well install the small-lens (8p) (8s) fit into big-piece optic-lens of top cover (8B) (8B'). or-and slot (8i) for preferred Type A USB-port (8i) which can let the flashlight act as power-bank to supply the built-in battery power to outside other electric device, or-and Slot for the preferred Type C USB-port (8j) which can charge the flashlight inner rechargeable battery (8C).

The main-body (8A) has one end-cap (8D) which has the 3rd rubber gasket (8w) to tightly the end-cap and main-body while screw-together both parts. The said end-cap (8D) has the elastic-conductive-piece (8u) (8u') which has base (8v) (8v') well install inside the end-cap (8D) (8D') inner-base.

The main-body (8A) has install the electric-parts, IC, conductive-rubber-switch/panels to make electric contact with inside circuitry to make the screen to display all kind of functions, setting, display, zoom adjustment, brightness adjustment, light-functions and also has big power on-off switch and super-big push-on/off switch to take photo or-and video while police or army or military or security people can quickly get bad-guy image with desired focus for pre-determined distance range of flashlight such as 300-1,000 feet or 100-300 feet or 10-200 feet or more far distance for military use. The said Flashlight can take photo or-and video or-and audio is most sharp and functional flashlight with built-in camera and storage-device (Memory cards).

The flashlight has built-in camera for professional people use including police or security or army or military or navy or air-force or home owner preferred to use metal piece with super long life for batteries such as 4 D or 4C batteries so can have strong metal and super heavy for profession people to use. That is not only can supply existing flashlight function and self-protection weapon (Heavy and long enough) but also can take image including photo or-and video or-and audio for longer-bar such as 1 feet or 2 feet or 3 feet long for profession use . . . . This is the best than ever and brand new for the out of date flashlight only for illumination, not able to take any full color image or photo with or without audio device. This is the other big improvement for the current invention for flashlight application with built-in camera and this is the Child filed case of the parent 2011 filed case which still have other Child-Filed case still pending so this is CIP of the parent (#KKK-2011) filed case.

Same for other lighting device did as above discussion. This is offer the portable flashing light or wearable flashlight for people to report or send out image by wireless communication equipment to the phone, computer, screen, communication equipment to report the people status or environment at the dark or evening environment.

This is unique and the power can be DC power source or rechargeable Power source or wireless recharge power source by market available charging or battery storage units with sufficient big capacity of the electricity.

FIGS. 9A, 9B, 9C, 9D, 9E, and 9F illustrate a size comparison for a traditional LED light device is one of night light which may add the said camera-assembly so can become a plurality of current invention for Digital Video/Camera units which has all kind of light source for illumination powered by AC or DC or backup power for light device has built-in camera kits, memory card or wireless storage the camera-device captured colorful digital data storage to cloud storage station, optional MCU or CPU of IC or Software to wireless transmitter to communicate system including wife, or Wi-Fi-extend or Wi-Fi-region(s) which is connect with 3G/4G/incoming 5G/even for settle-lite network, cloud data storage station with preferred APP or software from variety of platform so can make expected function(s) or-and following work to detector or monitor all moving people or objects from camera and through camera-assembly with LED light illumination from LED light device by wireless system.

From FIG. 9B shows a typical LED light device which is combination of LED night light or LED motion light device to show the size and dimension so can compare the current invention's LED light has built-in camera kits, The size for current invention of LED light device has built-in camera-assembly has everything for wireless communication to connect with Wi-Fi, Wi-Fi-extend, cloud, 3G/4G/5G for detect moving objects . . . . The size of current invention compares with simple LED night light or LED motion light without camera-assembly depend on what kind of quality of the colorful image required. If less pixel of color image needed, then, size can make smaller because can use low-pixel camera-device such as pin-hole camera.

while FIG. 9B shows a device with multiple camera heads, which can easily fit within the approximate dimensions of the night light. FIG. 9C shows a night vision digital video device with a motion sensor that can be upgraded for auto tracking FIGS. 9E, 9F, 9G show extra small and slim digital recording devices that can be incorporated into a lighting device according to the principles of the invention.

FIG. 9B shows a typical night light to show the size and dimension so can compare the current invention's LED light has built-in camera kits, while FIG. 9B shows a device with multiple camera heads, which can easily fit within the approximate dimensions of the night light. FIG. 9C shows a night vision digital video device with a motion sensor that can be upgraded for auto tracking FIGS. 9E, 9F show extra small and slim digital recording devices that can be incorporated into a lighting device according to the principles of the invention.

From FIG. 9G show all possible connector or contact or conductive element for current invention for LED light has built-in camera-assembly.

Figure 10A:
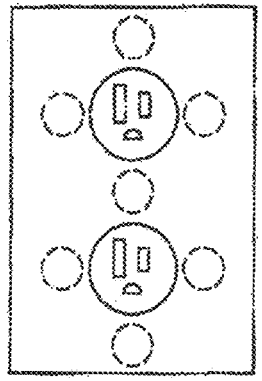
FIGS. 10A and 10B show an embodiment of the current invention which uses a plurality of suction cups to reinforce the prong and hold a super heavy device on a wall outlet cover plate which is a light device has built-in DV or camera device, memory cards and optional wireless communication device(s).
Figure 10B:
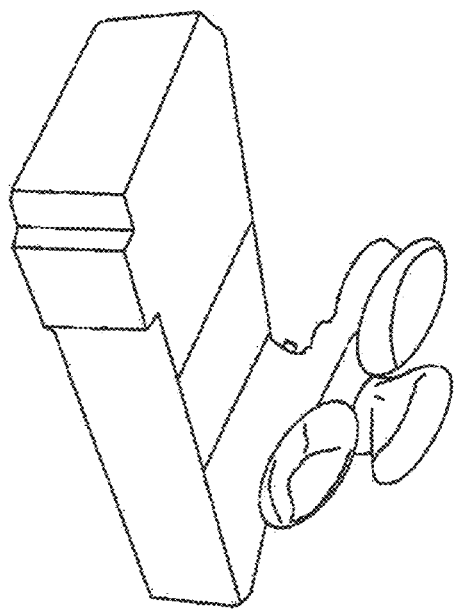

From FIG. 10A show the location where suction cups and where the suction cups will attach on the wall outlet cover plate, shown in FIG. 10B, The said LED light device has prong to connect power source may incorporate with the suction-cup sets to be used to adhere to an outlet cover plate and support the extra weight of the combined DV device and lighting fixture when directly plugged into a wall outlet.

Figure 11A:
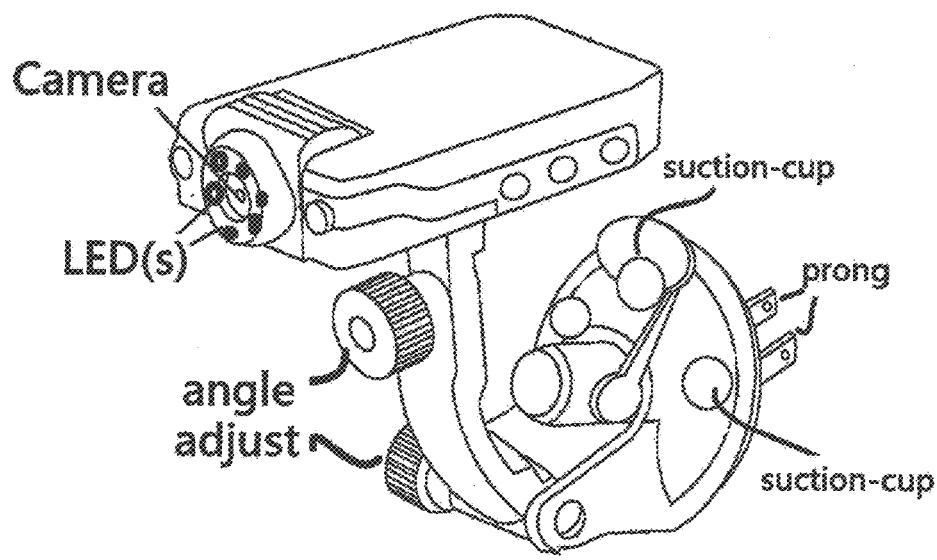
FIGS. 11A and 11B show another embodiment with a plurality of suction cups for light device has built-in DV or camera device, memory cards and optional wireless communication device(s).
Figure 11B:
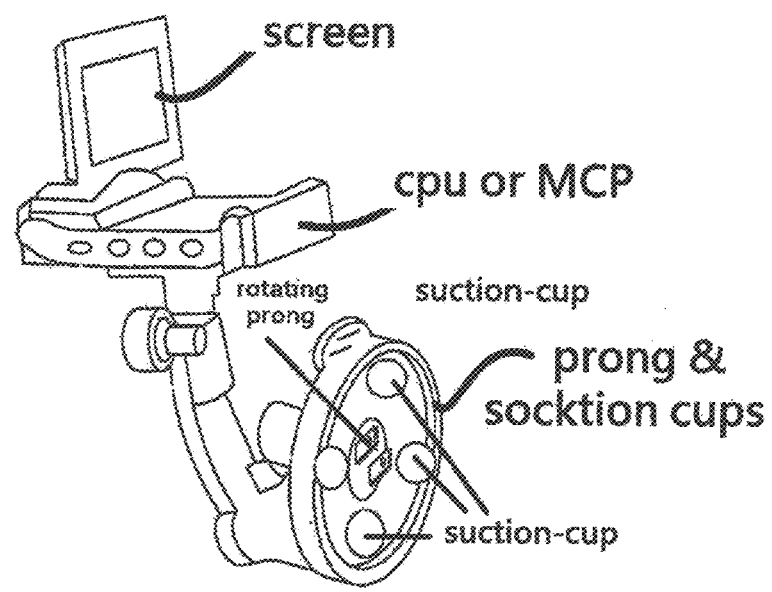

From FIGS. 11A, 11B show alternative DV or camera devices arranged, according to the principles of the invention, to be plugged into a wall outlet and to be supported, as necessary, by additional suction cups. From FIG. 11A show the mount bracket set which can adjust light and camera to desired any angle which is other feature for the current invention for indoor or outdoor installation kits.

From FIG. 12A, 12B, 12C, 12D, show the separate motion or moving detector(s) sensor unit has built-in digital data device at least has camera(s), digital data storage kits, memory card, SD card, Micro SD card, IR motion module, USB set to download or deliver digital data, Bluetooth Module, Wireless Module, control module, photo sensor module, circuit and conductive wires, wireless communication set, Wi-Fi, 3G/4G/or incoming 5G network or internet even for settle lite channel's connection kits, APP download by phone or computer owner, APP software to give wireless instruction to said LED light or-and camera-assembly, controller, circuit so can put the individual separated housing camera-assembly (100) or said motion/moving sensor-unit (100) has built-in camera(s) for the best location to shoot the wider detect angle, or install within hidden location of any LED light device including desk lamp, LED bulb, LED garden light, LED torchlight, LED outdoor light, LED indoor light to protect people home, residence, office, small business or non-people stores.

From FIGS. 12A, 12B, 12C, 12D, 12E The said separated camera-assembly or called motion sensor-unit has built-in camera(s) has optional IR night vision optics kits to help people take the photos under low or no brightness environment for recognizable image while unit install alone for black-n-white; or The said separated camera-assembly or called motion sensor-unit has outside housing LED light source so can get the colorful and nice image, or The said separated camera-assembly or called motion sensor-unit can use the out-of-date any kind of light source brighter lights to take photos or video under lower or no-brightness environment while work with light device for the colorful and nice image.

From FIG. 12-A show the separate camera-assembly (100) or said motion sensor-unit (100) while assembled into (i) current inventions new LED light security light device has every preferred camera relate functions and the LED light source turn on and turn off by the motion sensor or moving-detector(s) trigger, or (ii) out-of-date any kind of light source security light to replace the out-of-date motions sensor-unit which just only has one motion sensor to turn on light function without camera-related functions so can upgrade it from no-camera function to has built-in camera to take digital data.

From FIG. 12-A the separated camera-assembly or called motion sensor-unit which has wired or quickly connector to get power from main security light. The said separated camera-assembly or called motion sensor-unit has everything just has no light source and the separated camera-assembly or called motion sensor-unit powered by conductive wires (110) which can within or inner of the install kits (105) or adjustable kits (105) such as tube, hose, retractable bar, empty linear tube or the others, and the said tube, hose, retractable arms, empty linear tube has the assembly design to allow the separated camera-assembly or called motion sensor-unit motion sensor unit to fit into light device.

The separated camera-assembly or called motion sensor-unit to fit into said Light device has 2 type;

(AAA) One is for out-of-date simple type has only motion/moving sensor as trigger or switch and the separated motion/moving sensor and circuit without camera-assembly, the simple type has its own housing same housing with light source of main light device, or (BBB) the separated motion/moving sensor unit has built-in camera-assembly for all camera related functions to capture colorful digital data and is to replace and new-install to out-of-date motion security light device and the out-of-date motion security light just only has light for illumination so can upgrade out-of-date motion security light device to security light has built-in camera with all desired operation of capture digital data.

This is very important because the separated camera-assembly or called motion sensor-unit only act as switch to turn on the main light device or main LED light device's preferred part or functions. The said separated unit on out-of-date motion security light without any parts related to camera or digital data functions except the motion or moving sensor as switch to turn on the main light device as above discussed is the model (AA).

The one of the alternative (BB) model is separated camera-assembly or called motion sensor-unit has all camera-assembly functions just has no light source so can use this (BB) alternative model to fit into all market out-of-date motion sensor security light device. The said out-of-date motion sensor security light device only had motion sensor to trigger the light source for illumination and without any (1) camera for MP4 format digital data, (2) memory assembly, (3) download USB ports or use other download device (4) Wi-Fi, (5) wireless transmitter or receiver, (6) connect to 3G/4G/incoming 5G network or settle-lite channel system, (7) connect to phone or communication equipment capability, (8) not incorporated with each person not center-control device or association and each person to use internet download APP and use its pre-program software to give wireless instruction to security light to make setting, comparison, selected-areas, adjust all setting or functions.

So this (BB) Alternative update separated camera-assembly or called motion sensor-unit replace old simple motion sensor and assembly by the said universal install kits which has adjustable kits to make all out-of-date simple motion sensor security light device up to security light device has built-in camera with low-cost or middle cost or high-end cost models.

The separate motion sensor unit (100) has at least one of the built-in camera(s) which has its preferred functions for 8 points not existing on the out-of-date security light and the motion sensor (101) or moving detector(s) sensor fit within the separate camera-assembly or called motion sensor-unit housing (100).

From FIG. 12-B show the separated camera-assembly or called motion sensor-unit (100) work alone without working with other light source that has screw-in or plug-in or twist-n-lock male end for example like market existing male lamp base to fit into the female lamp socket or lamp holder to connect with the power source which has built-in camera (102) and built-in wireless communication assembly and related hidden antenna (103) and related electric circuit module (shown on FIG. 12-E) to allow the separate camera-assembly or called motion sensor-unit (100) can has camera to take digital data (which has at least of image or-and sound has minimum MP4 or higher rank data), or-and save into removable memory card or connect to cloud data storage station, or-and download by USB wires kits or send out by wireless system such as Wi-Fi through 3G/4G/or incoming 5G network or deliver by settle-lite channels of the digital data to preferred receiving ends which can connect with 3G/4G/incoming 5G network or catch settle-lite channel device such as mobile phone can connect with 3G/4G/incoming 5G network. Also has wireless receiving circuit to receive APP software instruction from internet go through wifi to the separated camera-assembly or called motion sensor-unit (100) for software pre-program setting, adjust, selection selected-area detection or comparison, facial recognition, tracking moving people or-and merchandise.

The alternative or same function as FIG. 12-B separated camera-assembly or called motion sensor-unit (100) also has LED light source arranged on motion sensor or moving detector (101) to help to take colorful image, or night vision infra-red diode to help take black-and-white image, or other wireless communication equipment so can also communicate with APP software and take APP software instruction by wireless communication to each person not center-control system or device including personal computer, wireless receiving ends or equipment(s).

While the said separated camera-assembly or called motion sensor-unit (100) powered by female lamp holder, lamp base (109-1), lamp socket, contactor, connector because the home lighting may not turn on at the night time, so the separated camera-assembly or called motion sensor-unit (100) has built-in back up rechargeable battery (109-4) or energy storage device (109-4), so camera and light source will not lose power during the female lamp holder has no power or power failure time. So, (CC) The separated camera-assembly or called motion sensor-unit (100) has the male bulb-base or connector type preferred to has backup battery (109-4) or energy storage device (109-4) to supply sufficient and non-power shutdown power to the separated camera-assembly or called motion sensor-unit (100) to continue work while female lamp holder no power while people turn off the lamp holder power or power failure time (DD) The lamp-base type of camera-assembly or called motion sensor-unit (100) has the IR night vision module or built-in LED light source(s) to help the built-in camera can still take a clear photos while the power fail or female lamp-base power off. These (CC) and (DD)2 important preferred or alternative embodiments and features for current invention for the male lamp-base or connector type of separate camera-assembly or called motion sensor-unit (100) has built-in camera install alone and fit within the female lamp base, lamp socket, lamp holder or other connector or contactors.

From FIG. 12-B, The alternative type is (EE) camera-assembly or called motion sensor-unit (100) has AC or DC power from the female lamp-holder or lamp-socket or male lamp-base or connector from home, office, residence. The separate camera-assembly or called motion sensor-unit (100) has at least one camera or multiple cameras (102) has the male lamp-base or preferred connector or contactors (109-1) to connect with the female lamp-base or lamp-holder or lamp-socket connector or contactors (not shown), so the AC or DC electricity to drive the separate camera-assembly or called motion sensor-unit (100) but while the lamp holder power is shut down or power failure time, the power will use the backup energy storage device such as rechargeable batteries or the other energy device to supply sufficient power to the said male lamp-base separate motion sensor.

From FIG. 12-B also show the camera-assembly (100) which has foldable parts, arms, or extendable pole to assembly with the base of security light with hidden antenna (103).

The said separated camera-assembly (100) or said motion sensor-unit (100) has built-in camera(s) has one of the preferred parts including:

(A) optional IR night vision optics kits (109-3) to help people take the photos under low or no brightness environment for recognizable image, or (B) all kind of the Light source (existing security light may not has LED light source or current invention for whole set security light has LED light source as FIG. 17), so can offer the brighter lights to take photos or video under lower or no-brightness environment for black-n-white, or colorful and nice image.

It also has the IR night vision for this power fail or power off time period to allow the camera kits to take photos. This is other alternative design by current invention and cover for the current invention for separated motion sensor unit application.

The current invention if power is come from the male lamp-base or prong or AC wired or AC plug wire or connector or contactor into the said LED lighting including LED light fixture, LED bulb, Lamp holder, flashlight, entrance door light, garden light, floor light, outdoor or indoor application as above discussed example with power fail consideration while power failure or power shut-down need to have the backup energy storage device to supply power with (a) IR night vision diodes or (b) sensor to turn on light source; to help to take a clear photos or video.

From FIG. 12-C shown the separate camera-assembly or called motion sensor-unit (100) has the wireless communication antenna (107) on outside housing area to get the best wireless communication capability than the FIG. 12-B hidden antenna (103).

Also, From FIG. 12-C show the camera-assembly or called motion sensor-unit (100) has one or more than one fresnel areas and motion/moving PIR sensor (101), camera (102), memory card in a SD or micro SC card or other market available memory kit's slot (108) for low-end version without Cloud and download APP with pre-program APP software to let phone or computer owner (not center control system) to remote control the said LED light or-and camera-assembly.

From the FIG. 12C the separated camera-assembly or called motion sensor-unit (100) power by the conductive wires (110) has the installation kits or adjustable kits (105) to help the said separate camera-assembly or called motion sensor-unit (100) can well installation on any desired location(s) of current invention complete light device or replace all out-of-date non-camera light device to get all the current invention discuss for camera related functions similar with the above discussion for variety combinations with preferred pole or long length of antenna to get best signal from wireless system.

From FIG. 12-D show the separated motion sensor unit (100) has the plug-in prong to supply the power. The prong may retractable so can easily carry to anywhere. The wireless communication antenna (107) also can quickly take apart and re-assembly while traveling or packing to reduce the packing size. The separate camera-assembly or called motion sensor-unit (100) has the desired circuit combinations including link to the other wireless system including zigbee so can control more than one light source but also outlet, adaptor, surge protection adaptor or and all kind of electric product within the indoor ZigBee electric wave cover area(s), so can get different or part or all functions as current invention discussed on above text or also can make model as market required and cost consideration such as (Product group 1)=The low-cost model will be only the PIR motion or moving detector sensor (111), (Product group 2)=The middle-cost model, PIR motion or moving detectors sensor (111)

+Blue tooth module or USB download wires sets (112), (Product group 3)=The higher-cost:

PIR motion/moving detector sensor (111)

+wireless communication assembly of Wi-Fi (113) and internet 3/4/5G to wireless the camera captured color image and audio digital data wireless to cloud storage station +incorporate with download APP and its software to do following work, (Product group 4)=The Deluxe model: for more higher grade will be PIR motion/moving detector sensor (111)

+wireless communication assembly of Wi-Fi (113) and internet 3/4/5G to wireless the camera captured color image and audio digital data wireless to cloud storage station +incorporate with download APP (113) and its software to do following work, +Wireless communication with cloud from personal phone or computer through download APP and software through internet 3/4/5G to Wi-Fi (113) to LED light device has built-in camera device for following work.

+Multiple-ways communication including a speaker to delivery audio sound, ringbell, or conversation (not shown) so can talk with the people or alive objects with sound while people or alive object stay in the camera location range.

These different level products depend on the cost and functions and these products just for example, it is appreciated that all the FIG. 12-A to FIG. 12-D just limited samples it should not limited for all alternative, replacement, equal functions, details for part or all function as above discussed, it is appreciated any alternative or equal function or equivalent or replaceable of all current invention or co-pending filing or issued parent patents discussed, mentioned should still fall within current invention scope and claim coverage.

From FIG. 12-E show the one of embodiment detail construction for the said separated camera-assembly or called motion sensor-unit (100) which has front case (120) which has openings (120-1) to install the motion-sensor PIR (122-1) or moving detectors sensor (122-1) fresnel lens (121), or PIR head (122-1) or photo sensor head (123) on the PIR sensor or detectors module (122) also has 2nd openings (120-2) on bottom location) to install the Camera head which on the camera module (124) with its camera lens or lens assembly (125).

The said camera-assembly or called motion sen interface sensor-unit (100) and for upgrade model can has the Bluetooth/USB download set, and/or wireless, and/or wife, and// or Zigbee interface install within the wireless module (126) depend on the market required for part of all above discussed functions.

From FIG. 12-E, The said camera-assembly or called motion sensor-unit (100) has more higher grade sensor or detector module (122) specification and functions including Wi-Fi, connect with cloud, receiving APP software instruction, connect with Cloud, 3G/4G/5G or-and internet or-and network, settle-lite channel connection system or assembly.

From FIG. 12-E, The Back case has several screw or fasten kits (120-3) to assembly the front case (120) and back case (120') together. The inner housing has adjust kits or join kits (127) connect with the outside adjust or join kits (127') to make the separate motion sensor unit can install, adjust angle, position, orientation on anywhere preferred.

The inner empty space of the adjust or join kits (127) (127') allow the electric wires to connect with circuit (122) (124) (126) which now is 3 pcs PCB but it can make into 1 PCB while all function is fixed and need all these 3 circuit separated functions PCB, and power source.

The wireless antenna (129) can tread-into the inner holder (not shown) to make quickly install and take-apart and re-assembly for wireless communication models. The antenna also can be a hidden antenna like FIG. 12-B shown with as long as possible to get preferred transmitting or receiving range.

This preferred embodiment teach the said separated camera-assembly or called motion sensor-unit (100) has multiple of the circuit or single one PCB circuit and modules which each of the circuit or module has its own functions which may including (a) Motion/moving detectors sensor and photos sensor module (b) Bluetooth module or USB port with data delivery sets (c) wireless communication module (d) Memory card or connect system to cloud storage station module (e) sound module (f) recorder sound module for capture sound (g) camera module for visible capture functions has minimum MP4 Format digital data (h) SIM card or slot device (i) Wireless communication system including Wi-Fi, 3G/4G/5G network or settle-lite channel communication or transmitting or receiving system (j) backup batteries or power storage device for power fail time do not stop working, and Has desired electric parts & accessories & IC chip to help all these different or part or all functions modules, circuit to present the pre-determined function, performance, effects.

The electric parts & accessories may has desired combination or at least one selected from motion sensor/moving detectors, photo sensor, speaker, microphone, memory storage device, camera capture system, video capture device, sound capture device, Bluetooth device or USB port for data delivery, wireless communication device, sim card (for wireless communication to send out phone, email, alert, message though the internet, wireless network though market available internet or telecommunication system available from market place), conductive wire, prongs, backup battery (for power fail time for backup power source) so can incorporated with phone owner download APP and related software from internet. So one of the preferred embodiment of the said separated camera-assembly or so called sensor-unit has everything except the light source inside the said separated camera-assembly housing.

FIGS. 12-F, 12-G, 12-H, 12-I, 12-J, 12-K, show some current invention's preferred models to upgrade the current market available non-camera motion sensor security which has different light source, construction, number of light units, shape, brightness, sensor range, sensor distance has built-in Motion sensor or separate motion sensor, or separated wireless motion sensor unit, has IR night vision or without the IR night vision. All these preferred embodiments for FIGS. 12-F, 12-G, 12-H, 12-I, 12-J, 12-K are some of preferred embodiment for the whole sets of the motion security light but not limited to these embodiments.

From FIG. 12-F, 12-G, 12-H, 12-I show the AC or DC powered by wired or plug-in or other power source connector as FIG. 9G model for all kind of market motion/moving detectors sensor security light which has Par38 or Par30 or other preferred light source (L1) or LED light source (L2) to offer the super bright light beam while the motion or moving or heat been detected by motion sensor or moving detector(s) (M1) which are install on the base (B1) with adjustable frame or arms or join-piece (F1) so can adjust the angle, position, orientation of the said camera (C1) and each of light source (L1) (L2) of the said LED security light has built-in base (B1) or separated housing camera-assembly (M1 also called sensor-unit) will take colorful or even Full HD or 4K or 8K image or photos or video at the same time and get super bright light beam help at the dark environment to take a colorful photos or video and storage inside memory storage device such preferred SD or MicroSD card for low-end products without any wireless system, or wireless transmitting through wifi or wifi-extend or-and internet, 3/4/5G network to the cloud storage station for phone owner download APP with software to make instruction, selection, operation for all possible and preferred following work as above discussed.

The FIG. 12-F, 12-G, 12-H, 12-I show the motion sensor or moving detector(s) (M1) is install on the base (B1) or install inside separated housing (M2), and camera-assembly fit into base (C1), or (C3) install on the separated camera-assembly or called sensor-unit housing.

From FIG. 12-F, 12-G, 12-H, 12-I, 12-J show all kind of motion sensor or moving detector (M1) (M2) or camera-assembly install base (C1)(C2) or separated housing (C3) or other installation should all fall within the current invention scope for motion sensor LED Security light for variety construction for FIG. 12-F, 12-G, 12-H, 12-I, 12-J, 12-K for all construction for different arrangement for LED light source, Camera-assembly, Power connection, power type (AC or DC or solar Power or storage power device or rechargeable battery). It is appreciated any other LED security light has same function has LED light source to supply the brightness to help camera-assembly to take color image or-and audio digital data and use wife go through 3/4/5G or-and internet to wireless delivery digital data to cloud to let people use download APP with software from internet to control the LED light or-and camera-system to make following work while owner of phone to use APP software to wireless through 3/4/5G or internet with optional SIM card to give instruction back to wife and wifi-extend to LED security light for setting, adjustment, selected-areas, comparison, calculation, tracing, recording video, take photos, send out audio data, ring bell; should fall within the current invention without any limitation basing on limited embodiments or FIGS. 12-F, 12-G, 12-H, 12-I, 12-J, 12-K show variety combination, arrangement, examples. Any equal functions or alternative or replacement still fall within the current invention which is not same as all US prior art before current invention parent filed on November 2011 with current invention with all update skill or technical including cloud, download APP with software, give back all instruction by APP with software to send back instruction or operate following work.

From the FIG. 12H is one of the preferred the current invention's separated camera-assembly or called motion sensor has built-in camera (C3) which has adjustable frame or arms or join-piece (F1) so can make easily install, add-on, take-apart, re-assembly for all the market available non-camera security light so can replace the non-camera motion sensor to the current invention's built-in camera motion sensor.

From FIG. 12H other application is to use the same adjustable frame or arms or join-piece (F1) to make this upgrade from Non-camera security light become to built-in camera motion sensor security light instantly.

The market available non-camera security light has limited type of base and frame, arms, join-piece so it is very simple to make universal kits to make the replace or upgrade from non-camera motion sensor unit to the built-in camera motion sensor module.

Some time, the camera kits also can has its own housing if required so can make the camera-module also put on the separate unit for special customer-made application is not limited for current invention for security light or more wide as parent filing U.S. patent application Ser. No. 14/265,838, filed Apr. 30, 2014, which is a continuation-in-part of U.S. patent application Ser. No. 14/265,738, filed Apr. 30, 2014, which is a continuation-in-part of U.S. patent application Ser. No. 13/295,301, filed Nov. 15, 2011, now U.S. Pat. No. 8,760,514, each of which is incorporated herein by reference. to cover all kind of lighting fixture.

From FIGS. 12-I, 12-J, 12-K show more than 18 of some preferred embodiments which has different light source, motion/moving sensor, different constructions, detachable motions/moving product/unit, different motion sensor (Flat or dome or half-ball). Some of embodiment, the power is from DC power source which is solar (Solar 1) (Solar 2) or the inner backup batteries (see FIG. 12-E (126-1) shown for power fail time use).

From FIG. 12-J can see the solar power module (Solar-2) which can use wired or wireless to offer the power to the said separate housing which has built-in camera-unit (C3) and motion sensor (M2) and detected the moving or heat of the moving object(s) and use the inner wire or wireless assembly and kits to deliver or transmit the electric signal to the light device (L2) here is preferred is LED light source and/or send the wireless transmitting digital data though the inner SIM-card and though market available internet or Wi-Fi or internet or other tele-communication channels to send digital data such as email, message, data, image, sound, alarm to people's mobile phone, computer, security system, police station to know the house, residence, office, business area's situation further more can electric wireless multiple-ways communication talk and send out all video or audio data to all parties which more than 2 ways wireless communication or send out pre-determined signals to other device to do pre-determined works, functions.

FIG. 12-F, 12-G, 12-H, 12-I, 12-J, 12-K, show 5+18=total 23 different parts and accessories embodiment of current invention's preferred models to upgrade the current market available non-camera motion sensor security which has different light source, construction, number of light units, shape, brightness, sensor range, sensor distance has built-in Motion sensor or separate motion sensor, or separated wireless motion sensor unit, has IR night vision or without the IR night vision.

All these preferred embodiments for FIG. 12-F, 12-G, 12-H, 12-I, 12-J, 12-K are some of preferred embodiment for the whole sets of the motion security light but not limited to these embodiments.

The current invention for above FIGS. 12-A to 12-K drawing and detail description is not a new issues basing on the Parent filing which cover all the lighting device as parent filing details listed on U.S. patent application Ser. No. 14/265,838, filed Apr. 30, 2014, which is a continuation-in-part of U.S. patent application Ser. No. 14/265,738, filed Apr. 30, 2014, which is a continuation-in-part of U.S. patent application Ser. No. 13/295,301, filed Nov. 15, 2011, now U.S. Pat. No. 8,760,514, each of which is incorporated herein by reference. to cover all kind of lighting fixture.

FIG. 12K show other 18 preferred assortment for light source, built-in or separated sensor products/unit, camera to incorporate with the built-in wireless transmitter-device to connect the Wi-Fi or-and Wi-Fi-extender device or-and more router to get the best functions for far-distance between the outdoor security light to the Wi-Fi or-and router device and apply the Wi-Fi-extender device to increase the distance to make sure the distance and walls do not block-out too much electric-delivery as FIG. 12J showed the more than one Wi-Fi or-and Wi-Fi-extender or-and more router units.

From FIG. 12K show all preferred 18 different shape, construction, size, brightness, number of LED-light unit(s), built-in transmitter-device, or-and separated housing motion/moving products/units which can assembled with LED light device base which is attached on the wall. These 18 preferred embodiment and 5 embodiment of FIG. 12F to 12J has brief construction. It is appreciated any similar or replaceable or equal functions construction or concept or applications should still fall within the current and all above discussed parent filed case idea, scope, concept, design features and should be fall within current invention and all parent filed cases' claims.

From FIG. 13 show the multiple functions for current invention for any combination. The all features and construction been discussed as above text, It is appreciated that no any limitation for limited text inside this filing. It is appreciated that all the co-pending filing, patented parent, current invention all claims or disclosure should be fall within the current claims coverage. The flow charter may has different text, Please check the current invention for all same function, equal function, replaceable, alternative words to back up all any confusing words shown on flow charter list.

From FIG. 13 show the most important show the (1) phone owner down load APP and APP software, (2) 3G/4G/5G or internet wireless transmitting, (3) receiving APP software signals or instruction back to Wifi and LED light device has LED light source and camera-assembly (4) Wi-Fi or WiFi-extend, internet (5) cloud storage station (6) moving detector(s) hardware or-and related software for selected-areas for image or screen comparison (7) camera captured MP4, 4K, 8K image with audio digital data (8) sufficient light brightness supply from LED light source (9) All kind of camera device to offer digital data including photo, video, audio depend on what kind of combination for market requirement.

From FIG. 14 show the preferred the one of the PIR head with Digital not analog so can prevent from false triggers In summary, the invention provides a light device having a built-in digital data device powered by an AC unlimited power source that supplies unlimited power to the device or DC big capacity of electricity to supplies sufficient power to device, the digital data device including at least one camera having means for capturing images, data, or sound at a desired shooting angle, resolution, color, brightness, and sharpness, and at least one of means for storing the images, data, or sound into a memory and means for transmitting the images, data, or sound to at least one of a communication device, computer device, phone, receiver device, and display device, the digital data device further including at least one of components selected from lenses, optical components, electrical components, mechanical components, circuitry, an integrated circuit (IC), data delivery means, data storage means, a USB port, a cable, a microphone, record means, display means, sensor means, PIR means, IR means, night vision means, flash means, a switch means, motion detect means, sound detect means, a photo sensor, a motor, and tracking means. The light device includes a housing and means for emitting light beams, and is supplied with power from the power source by circuitry including at least one of a controller, switch, sensor, conductors, integrated circuit, remote controller, and wireless communication means, The light device may be selected from a night light, desk lamp, floor lamp, down light, ceiling light, track light, security light, projection light, flashlight, outdoor light, indoor light, LED light fixture, LED light bar, LED picture light, LED Closet light, LED door light, LED garage light, The light device including LED motion sensor light, LED power failure light, LED light with auto tracking, LED patio light, and LED light device, and may be connected with the power source by prongs, a conductive wire with a plug extending from the light device, a USB adaptor, a transformer device, and an inductor device.

FIG. 15 shown the one of APP screen with all selected areas, functions, controller with optional added screen or image comparison.

FIG. 16 shown the one of the user interface screen comparison or functions.

From FIG. 17 show the current invention one of the operation's flow-chart. The Security light or LED light device has built-in camera-assembly. The said one or more than one of LED light source has separated own housing which is separated with the said camera-assembly which has all CPU, MCU, IC circuit so can take video or audio under-predetermined program to turn on the LED light source(s) on day time or bright area. The said security light also work under dark environment to take colorful photo, video, image with optional sound or audio to incorporate with wifi or wifi-extend to deliver to cloud storage station under the LED light source turn on to offer sufficient brightness. The said full color image, photo, video with or without the audio digital data delivery into cloud storage station and the phone or computer owner download the preferred or pre-program APP has designed software to remote control the said LED light device or the said camera-assembly on far away from the home or office or residence wifi or wifi-extend location. The said APP with designed software is download from internet. These controller or adjust or setting or selected-areas or make comparison, detection, send out message, send out alarm signal, call for police or people all need download from internet and use wireless send instruction to the used wifi to connect with the said camera-assembly or-and LED light source. So, the current invention has to connect or link with APP and its software outside the said camera-assembly or-and LED light source. This is not similar with Farmer prior art filed on May 2011.

From FIG. 18 show the LED light has built-in camera-assembly for traffic device or moving traffic device including motor-cycle, vehicle, RV, mobile home, boat, ship, train, air-craft which has LED light to offer the sufficient brightness under dark environment to let camera-assembly to catch colorful image or photo or video or update steam image incorporate with wifi or wifi-extend wireless transmit to cloud storage station and send signal to owner of phone or computer or monitor to connect the pre-download APP and use APP software to get digital data to make setting, adjust, select-areas from image or screen-image. The said full color image, photo, video, or-and audio device inside cloud and allow APP software or other CPU or MCU or IC or Circuit to make further analysis, comparison, recognition, detection, calculation, set group for moving people or objects or merchandise including (1) facial recognition, (2) crime tracing, (3) auto tracking moving people with purchase merchandise, (4) make calculation for people purchase merchandise for type, quantity, unit price, total sum for financial calculation, (5) comparison or detection for moving people or-and merchandise from screen image or camera-image to prevent non-necessary trigger signal or alarm deliver to owner of phone or computer, (6) analysis or built-habit or compare peoples or group people behavior, (7) detect, trace, analysis for moving people or merchandise or products or objects related movement.

From FIG. 18 show the one of traffic equipment is a police or security car (18*a*) has body parts (18*b*) can install current LED torch light (18C) on the car frame (18*b*) and has control bar (18*d*) which can adjust the said LED torch light (18*c*) to desired location, orientation cover all x-y-z axis. This made a big improvement for current all police car use the head-lamp as light source to supply sufficient illumination under dark environment to let built-in camera-assembly (18*m*) to take full color image, photo, video or-and audio digital data so this kind of the out-of-date equipment only can take image in front of the car head-lamp and all rest area not in front of car is impossible. Also, the out-of-date police car without link to cloud and can operate by all other police-teams or police-mans from their phone carried by police colleague or computer system inside the car. So the current invention to built-in camera-assembly into torch light made big improvement for police to do their duty under dark environment to take any orientation or position crime for digital data recording or steam-display to all colleague or police station or police central internet station.

From FIG. 18 the one of transportation equipment is car (18*a*) has body parts (18K) to install a base of torch light (19*e*) and base and arms to support the LED torch light which has built-in camera-assembly (19*f*) and preferred super bright LED COB (chips-on-board) (18*g*) light source or-and plurality of super bright LED-dice or LED-chips or LED-unit (18*h*) to offer super brightness illumination up to 300 feets or 100 meter or more far distance so can let camera to take clear and color image or photos or video with audio digital data to instantly transfer to wireless transfer to cloud storage station. It can have Wifi system built-inside the are or through the current invention FIG. 14 for built-in Sim card so can go through the Wifi or sim card system and 3/4/5G and internet. The said car torch light has the control bar (18*i*) and controller which may has plurality of controller or adjust-switch to change, set, adjust the said LED light brightness, LED light focus, camera zoom, light or camera shoot angle, distance, or other adjust or setting or pixels or sound or microphone audio adjustment or setting, take photo during take video, position or location or orientation detection and wireless pass to colleague or control center for GPS of crime or car or moving objects.

From FIG. 18A, show the one of preferred traffic equipment here preferred is car for police or security which has car (18*n*) has two side car body-frame (18*p*) (18*x*) has install the LED torch light (18*q*) (18*z*) both has base (18*y*) to solid install movable to any location of x-y-z axis LED torch light and the torch light has connected with inner car control-bar (18*t*) (18*z*1) and control-switch (18*u*) (18*v*) (18*z*2) (18*z*3) so can adjust or set or change all details, angle, light brightness, camera shoot properties, camera shoot quality, LED light beam distance, camera-assembly shoot and wireless transmitting functions.

From FIG. 18B, show the LED torch light install on traffic equipment which has the body-frame or body-parts (18*l*) to install the torch light base (182) and the top LED torch light (183) which has camera-assembly (184) or camera-lens (184) to allow preferred high-power LEDs in COB or dice or chips or dip types to supply sufficient illumination to camera to take full color image, photo, video or-and sound, audio under dark environment. The outside torch light connect with inner control-bar (186) and control-bar has built-in plurality of switch, may in any type such as knobs (187), twist switch (188), touch switch (189), conductive switch (189*a*), push on-off switch (189*b*), slide switch (189*b*), rotating switch (189*c*), or rotatable or puch-up or back or position switch (189) so can make all kind of setting, adjust, selection, zoom, focus, or other related all setting or adjust, or control.

The said LED light device at least including LED bulb or security light or flashlight or garden light, or torch light, or other LED light source which can get the full color image of photos or video which also can incorporate with the phone owner download APP software which including image or-and screen comparison to make sure the selected-area(s) or person(s) or face(s) or object(s) including (1) movement or-and moving (2) face recognition (3) Identify the person (4) pick-up item(s) (5) other behavior or action to go through the other pre-determined interface or computer-analysis or cloud-system to get digital data including one or more than one functions selected from (AA) moving or movement status, (BB) personal identification including face comparison, (CC) pickup items and wireless to calculate the total items pickup and total amount been pickup, (DD) detect the payment or-and stolen (EE) calculate the personal bank account or i-pay, electric payment system, pay-pale, google pay or other wireless payments related to the personal account (EE) habit and times and items and time and place and objects for purchased.

The current invention for LED bulb which connect the female bulb-socket is the most simple connect with AC power source with optional extendable or retractable camera or-and motion sensor or-and moving detector or-and screen-comparison features to connect with Wi-Fi or-and Wi-Fi-extend to get clear digital data including image or video with audio to connect with cloud and computer system which phone owner download APP has desired software or APP has pre-program to get image or-and video or-and audio to input the computer system to do all kind of analysis or calculation or saving or comparison or operate the personal face, identification, purchase, movement, behavior to make record, calculation, payment from Wi-Fi, or-and Wi-Fi-extend, or-and cloud storage-station, or-and remote control, or-and screen comparison, or-and screen calculation pickup items and connect with financial accounts for finish the business, purchase, trading behavior, or-and face recognition to find people wanted or compare with crime analysis, or-and other personal analysis and storage and comparison. This is the best personal identification because (1) simple to connect with power source by the bulb-base to bulb-socket (2) The extendable and retractable parts to load the sensor(s) or-and any kind of camera can fit into recess light deep hole on ceiling and overcome all possible block-object including ceiling wall because the ceiling bulb-socket is always on top of ceiling which is the lowest block-objects such as people height, displayer height, stores racket, poster . . . etc. So, the current series LED bulb with extendable or retractable parts, pole, bar, cylinder, tube with angle adjustable or length tightness parts is one of the best application for no people stores.

Other best application to prevent from the residence or office or stores safety is security light incorporated with the all kind of camera basing on above discussed with Wi-Fi, or-and Wi-Fi-extend, or-and internet, or-and cloud storage-station, or-and motion sensor to turn on/off light under dark environments, or-and moving-detector hardware or screen-image comparison to determine the wireless transmitting signal(s) to communication device, or-and multiple way communication for all kind of audio-type, or-and phone owner download APP with desired software or APP has pre-program software to make selection, control, adjustable, or-and 3G/4G/5G or internet or more high speed network to connect with Wi-Fi or-and communication device. This is best home, office, stores safety protection and whenever the bad guys get into selected-areas covered by the current invention security light has above listed function, the owner of house, office, stores can instant know without false signals so can use built-in or auto-dial or manual dial to security, police, friend, neighbor to catch bad guy at once whenever they interrupt into the people properties.

Other best application for current invention is for security or police or military to have the current inventions LED flashlight has all kind of camera to take the photos which not only for flashlight light for police or security but also for the LED torch light on police or security light which has built in camera. Thus, the police or security light can use the body-carried flashlight or built-in on cars torch light with built-in camera to take the running bad guy to record the colorful image under dark environment. The said flashlight light because only has limited battery life so preferred only storage the colorful image into memory-unit such as SD card or Micro SD card. But for car torch light which is perfectly because normally police or security use the car-head light to offer sufficient light brightness to the built-in recorder equipment but this kind of car head-light only emit light to front areas without change direction at all, so the current invention for police car torch light can adjust to any angle wanted, so to make the current invention for LED torch light has built-in camera device so help police or security to get desired colorful image or-and audio to any direction . . . . Also, the car torch-light has the built-in all kind of camera device and can adjust desired angle to offer full color or HD 1080 or-and video to support the crime scene evidence is the other one best of application From above discussed text, figure, drawing, flow charter, function working charter, The current invention features also should be cover: A LED light having a built-in camera including digital data device consist of: said LED light has preferred LED light source(s) and at least one of motion sensor including PIR detector, or moving detectors with comparison functions, wherein: said digital data device includes: at least one camera having function(s) for capturing images, data, or sound at a desired shooting angle, distance, resolution, color, brightness, and sharpness in MP4 or more high speed format to take photos or video for pre-determined time, period of time for certain times, and at least one storing kits or station for storing the said images, data, or sound into a memory or storage kits or cloud storage station for (1) an USB set or electric device or wireless set to download, or/and (2) a delivery-tool to deliver the said images, data, or sound by connection system or transmitter to at least one of a communication device, computer device, phone, receiver device, display device; or for display or replay or reply or answer of the images, data, or sound by the digital data device itself; said light device includes a housing and function(s) for emitting visible LED light beams offer sufficient brightness to camera unit to take colorful photo(s) or video(s) into MP4 format digital data with sound and other data under the dark environment, said LED light device has AC-to-DC circuit to operate the DC LED light source, and optional circuitry including at least one of a controller, switch, motion or moving or photo or other sensor, conductors, integrated circuit (IC), remote controller, and wireless connect system, communication assembly and the said LED light having desired combination functions select from: (1) MP4 of higher rank digital data is storage into memory kit or card, or save into cloud storage station, and download to display, replay, reply; (2) or digital data can use electric device or Bluetooth or USB set by wire or wireless tool(s) to download and displayer, replay or reply; (3) or digital data delivery by Wi-Fi or-and Wi-Fi-extend or desired wireless connect system with APP software with optional added features including but not limited to select moving detect-areas incorporated desired pre-program software for certain functions and cloud storage-station(s) through wireless network, 3G or 4G or update wireless network, router, server(s) to operate message, data, alert, words, and preferred to incorporate with apps, other programed-software to deliver by emails, line, skype, WhatsApp, or update platform(s) software to variety of communication or computer or consumer electric products or-and software to make personal identification, purchase, crime comparison from colorful or HD 1080 or image took by all kind of camera equipment, which can connect with 3G/4G/ incoming 5G connection system to communication device(s) including mobile phone, computer, monitor; (4) or LED light device have multiple-ways communication assembly to talk and hear and other audio-effects and to review by microphone or-and speaker through Wi-Fi or-and optional added Wi-Fi-extend and wireless network, 3G or 4G or update wireless network, router, server; (5) or LED light device while incorporate with related program(s) software can selected moving detected-areas, compare selected-areas for moving or movements, or-and remote control camera angle, position, orientation or-and selection, adjustment, changing setting, and talking or delivery audio-effects though LED light device; (6) or LED light has motion sensor/moving detector or other sensor unit or module which only has motion sensor/moving detector/or brightness or other sensor act as switch or comparison equipment just to turn on or turn off all LED lighting or-and camera or-and digital data function(s) which motion sensor/moving detector/brightness or other sensor can be (a) install with camera or separated with camera, or (b) install module inside of LED light wall mounted base without its own housing, or install unit outside of LED light wall mounted base has its own housing and assembly with LED light base, or (c) the motion sensor or-and moving detector incorporated with all kind of camera install inside one individual housing to assembly on wall mounted base of said LED light device by screw-assembly and tighten kits. The said individual device has all functions as above discussed camera, motion sensor, moving detectors, Wi-Fi, wireless communication, wireless delivery video, photo, audio, wireless connect to APP, 3G, 4G, 5G, cloud storage station, connect with preprogram APP has detected-areas or personal face recognition or other comparison features for people, products, items, object to input to computer system or cloud system to get desired digital data and record and delivery desired signals for certain purpose; and this kind of individual unit has any desired combination except the light-source will use LED or use the existing light source while the security light has no camera functions but has its own any of light-source (LED or any others); (7) or LED light has motion sensor/moving detector(s) or other sensor unit which has separated own housing not install inside LED light wall mounted base, and (7-1) at least has built-in camera and memory kits or-and (7-2) has parts or all of digital data operation including (7a) USB download set or wireless transmitter or receiver for download work, (7-b) communication to wireless Wi-Fi, 3G/4G/incoming 5G network, cloud storage station, APP or other programed software has optional screen or image-comparison to make sure not non-necessary movement so not send out electric-signals for hundred times while trigger by cat, dog, street cars, or moving objects is no harm to residence or house or office (7-c) deliver digital data to display, phone, computer, displayer, monitor functions has optional added screen selection or-and screen-comparison or-and image-comparison for moving people, object, merchandise, products and send out pre-programed digital data or following pre-program(s) operation (7-d) operate for other selected or added functions basing on all kind of camera took colorful image or-and audio with pre-programed software to make comparison, identification, calculation, selection, payment, account management by related electric or mechanical parts and accessories so can fit the said separated housing motion sensor or-and moving detectors or-and other sensor unit to non-camera LED light device including motion security light, or LED bulb, or car torch light, or flashlight or garden light or patio light not including street light to upgrade and increase value and functions, said LED light device is connected with the power source by one or combination of (a) prongs, (b) conductive wire, (C) a conductive wire with a plug extending from the light device, (d) a USB adaptor, (e) a transformer device, (f) a power fail backup power storage device (g) an inductor device for wireless charging inner power kits, (h) AC plug-wire, (i) male bulb-base assembly with female bulb-socket.

The Wi-Fi extend, or extender prolongs the connection range between the current invention and home or office Wi-Fi router to link the current invention to the internet. The Wi-Fi extend, or extender also serves as a conduit between APP software and the current invention to execute desired functions of the current invention. In order to achieve said transmit functions between APP and the current invention, the Wi-Fi extend or extender will not only transmit internet signals but also provide APP functions for long-range connections between APP and the current invention.

The said different generations of cellular wireless transmissions: 1G, 2G, 3G, 4G, 5G, etc. began around 1980 for 1G, 1992 topped at 14.4 kbps for 2G, 2001 topped at 200 kbps for 3G (began commercially in US by Verizon Wireless in July, 2002), 2011 topped at 42 mbps for 4G (began commercially by International Telecommunications Union (ITU) after their press release on Oct. 21, 2010). All the information is acquired from public documentations websites such as Wikipedia.

The said could services and storages functions began when Amazon.com enabled the Elastic Compute Cloud, which started on August, 2006, followed up by Microsoft Azure in February, 2010, followed up by Rackspace Hosting and Nasa, Openstack, on July 2010, followed up by IBM Smartcloud on March, 2011, followed up by Oracle Cloud, on June 2012, etc. All the information is acquired from public documentations websites such as Wikipedia.

The said Facial Recognition or Comparison software began history after Bledsoe's research. In 1966 Sandford University has a database for recognitions approximating at 2,000 photos. The first time AI technology shined the most was back in 2002, when Super Bowl used AI to identify people with Criminal Records. In 2009, more than 170 deputies on US Highway equips cameras for cross-referencing civilians. Until now, Facebook has photo facial recognitions for each photo to be tagged at. All the information is acquired from public documentations websites such as Wikipedia.

The said Artificial Intelligence (AI) has been a strong asset for daily workers since the 1956s. AI has been providing help for mathematical equations, data mining, logistics, etc. In the 1980s, Japan had developed fifth generation computers with strong AI functionalities. Has developed two strong computing modules since the beginning of AI history: expert systems and intelligent agents. In the $21^{st}$ century, since the generalizations of strong processing personal computers, AI has always been providing assists for workers. All the information is acquired from public documentations web sites such as Wikipedia.

The said touch panel, or touchscreen's history began in the first patented tablet used for air traffic control in 1969. Then Bell Labs developed a multi-touch device with interactable function with 2 hands in 1984. In 1992, IBM Simon released a so-called first "smartphone" with a touchscreen. In 2007, Apple released a new touch-only phone iPhone that nobody has yet to seen. In the modern days, the touchscreen or panel technology has been expanded to desktops, laptops, smart home functionalities, etc. All the information is acquired from public documentations web sites such as Wikipedia.

It is appreciated all the above discussed embodiments and figures or any replacement or equal functions or alternative skill should still fall within the current invention for LED light incorporated with any kind of camera or digital video device to take a full color image or video go through wireless communication including Wi-Fi and delivery to cloud storage-station has desired storage or calculation or incorporated the personal money accounts even for personal identification and all behaviors.

I claim:

1. A LED light device has camera-assembly consist of:
   at least one camera is any kind of camera or digital video (DV) to take digital data for colorful image under the dark environment by LED light source to supply sufficient LED light illumination, and
   at least one of camera-assembly has circuit and parts to make connection and deliver digital data captured by camera(s) and functions;
   (1) connect with wifi, wifi-extender, internet, connect 3G/4G/5G to wireless transmitting camera captured image, audio, or other digital data to cloud and give notice to phone or computer owner under pre-program setting, and
   (2) cloud storage station(s) digital data handle by owner of phone or computer after owner of phone or computer download APP with pre-program software or-and AI software for comparison, recognition, tracking, payment, financial operation, other pre-program work(s), and
   (4) owner of phone or computer make screen or image analysis and desired setting, adjust, reply, choice, control the said LED source(s) or-and camera or-and audio related functions, or-and
   (5) Owner of phone or computer connect through internet, or 3/4/5G, and wifi to wireless connection instruction back to the said LED or-and camera to do preferred functions,
   the said desired following works is one or more work selected from analysis, comparison or calculation, identification, facial recognition, crime searching, financial account, tracking, built relation, study habit from the screen or image captured by camera(s) of moving personal or merchandise, object(s) for desired purpose(s),
   the said owner of phone or computer down load APP or-and pre-programed software can handle one or more than one of the said digital-data captured by camera including one or more image(s) or screen(s) or audio(s) to make image or screen selection-areas, or image-moving-detection, or comparison, tracking and other following work of moving personal or merchandise or objects, where said camera-assembly for:
(A) assembly with LED light source to form finished LED light has built-in camera-assembly product, or
(B) the said camera-system has its own individual housing to sell individual for replacement or upgrade none built-in camera light device to built-in camera light device, or
(C) the said camera-assembly to replace out-of-date motion security light has any light source to upgrade to motion sensor security light has built-in camera-assembly,
the said LED light not for street or highway or airport or harbor application.

2. A LED light device has camera-assembly as claim 1, the said camera-assembly has wireless connection through Wi-Fi wireless transmitting the captured image, photo(s), video(s), or-and audio digital-data to cloud storage station and go through the said APP and its software or-and AI to make one or more of function(s):
(1) selection detected-area from screen or image to prevent non-necessary moving-object(s) detected and signal transmit to communication device,
(2) comparison or detection or tracking or calculation or other following work(s) basing on movements of personals, merchandise, products, objects,
(3) software to get or-and analysis or-and take further following works for personal character(s) including face or body or walking or shape recognition,
(4) remote control or adjustment from APP software on screen or displayer or monitor for brightness, angle, timing, shooting angle, zooms, pixels or other functions of LED light source and camera-system,
(5) setting, changing of functions or features of LED light and camera-system.

3. A LED light device has camera-assembly as claim 1, the said the LED light device is one of LED motion security light and LED light source is trigger by motion or-and photo sensors and camera is trigger by desired motion sensor or moving detector(s) to take at least one of photo, video, audio, or desired digital-data and wireless transmitting by Wi-Fi or-and Wi-Fi-extend to cloud storage-station under the pre-program software to get the comparison result from pre-selection screen-areas or moving-detection area(s) and judge to wireless transmitting the pre-choice alarm or reminder signal to communication device owner or others.

4. A LED light device has camera-assembly as claim 1, the said LED light device is one of LED bulb and LED light source is turn on by preferred sensor or switch, and the camera-assembly is trigger by desired motion sensor or moving detector(s) to take at least one of photo(s), video, image and wireless transmitting to cloud storage station by Wi-Fi or-and Wi-Fi-extend to go through pre-program software or-and AI to make one or plurality of screen selection-area(s) or area(s)-tracking or area(s)-comparison or areas-identification for moving object, person, merchandise incorporated with pre-program software to make the identification, financial calculation, recording, recognition, identification, comparison or other following works and get result under pre-programed setting to send out reminder or alarm signal to communication device to owner or others.

5. A LED light device has camera-assembly as claim 1, the said LED light device is one of LED motion security light or LED bulb or LED car torch light or LED garden light or LED entrance door light or LED doorbell light, LED indoor light device which has preferred power source from AC or-and DC power source by wired, prong, AC plug-wire, AC-to-DC transformer, and each of application has desired switch, motion sensor, moving detectors, other sensors to turn on and turn off the said LED light source, camera-assembly to get colorful digital data and also to connect with Wi-Fi, Wi-Fi-extend, cloud storage-station, 3G/4G/5G, APP with at least one of preferred following work selected from selection-area(s), function(s), comparison(s), identification(s), payment(s), calculation(s), tracking(s), analysis(s), further procedures(s).

6. A LED light device has camera-assembly as claim 1, the said LED light device is a portable LED flashlight which has limited battery power source for none rechargeable or rechargeable batteries power so camera-assembly without wireless transmitting or connection with Wi-Fi or wifi-extend capability and only can take desired combination digital-data including photos, video, audio to save into the camera or DV of captured digital-data save into moveable or downloadable storage-unit for reply or display or shown on displayer or screen from storage-unit or memory cards including SD card or micro-SD card or others.

7. A LED light device has camera-assembly as claim 1, the said LED bulb has extendable and retractable bar, pole, tube, cylinder to arrange parts at least including the sensor(s), camera(s) which can overcome the block-object(s) which maybe a glass shade, metal piece, recess-light surrounding wall because the sensor(s) or-and camera(s) head is located on extendable or retractable movable parts, and LED bulb has male bulb-base to assemble with female bulb-socket to build the electric-delivery.

8. A LED light device has camera-assembly as claim 1, the said camera-assembly has its own housing without light source inside the housing can assemble with any non-camera motion security light base's adjustable position screw-thread bar or other assembly-joint bars and connect the non-camera motion sensor light its own light-source electric-wires to upgrade the said non-camera motion security light to become camera motion security light with old existing light source with proper circuit to make desired brightness to take colorful digital-data.

9. A LED light device has camera-assembly as claim 1, the said the camera-assembly has its own individual-housing without light source inside the individual-housing which is individual camera-assembly can fit into non-camera motion sensor light and sales by itself for universal to fit the non-camera existing motion security light device (may not LED light source).

10. A LED light device has camera-assembly as claim 1, the said LED light is LED bulb has extendable or bendable or twistable parts on front or rear or body to arrange sensor or detectors or camera-head(s) for overcome the block-object(s) which has bulb-base to assemble with female bulb-socket to get power for both LED light source and camera-system to get sufficient LED light beam and desired colorful digital-data for indoor or outdoor under dark environment.

11. A LED light device has camera-assembly as claim 1, the said LED light is LED bulb which has built-in motion-sensor or moving-detector(s) can fit into any female bulb-base to become individual LED bulb has camera-assembly for colorful photos or video or-and audio to take digital-data and send out signal through desired MCU or CPU or pre-program circuit and software to communication device owner.

12. A LED light device has camera-assembly as claim 1, the said moving detectors or motion sensor can be one or more than one detectors to detect the moving objects which is belong to hard-parts and non-related to the camera image or display screen detection by software.

13. A LED light device has camera-assembly as claim 1, the said motion detector incorporated with desired software which capable to make following-works from camera captured image or screen image to apply pre-program or AI software to make the detection basing on the 15 to 60 image per-second to make comparison or following work.

14. A LED light device has camera-assembly as claim 1, the said moving sensor is one or more than one of PIR type with one or more than one of area(s) fresnel-lens in flat or curved or dome shape.

15. A LED light device has camera-assembly as claim 1, the said camera system preferred take 60 images per second to reach the 4K grade so can easily to enlarge image still get enough pixel image to easily do following works.

16. A LED light device has camera-assembly as claim 1, the said APP incorporated with pre-program or AI software has all kind of setting, selection, adjustable the LED light construction, LED light source, camera, digital video, camera construction for desired position, functions, brightness, color, pixel, orientation.

17. A LED light device has camera-assembly as claim 1, the said individual saleable camera-system has its safety certification so can sell individual for all kind of DC light source which has universal receiving-parts so can connect with existing light device circuit to upgrade or replace existing motion sensor unit.

18. A LED light device has camera-assembly as claim 1, the said individual saleable camera-assembly which has audio parts including speaker or-and microphone or-and IC to wireless transmitting the audio to receiver(s).

19. A LED light having a built-in camera-assembly consist of:
   said LED light device has preferred LED light source(s) for emitting visible LED light beams offer sufficient brightness to camera-assembly to take colorful photo(s) or video(s) into at least MP4 or 4K (60 image per second) or 8K format digital data with optional sound and other data under the dark environment, and
   said LED light device get power from AC-to-DC circuit to operate the DC LED light source, and optional circuitry and at least one of a controller, switch, motion sensor or-and moving detector(s) or photo or other sensor, conductors, integrated circuit (IC), remote controller, and wireless connect system, communication assembly, and
   at least one of motion sensor including PIR detector, or moving detectors with comparison functions by hardware detector(s), or by camera captured image or screen to make comparison,
   wherein, the said camera-assembly has
     (A) least one camera having function(s) for capturing images, data, or sound at a desired shooting angle, distance, resolution, color, brightness, and sharpness in MP4 or more high-speed format to take photos or video for pre-determined time, period time, certain times, and
     (B) at least one MCU or CPU and software and wireless-system hard parts to wireless transmit said images, photo, video, audio, sound into wireless cloud storage station and present to at least one of a communication device, computer device, phone, receiver device, display device which has downloaded APP and pre-program software; or-and display or replay or reply or answer or operate following works of cloud storage the images, data, or sound by the owner downloaded APP having pre-program software or by digital data device itself;
   the said LED light device having one or more than one functions select from:
     (1) Camera captured digital data go through the MCU, CPU, circuit, hardware or software to delivery by Wi-Fi or-and Wi-Fi extend or internet or 3/4/5G or desired wireless connect system to cloud storage-station, and
     (2) camera-assembly wireless incorporate with download APP with software or AI software by owner of phone or computer or communication product to handle phone or computer's screen or image or digital data for moving object(s) to do following work including select-areas, detection, comparison, analysis, calculation, facial recognition, tracing the said moving people, merchandise, object, or other following work under pre-programed software of download APP, or-and
     (3) the owner of phone or computer or communication reply or give instruction to LED light source or camera-assembly from APP with software through wireless network, 3G or 4G or update wireless network, router, server(s) to wifi and received by said camera-assembly to operate instruction from owner,
     (4) the said APP software can receiving or transmitting digital data including (i) image, photos, video, audio, message, alert, words, (ii) send out instruction, emails, line, skype, WhatsApp, or (iii) handle following work selected from setting, adjust, selection, comparison, tracing, identification, facial recognition, calculation, financial, payment, detect moving people or products or objects, or-and
     (5) the said following work incorporate one of APP or computer software to handle the moving object(s) behavior including detector, comparison, tracking, facial recognition, personal identification, purchase, crime comparison from colorful or HD 1080 or image took by all kind of camera equipment which can connect with download App with software through 3G/4G/incoming 5G, internet or connect-system to communication device(s) including mobile phone, computer, monitor; or
     (6) LED light device have multiple-ways communication assembly to talk, hear, get other audio-effects by microphone or-and speaker through Wi-Fi or-and optional Wi-Fi-extend, internet, wireless network, 3G or 4G or update wireless network, router, server;
     (7) LED light device while incorporate with related program(s) software can selected moving detected-areas, compare selected-areas for moving or movement, or-and remote-control camera angle, position, orientation or-and selection, adjustment, changing setting, and talking or delivery audio-effects though LED light device; or
     (8) the LED light has motion or moving-unit including sensor/moving detector or other sensor which only has motion sensor/moving detector/or brightness or other sensor function and act as switch or comparison equipment just to turn on or turn off all LED lighting or-and camera or-and digital data function(s), which motion or moving-unit can be
       (8-a) installed within camera-assembly individual housing so can sell individual or assembly on LED light wall-mounted base by join-parts just without light source and installation kits, or (8-b) installed inside of LED light wall-mounted base with all other MPU or CPU hardware and software and camera-assembly which has wireless or transmitting to cloud-station and without its own housing, or (8-c) the motion sensor or-and moving detector incorporated with all kind of camera install inside one individual housing to assembly on wall mounted base of said LED light device by screw-assembly and tighten kits, the said individual device has all functions including camera, motion sensor, moving detectors, WI-FI, wireless communication, wireless delivery video, photo, audio, wireless connect to APP, 3G, 4G, 5G, cloud storage station, connect with preprogram APP has detected-areas or personal face recognition or other comparison features for people, products, items, object to input to computer-system to get desired digital data and record and delivery desired signals for certain purpose; and this kind of individual unit has any desired combination except the light-source select from LED or the existing light source while the security light has no camera functions but has its own any of light-source (LED or any others); or (9) LED light has camera-assembly and built-in with motion or moving-unit is desired combination of motion sensor/moving detector(s) or other sensor unit which has separated own individual-housing not install inside LED light wall-mounted base, and (9-1) at least has built-in camera assembly has parts or all of digital data operation including (9-1-1) communication to wireless Wi-Fi, 3G/4G/incoming 5G network, cloud storage station, APP or other programed software has optional screen or image-comparison to make sure not non-necessary movement so not send out electric-signals for hundred times while trigger by cat, dog, street cars, or moving objects is no harm to residence or house or office, (9-1-2) deliver digital data to display, phone, computer, displayer, monitor functions has optional added screen selection or-and screen-comparison or-and image-comparison for moving people, object, merchandise, products and send out pre-programed digital data or following pre-program(s) operation, (9-1-3) operate for other selected or added functions basing on all kind of camera took colorful image or-and audio with pre-programed software to make comparison, identification, calculation, selection, payment, account management by related electric or mechanical parts and accessories so can fit the said separated housing motion sensor or-and moving detectors or-and other sensor unit to non-camera LED light device including motion security light, or LED bulb, or car torch light, or flashlight or garden light or patio light not including street light to upgrade and increase value and functions, said LED light device is connected with the power source by one or combination of (a) prongs, (b) conductive wire, (c) a conductive wire with a plug extending from the light device, (d) a USB adaptor, (e) a transformer device, (f) a power fail backup power storage device (g) an inductor device for wireless charging inner power kits, (h) AC plug-wire, (i) male bulb-base assembly with female bulb-socket.

20. A LED light as claim in claim 19, where said LED light source and camera or DV is triggered by the motion or moving detector(s) sensor and light brightness sensor AT THE SAME TIME under the dark environment.

21. A LED light as claimed in claim 19, wherein said LED light is a LED bulb or Lamp holder includes an insert male-base arranged to be inserted into an existing light fixture or lamp-base female receiving end or socket or terminals.

22. A LED light as claimed in claim 19, wherein said light device is one LED lighting fixtures has camera-assembly and at least one non-lighting function controlled by MCU or CPU or software of said captured screen or image in addition to a lighting function.

23. A LED light as claim 19, the said LED light device LED flasher light or LED strobe light which offer the sufficient light brightness good for take color photo and not big power consumption like plurality of night vision diode(s).

24. A LED light as claimed in claim 19, wherein the light device has extendable, retractable, foldable, or transformable body, housing, or parts with accessories that provide space to arrange at least one non-lighting function for (20-1) wireless communication to make setting or adjustment, or (20-2) multiple-sides communications, control, conversation, adjust angle, focus, brightness, signal, or (6) other functions control by wireless technical including hardware or software including APP or other update software incorporated with Wi-Fi, Wi-Fi-extend, 3G, 4G, 5G or future connection system or-and cloud storage station(s).

25. A LED light as claimed in claim 19, wherein said moving detector in hardware-parts or software for screen or image having more than one moving sensor head(s) or-and integrated circuit (IC) or MCU or CPU with pre-determined software program(s) to detected and compare the status of camera-images or screen-image for moving objects.

26. A LED light as claimed in claim 19, wherein said device includes multiple cameras for capturing images of different locations, angle, orientation, height, position.

27. A LED light claimed in claim 19, wherein said LED light or individual separated camera-assembly includes;

(27-a) at least one of sensor or switch or trigger or software program to control the camera for capturing images and desired digital data has MP4 or 4K or more higher rank digital data; and (27-b) The said LED light or separated camera-assembly all parts get power by conductive male-base or conductive wires from (27-b-1) existing female bulb socket for AC or DC power, or (27-b-2) built-in power fail or power-off backup DC batteries power, or (27-b-3) prong which insert into the outlet of wall or extension cord, (27-b-4) wired with electric signal or power, (27-b-5) AC plug-wire to get electric signal or power.

28. A LED light as claimed in claim 19, wherein said AC power source is an electrical utility power supply system for supplying electricity to homes, residences, and businesses.

29. A LED light as claimed in claim 19, wherein said DC power source is an electrical solar power supply system has built-inside energy storage device including batteries or rechargeable battery, capacitors, or battery, or DC power from any AC-to-DC electric device including transformer, inverter, adaptors.

30. A LED light as claimed in claim 19, wherein said separated camera-assembly has built-in digital data device without light-source and not install within wall-mounted base; and separate unit connect with power source has at least one or preferred combination parts and function(s):
  (30-1) camera capture the MP4 or higher technical format digital-data, or-and
  (30-2) has MCU or CPU or IC to wireless transmit digital data to cloud storage station, or-and
  (30-3) has circuit, conductive piece or conduct wire or conductive bulb-base to get power, or-and
  (30-4) wireless communication system to download, save, play or and image comparison, selection, identification, tracking, or other pre-programed desired functions, or-and
  (30-5) wireless transmit through preferred wife, Wi-Fi-extend, 3G/4G/incoming 5G or higher technical network incorporated selected APP software for the data to communication device, computer, mobile phone, consumer electric products, laptop computer.

31. A LED light as claimed in claim 19, wherein said separated camera-assembly has built-in digital data device with its safety certification can assembled with market existing security light which has non-camera related functions so can sell individually to consumer to upgrade non-camera security light.

32. A LED light as claimed in claim 19, wherein said separated camera-assembly has built-in digital data device with its safety certification can assembled within market existing non-camera security light can use (1) conductive wired, or bulb-base, or (2) inductive or wireless or control to get, deliver or transmit the electric signal or digital-data (s) or power or drive the said light source set for pre-determined function(s), performance(s), light effect(s) or multiple-way communications.

33. A LED light as claimed in claim 19, wherein said camera-assembly has built-in digital data device is a single unit not install on light device wall-mount base and without the LED light source has conductive wire, adaptor, plug, quickly wiring kits or wireless communication kits to connect with LED light source or LED light circuit or LED light wall-mounted base for power or electric signal delivery, and sell individually to work with any other light source assembly.

34. A LED light as claimed in claim 19, wherein said discrete housing camera-assembly of the has built-in camera(s) can connect or assembly or join with the said light device by accessories selected from frame, installation plate, substrate by screws, nail, hooks, glue or market available installation kits.

35. A individual discrete housing camera-assembly consisting of:
  the said camera-assembly trigger the said separated housing lighting-device which has preferred light source selected from Bulb, PAR38, CFL or LED while motion or moving sensor(s) or moving detector(s) detected the moving objects turn on the light-device instantly under dark environment to let camera(s) to take colorful image, photo, video or-and audio digital data, and
  wherein said camera-assembly has parts and accessories includes at least one camera having function(s) for capturing colorful images, data, or sound at a desired shooting angle, distance, resolution, color, brightness, and sharpness in MP4 or 4K or 8K video or-and audio digital data, and
  at least one of MCU or CPU or pre-program software incorporate wireless transmitter through Wi-Fi or-and Wi-Fi-extend go through the said internet 3G/4G/5G or more high speed or technical network to deliver the camera captured digital data to cloud storage station and do one or more of following work
  (1) inform owner of phone or computer or communication device, computer device, phone, receiver device, and display device, and
  (2) owner of phone or computer has download APP with software or AI software under desired programs to handle the said captured digital data, and
  (3) a display or replay or reply or answer or give instruction relate to the camera(s) captured images, or sound after the owner of phone or computer apply the download APP with pre-programed software or solid hardware finished one or more of following work related to all image or digital data shown on screen, including:
    (a) screen select-area(s),
    (b) screen-area(s) comparison,
    (c) moving detection,
    (d) person identification including facial or walking or body, face recognition
    (e) selection-function including dial out phone, trigger alarm, conversation,
    (f) tracing moving person or merchandise or object(s),
    (g) purchase, amount calculation, deduct money from account,
    (h) behavior study, built personal habits
    (i) tracking moving object(s), incorporate with more than one camera(s)
    (j) adjust, set, change of the said LED light-unit, light source, camera, communication, camera, sensor, wireless module or interface to desired requirement then, the software program will wireless deliver the pre-set instruction or electric-signal to the from download APP with software though internet 3/4/5G to wifi and give to LED light unit or camera-assembly to let camera-assembly receiving signal and make desired function related the said camera(s) captured image, photo, video, or-and audio.

36. A individual camera-assembly has built-in digital data device as claim 35, the said camera-assembly to assembly with any light device which can be any type including LED light-source, or LED flasher-light or other light-source or other strobe-light which offer the sufficient light brightness good for take color photo and not big power consumption like plurality of night vision diode(s).

37. A individual camera-assembly has built-in digital data device as claim 35, the said camera-assembly to assembled with any other light device to help to take clear photos or video while power failure or power off, and the power is coming from the unit's backup DC power source including batteries, or rechargeable batteries.

38. A individual camera-assembly has built-in digital data device as claim 15, the said DC power including the power fail backup batteries or rechargeable batteries or energy storage device to offer the power while power off or power failure time.

39. A LED security light has built-in camera-assembly, consist of:
  at least one of camera-assembly has its own housing separated with main LED light device wall mounted base and LED light source,
  the said separated housing camera-assembly only act as switch to turn on or turn off all LED lighting and camera and related digital data function including take colorful photo and go through inner MCU or CPU or IC or software to wireless transmitting the camera(s) captured digital-data go through Wi-Fi or-and Wi-Fi-extend, 3/4/5G internet wireless transmit to cloud storage station under pre-programed software and owner of communication devices including phone or computer already download APP with pre-program software to make receiving camera captured colorful image, and transmitting out signal or instruction back to camera-assembly after owner incorporate with APP with pre-program to finished desired one of more of operation, calculation, comparison, identification, recognition, setting, tracing, detection of camera captured image through screen or displayer to send out pre-set electric signal or reminder or warning signal back to camera-assembly to make all setting, changing, conversation, send out message, call out phone or other works of LED light source(s), video, audio, and camera(s), the said camera-assembly assemble with LED light source of LED light device mounted base by assembly set, joint set, screw-sets with adjustable arms or bar or tube or rotatable kit or adjustable kits, the said LED security light device for indoor or outdoor application for wired or AC plug wire or quickly connector or conductive contactor to fixed on wall, or put on ground which get power from AC power source or DC power source or outside transformer with proper circuit to get current for LED light source and camera-assembly all parts to make desired function.

40. A individual separated housing camera-assembly, consisting of:

at least has one of motion sensor or moving detector hardware install within individual housing with other wireless transmitting and receiving, camera, sensor parts, and at least one of built-in camera take colorful image or-and audio digital data at least MP4 format or 4K or 8K quality to operate one or more following function(s) including:

(a) the LED light device has USB download set while camera-assembly has no wireless system but has USB slot and memory card such as SD or micro SD card or others, or (b) the camera-assembly wireless transmitter camera captured digital data to cloud storage station and people incorporate people download APP with software to review and make desired operation, or (c) the camera-assembly receiver people instruction or signal from download APP with software after people finish desired work from screen or displayer back to camera-assembly to do setting, changing, adjust, or other works, or (d) the camera-assembly wireless transmitting from camera-assembly connect with Wi-Fi go through 3G/4G/incoming 5G internet to cloud storage station, and people had download APP with pre-programed software to show camera(s) captured colorful digital data, and the camera-assembly wireless receiving people instruction basing on screen or display shown camera(s) captured digital data to select the areas, function, and finished all preferred operation and send back from APP with software through 3/4/5G internet to wifi to camera-assembly to do setting, adjust, change, or desired work of LED light source, LED light unit, camera, or other audio or video parts, or (e) the said individual camera-assembly is replace the non-camera motion security light device's simple motion sensor unit to upgrade non-camera security light become security light has built0in motion sensor or moving detector camera-assembly security light, (f) the said individual camera-assembly to assemble with LED light unit(s) on the LED light device main base to become a finish security light has LED light source and motion-sensor or moving detector(s) built-in camera-assembly security light.

41. A LED door entrance light or security light device having camera-assembly consisting of:

at least has one of camera-assembly unit install on LED light to turn on and turn off LED light source(s) and camera to active under predetermined time, period of time, functions to get colorful image and sound or digital data under dark environment, and the said camera take at least MP4 format or 4K or 8K photo, video, or-and audio digital data and storage digital data device by memory kits for LED device has no wireless interface or wireless-system device, or wireless deliver to cloud storage station while device has wireless system, (1) the said LED light device without wireless-system but has USB download set with USB slot and memory card such as SD or micro SD card or others, or (2) the LED light device has wireless-system to wireless transmitter camera captured digital data to cloud storage station and people incorporate had download APP with software to review and make desired operation of captured digital data, or (3) the LED light device receiver people instruction or signal from download APP with software after people finish desired work from screen or displayer back to camera-assembly to do setting, changing, adjust, or other works, or (4) the LED light device Wireless transmitting digital data from camera-assembly connect with Wi-Fi go through 3G/4G/incoming 5G internet to cloud storage station, and people had download APP with pre-programed software to show camera(s) captured colorful digital data, and The LED light device wireless receiving people instruction basing on screen or display shown camera(s) captured digital data to select the areas, function, and finished all preferred operation and send back from APP with software through 3/4/5G internet to wifi to camera-assembly to do setting, adjust, change, or desired work of LED light source, LED light unit, camera, or other audio or video parts, or (5) The said individual camera-assembly is replace the non-camera motion security light device's simple motion sensor unit to upgrade non-camera security light become security light has built0in motion sensor or moving detector camera-assembly security light, (6) The said individual camera-assembly to assembled with LED light unit(s) on the LED light device main base to become a finish door-entrance or security light has LED light source and motion-sensor or moving detector(s) built-in camera-assembly security light.

42. A LED light security light has camera-assembly, consist of; At least one camera is any kind of camera or digital video (DV) to take digital data for colorful image under the dark environment by LED light source to supply sufficient LED light illumination, and at least one of camera-assembly has circuit and parts to make connection and deliver digital data captured by camera(s) and functions;

(1) connect with wifi, wifi-extender, internet, connect 3G/4G/5G to wireless transmitting camera captured image, audio, or other digital data to cloud and give notice to phone or computer owner under pre-program setting, and (2) cloud storage station(s) digital data handle by owner of phone or computer after owner of phone or computer download APP with pre-program software or-and AT software for comparison, recognition, tracking, payment, financial operation, other pre-program work(s), and (4) owner of phone or computer make screen or image analysis and desired setting, adjust, reply, choice, control the said LED source(s) or-and camera or-and audio related functions, or-and (5) owner of phone or computer connect through internet, or 3/4/5G, and wifi to wireless connection instruction back to the said LED or-and camera to do preferred functions, the said desired following works is one or more work selected from analysis, comparison or calculation, identification, facial recognition, crime searching, financial account, tracking, built relation, study habit from the screen or image captured by camera(s) of moving personal or merchandise, object(s) for desired purpose(s), the said owner of phone or computer down load APP or-and pre-programed software can handle one or more than one of the said digital-data captured by camera including one or more image(s) or screen(s) or audio(s) to make image or screen selection-areas, or image-moving-detection, or comparison, tracking and other following work of moving personal or merchandise or objects.

\* \* \* \* \*